US009123467B2

(12) United States Patent
Wu et al.

(10) Patent No.: US 9,123,467 B2
(45) Date of Patent: Sep. 1, 2015

(54) SWITCH WEAR LEVELING

(71) Applicant: Utah State University, North Logan, UT (US)

(72) Inventors: Hunter Wu, Logan, UT (US); Kylee Sealy, Logan, UT (US); Aaron Gilchrist, Logan, UT (US)

(73) Assignee: Utah State University, North Logan, UT (US)

( * ) Notice: Subject to any disclaimer, the term of this patent is extended or adjusted under 35 U.S.C. 154(b) by 106 days.

(21) Appl. No.: 13/748,074

(22) Filed: Jan. 23, 2013

(65) Prior Publication Data
US 2013/0188397 A1    Jul. 25, 2013

Related U.S. Application Data

(60) Provisional application No. 61/589,599, filed on Jan. 23, 2012.

(51) Int. Cl.
*H02M 3/335* (2006.01)
*H01F 38/14* (2006.01)
(Continued)

(52) U.S. Cl.
CPC ............. *H01F 38/14* (2013.01); *B60L 11/182* (2013.01); *H02M 3/33576* (2013.01);
(Continued)

(58) Field of Classification Search
CPC ............. H02M 3/3376; H02M 3/337; H02M 3/33592; H02M 3/40; H02M 3/33507; H02M 3/382; H02M 3/33523; H02M 3/1588; H02M 3/156; H02M 3/158; H02M 3/1582; H02M 1/22; H02M 1/32; H02M 7/54; H02M 7/48; H02M 7/53806; H02M 7/53871; H02M 7/5387; H02M 7/53875; H02M 7/538; G05F 1/607; G05F 1/52; G05F 1/12; G05F 1/42
USPC ................... 363/17, 32, 95, 97, 98, 109, 132; 323/228, 271
See application file for complete search history.

(56) References Cited

U.S. PATENT DOCUMENTS 4,661,897 A    4/1987 Pitel
5,969,958 A *  10/1999 Nielsen et al. .................. 363/41
(Continued)

FOREIGN PATENT DOCUMENTS

EP    1717940 A2    2/2006
FR    2738417 A1    3/1997
(Continued)

OTHER PUBLICATIONS

M. Borage et al. "Analysis and Design of an LCL-T Resonant Converter as a Constant-Current Power Supply". IEEE Transactions on Industrial Electronics, vol. 52, No. 6, Dec. 2005. pp. 1547-1554.*
(Continued)

*Primary Examiner* — Adolf Berhane
*Assistant Examiner* — Kevin H Sprenger
(74) *Attorney, Agent, or Firm* — Kunzler Law Group

(57) ABSTRACT

An apparatus for switch wear leveling includes a switching module that controls switching for two or more pairs of switches in a switching power converter. The switching module controls switches based on a duty cycle control technique and closes and opens each switch in a switching sequence. The pairs of switches connect to a positive and negative terminal of a DC voltage source. For a first switching sequence a first switch of a pair of switches has a higher switching power loss than a second switch of the pair of switches. The apparatus includes a switch rotation module that changes the switching sequence of the two or more pairs of switches from the first switching sequence to a second switching sequence. The second switch of a pair of switches has a higher switching power loss than the first switch of the pair of switches during the second switching sequence.

17 Claims, 40 Drawing Sheets

(51) Int. Cl.
  *B60L 11/18* (2006.01)
  *H02M 7/5387* (2007.01)
(52) U.S. Cl.
  CPC ....... *H02M 7/53871* (2013.01); *Y02T 10/7005* (2013.01); *Y02T 10/92* (2013.01); *Y02T 90/122* (2013.01); *Y02T 90/127* (2013.01); *Y02T 90/14* (2013.01)

(56) References Cited

U.S. PATENT DOCUMENTS

| | | | |
|---|---|---|---|
| 6,016,257 A * | 1/2000 | Chang et al. | 363/17 |
| 6,317,338 B1 | 11/2001 | Boys | |
| 6,366,051 B1 | 4/2002 | Nantz et al. | |
| 6,448,745 B1 | 9/2002 | Killat et al. | |
| 7,148,669 B2 | 12/2006 | Maksimovic et al. | |
| 7,652,459 B2 | 1/2010 | Qahouq et al. | |
| 8,085,024 B2 | 12/2011 | Prodic et al. | |
| 8,653,699 B1 * | 2/2014 | Dening et al. | 307/115 |
| 2006/0181906 A1 | 8/2006 | Batarseh et al. | |
| 2008/0053716 A1 | 3/2008 | Scheucher et al. | |
| 2008/0203992 A1 | 8/2008 | Qahouq et al. | |
| 2009/0160422 A1 * | 6/2009 | Isobe et al. | 323/349 |
| 2009/0174263 A1 | 7/2009 | Baarman et al. | |
| 2009/0267582 A1 | 10/2009 | Prodic et al. | |
| 2010/0109604 A1 | 5/2010 | Boys et al. | |
| 2011/0049978 A1 | 3/2011 | Sasaki et al. | |
| 2011/0080056 A1 | 4/2011 | Low et al. | |
| 2011/0109263 A1 | 5/2011 | Sakoda et al. | |
| 2011/0163542 A1 | 7/2011 | Farkas | |
| 2011/0181240 A1 | 7/2011 | Baarman et al. | |
| 2011/0204845 A1 | 8/2011 | Paparo et al. | |
| 2011/0254379 A1 | 10/2011 | Madawala et al. | |
| 2011/0270462 A1 | 11/2011 | Amano et al. | |
| 2011/0304216 A1 | 12/2011 | Baarman | |
| 2012/0002446 A1 * | 1/2012 | Madawala et al. | 363/17 |
| 2012/0049620 A1 | 3/2012 | Jansen | |
| 2012/0235509 A1 | 9/2012 | Ueno et al. | |
| 2013/0049484 A1 | 2/2013 | Weissentern et al. | |
| 2013/0308345 A1 * | 11/2013 | Gray et al. | 363/17 |

FOREIGN PATENT DOCUMENTS

| | | |
|---|---|---|
| RU | 2316884 C2 | 2/2008 |
| RU | 2412514 C2 | 2/2011 |
| TW | 200810315 A | 2/2008 |
| WO | 2011046453 A1 | 4/2011 |
| WO | 2011/061821 A1 | 5/2011 |
| WO | 2012001291 A2 | 1/2012 |
| WO | 2012007942 A2 | 1/2012 |

OTHER PUBLICATIONS

Brooker et al., Technology improvement pathways to cost effective vehicle electrification, 2010 SAE2010 World Cong. 1-18 (Feb. 1, 2010).
Budhia et al., Design and Optimisation of Circular Magnetic Structures for Lumped Inductive Power Transfer Systems, 2009 Energy Conversion Cong. and Expo 2081-2088 (Sep. 20-24, 2009).
Magnus et al., A d.c. magnetic metamaterial, 7:4 Nat. Mater. 295-297 (2008).
Milton et al., Realizability of metamaterials with prescribed electric permittivity and magnetic permeability tensors, 12 New Journal of Physics (Mar. 2010).
Zierhofer et al., Geometric approach for coupling enhancement of magnetically coupled coils, 43 IEEE Transactions on Biomedical Engineering 708-714 (1996).
Boys et al., Stability and control for inductively coupled power transfer systems, 147 IEE Proc.—Electric Power Applications 37-43 (2000).
Wu et al., A 1kW inductive charging system using AC processing pickups, 6 IEEE Industrial Electronics and Applications 1999-2004 (Jun. 21-23, 2011).
Covic et al., A Three-Phase Inductive Power Transfer System for Roadway-Powered Vehicles, 54:6 IEEE Transactions on Industrial Applications 3370-3378 (2007).
Borage et al., Analysis and design of an LCL-T resonant converter as a constant-current power supply, 52 IEEE Transactions on Industrial Electronics 1547-1554 (2005).
Wu et al., Design of Symmetric Voltage Cancellation Control for LCL converters in Inductive Power Transfer Systems, 2011 IEEE International Electric Machines & Drives Conf. 866-871 (May 15-18, 2011).
Nakao et al., Ferrite core couplers for inductive chargers, 2 Power Conversion Conf. 850-854 (2002).
Wu et al., A review on inductive charging for electric vehicles, 2011 IEEE Int'l Macnines & Drives Conf. 143-147 (May 15-18, 2011).
Huang et al., LCL pick-up circulating current controller for inductive power transfer systems, 2010 IEEE Energy Conversion Cong. and Exposition (ECCE) 640-646 (Sep. 12-16, 2010).
Budhia et al., A new IPT magnetic coupler for electric vehicle charging systems 36 IEEE Industrial Electronics and Applications 2487-2492 (Nov. 7-10, 2010).
Budhia et al., Development and evaluation of single sided flux couplers for contactless electric vehicle charging, 2011 IEEE Energy Conversion Cong. and Expo 613-621 (Sep. 17-22, 2011).
Chigira et al., Small-Size Light-Weight Transformer with New Core Structure for Contactless Electric Vehicle Power Transfer System, 2011 IEEE Energy Conversion Cong. and Expo 260-266 (Sep. 17-22, 2011).
Jin et al., Characterization of novel Inductive Power Transfer Systems for On-Line Electric Vehicles, 26 IEEE Applied Power Electronics Conference and Expo 1975-1979 (Mar. 6-11, 2011).
Nagatsuka et al., Compact contactless power transfer system for electric vehicles, 2010 Int'l Power Electronics Conf. 807-813 (Jun. 21-24, 2010).
Covic et al., Self tuning pick-ups for inductive power transfer, 2008 IEEE Power Electronics Specialists Conf. 3489-3494.
Si et al., Wireless Power Supply for Implantable Biomedical Device Based on Primary Input Voltage Regulation, 2 IEEE Cof. on Industrial Electronics and Applications 235-239 (2007).
Joung et al., An energy transmission system for an artificial heart using leakage inductance compensation of transcutaneous transformer, 13 IEEE Transactions on Power Electronics 1013-1022 (1998).
Si et al., A Frequency Control Method for Regulating Wireless Power to Implantable Devices, 2 IEEE Transactions on Biomedical Circuits and Systems 22-29 (2008).
Sasaki et al., Thermal and Structural Simulation Techniques for Estimating Fatigue of an IGBT Module, 20 Power Semiconductor Devices and IC's 181-184 (2008).
Ciappa et al., Lifetime prediction of IGBT modules for traction applications, 38 IEEE Reliability Physics Symp. 210-216 (2000).
Borage et al., Analysis and design of an LCL-T resonant converter as a constant-current power supply, 52 IEEE Int'l Electric Machines & Drives Conf. 1547-1554 (2005).
Budhia et al., A new IPT magnetic coupler for electric vehicle charging systems, 36 IEEE Industrial Electronics Conf. 2487-2492 (Nov. 10-17, 2010).
Keeling et al., A Unity-Power-Factor IPT Pickup for High-Power Applications, 57 IEEE Transactions on Industrial Electronics 744-751 (Feb. 2010).
Boys et al., Single-phase unity power-factor inductive power transfer system, 2008 IEEE Power Electronics Specialists Conf. 3701-3706.
Xu et al., Modeling and controller design of ICPT pickups, 3 Int'l Conf. on Power System Technology 1602-1606 (2002).
Si et al., Analyses of DC Inductance Used in ICPT Power Pick-Ups for Maximum Power Transfer, 2005 IEEE Transmission and Distribution Conf. and Exhibition: Asia and Pacific 1-6 (2005).
Boys et al., Controlling inrush currents in inductively coupled power systems, 7 IEEE Int'l Power Engineering Conference 1046-1051 (2005).
Musavi et al., A High-Performance Single-Phase Bridgeless Interleaved PFC Converter for Plug-in Hybrid Electric Vehicle Battery Chargers, 47 IEEE Transactions on Industry Applications 1833-1843 (Jul.-Aug. 2011).

(56) References Cited

OTHER PUBLICATIONS

Elliott et al., Multiphase Pickups for Large Lateral Tolerance Contactless Power-Transfer Systems, 57 IEEE Transactions on Industrial Electronics 1590-1598 (May 2010).
Wang et al., Design considerations for a contactless electric vehicle batter charger, 52 IEEE Transactions on Industrial Electronics 1308-1314 (2005).
PCT/US2013/022778, International Search Report and Written Opinion, Apr. 18, 2013.
U.S. Appl. No. 131748,269, Office Action, Mailed Apr. 9, 2015.
Hunter Hanzhuo Wu et al. "Design of Symmetric Voltage Cancellation Control for LCL converters in Inductive Power Transfer Systems", Electric Machines & Drives Conference (IEMDC), 2011 IEEE Internation, IEEE, May 15, 2011.
Hunter Hanzhuo Wu et al., "A 1kW inductive charging system using AC processing pickups" 2011 6th Eastconferenece on Industrial; Electronics and Applicaitons, Jun. 1, 2011.
Boys J T et al., "stability and control of inductively coupled power transfer systems", IEE Proceeding: Electric Power Applications Institution of Electrical Engineers, GB vol. 147, No. 1, Jan. 11, 2000.
Hunter Hanzhuo Wu et al., "A review on inductive charging for electric vehicles", Electric Machines&Drives Conference (IEMDC), 2011 IEEE International, IEEE May 15, 2011.
Hussnain Ali et al., Inductive link design for medical implants', Industrial Electronics&Applications, 2009, ISIEA 2009. IEEE Symposiem on IEE Piscataway, NJ, Oct. 4 2009.

\* cited by examiner

Misalignment conditions for vertical and horizontal misalignment. h=0 trend represents the profile of vertical misalignment under zero horizontal offset. v=200 trend represents the profile of horizontal misalignment under 200mm of height separation.

The losses in the H-bridge for different temperatures for IRG7PH42UPBF

Switch Heatsink Thermal Design

Simplified IGBT Gate Drive Circuit

LCL Converter with Split Inductor Design

Adjustable Inductor

Flux density of AC inductor design for LCL converter using E55 core.

Circular pad structure and dimension (Top View)

Uncompensated power of IPT pads for different vertical heights

Dimensions and Configuration of Ferrite Arm Support Structure

Dovetail Groove Dimensions

Equivalent efficiency model circuit diagram of secondary decoupling pickup (see also Figure 29)

Equivalent efficiency model circuit diagram of primary LCL converter (see also Figure 11)

Controller block diagram for optimal efficiency

Coupling coefficient estimation using: upper traces for k=2k_min (M=60μH) and lower traces for k=1.14k_min (M=34.2μH)

Secondary decoupling pickup (secondary circuit)

AC current peak to peak amplitude normalized against DC average value vs. Ldc

Secondary decoupling pickup efficiency vs. switching frequency of an exemplary decoupling circuit Root locus and bode plot of decoupling circuit Efficiency of System @k=1.14$k_{min}$ (v=246mm, h=0mm). Line represents analytically calculated results and markers represented experimental measured results. The data is taken for different loading conditions, when matched to a percentage of the maximum Q2v loading condition.

Efficiency of System @k=2.0k$_{min}$ (v=172mm, h=0). Line represents analytically calculated results and markers represented experimental measured results. The data is taken for different loading conditions, when matched to a percentage of the maximum Q2v loading condition.

Practical overall system efficiency measurements when output voltage is allowed to vary. 5kW transfer occurs when the DC output is 300 V.

Magnetic field measurement results for 5 kW system operating under worst conditions. The highest field strength was found at vertical height of 200 mm and horizontal misalignment of 150 mm.

Body average measurement from 4 measurement points on a 1500 mm tall female human body. The highest field strength was found at a vertical height of 255 mm and zero horizontal misalignment.

Efficiency of System @k=1.14k$_{min}$ (v=246mm, h=0mm). Line represents analytically calculated results and markers represented experimental measured results. The data is taken for different loading conditions, when matched to a percentage of the maximum Q2v loading condition.

Efficiency of System @k=2.0k$_{min}$ (v=172mm, h=0). Line represents analytically calculated results and markers represented experimental measured results. The data is taken for different loading conditions, when matched to a percentage of the maximum Q2v loading condition.

Current values for waveforms $i_b$, $i_1$, and $i_2$ for $Q_{2v}=0.2Q_{2vm}$ and $k=2k_{min}$ Efficiency measurement under a wide range of operating conditions. V=172 is for a vertical height of 172 mm with zero misalignment. V=200 is for a vertical height of 200 mm and horizontal misalignment of 140 mm.

(a)

(b)

(a) P=2kW, (b) P=5kW @ v=246mm h=0mm. Top to bottom trace, $i_b$ (Figure 11), $i_1$ (Figure 11), $i_2$ (Figure 29), and $V_s$ (Figure 29) (inverse of duty cycle).

(a)

(b)

(a) P=2kW, (b) P=5kW @ v=246mm h=0mm. Top to bottom trace, $i_b$ (Figure 11), $i_1$ (Figure 11), $i_2$ (Figure 29), and $V_s$ (Figure 29) (inverse of duty cycle).

SWITCH WEAR LEVELING

CROSS-REFERENCES TO RELATED APPLICATIONS

This application claims the benefit of U.S. Provisional Patent Application No. 61/589,599 entitled "WIRELESS POWER TRANSFER SYSTEM AND METHODS" and filed on Jan. 23, 2012 for Hunter Wu, et al., which is incorporated herein by reference for all purposes. U.S. patent application Ser. No. 13/748,269 entitled "WIRELESS POWER TRANSFER SYSTEM" and filed on Jan. 23, 2013 for Hunter Wu, et al. is incorporated herein by reference for all purposes.

This invention was made with government support under contract DEEE0003114 by the Department of Energy. The government has certain rights in the invention.

FIELD OF THE INVENTION

This invention relates to switching power converters and more particularly relates to switch wear leveling for switching power converters.

SUMMARY

From the foregoing discussion, it should be apparent that a need exists for an apparatus, system, and method switch wear leveling. Beneficially, such an apparatus, system, and method would balance switching power losses among switches to provide a more even switch wear for each of the switches.

An apparatus for switch wear leveling is disclosed. A system and method also perform the functions of the method. The apparatus includes a switching module and a switch rotation module. The switching module controls switching for two or more pairs of switches in a switching power converter. The switching module controls each of the two or more pairs of switches closed and open based on a duty cycle control technique. The switching module closes and opens each switch of the two or more pairs of switches in a switching sequence. The two or more pairs of switches connect to a positive terminal and a negative terminal of a direct current ("DC") voltage source. For a first switching sequence a first switch of a pair of switches has a higher switching power loss than a second switch of the pair of switches. The switch rotation module changes the switching sequence of the two or more pairs of switches from the first switching sequence to a second switching sequence. The second switch of a pair of switches has a higher switching power loss than the first switch of the pair of switches during the second switching sequence.

In one embodiment, the apparatus includes a switch wear module that tracks switching sequences and the switch rotation module changes the switching sequence based on tracking of the switching sequences. In another embodiment, the switch wear module tracks the switching sequences by tracking an amount of time switching using each switching sequence. In another embodiment, the switch wear module tracks the switching sequences by tracking an amount of switching cycles for each switching sequence. In another embodiment, the switch rotation module uses tracking of the switching sequences to switch between switching sequences to balance an amount of switching for each switching sequence.

In one embodiment, the switching module controls three pairs of switches and the switch rotation module changes the switching sequence between the first switching sequence, the second switching sequence, and a third switching sequence. In another embodiment, the switch rotation module changes the switching sequence during a startup condition. In another embodiment, the switch rotation module changes the switching sequence by changing which pair of switches is first to be switched in a switching sequence. In a further embodiment, the switch rotation module orders switching of the two or more pairs of switches so that a first pair of switches is first in a first switching sequence and a second pair of switches is first in a second switching sequence.

In one embodiment, the switching power converter is a full-bridge derived topology. In another embodiment, the topology of the switching power converter is a voltage driven H-bridge, a current driven H-bridge, or a three-phase voltage driven H-bridge. In another embodiment, the topology of the switching power converter comprises an LCL converter. In another embodiment, the duty cycle control technique may include symmetric voltage cancellation ("SVC") control, asymmetric voltage cancellation ("AVC") control, fixed conduction angle with variable voltage control, and/or fixed conduction angle control. In another embodiment, the switches of the two or more pairs of switches are semiconductor switches.

A system for switch wear leveling includes a switching power converter and a switching module that controls switching for two or more pairs of switches in the switching power converter. The switching module controlling each of the two or more pairs of switches closed and open based on a duty cycle control technique. The switching module closes and opens each switch of the two or more pairs of switches in a switching sequence. The two or more pairs of switches connect to a positive terminal and a negative terminal of a DC voltage source. For a first switching sequence, a first switch of a pair of switches has a higher switching power loss than a second switch of the pair of switches. The system includes a switch rotation module that changes the switching sequence of the two or more pairs of switches from the first switching sequence to a second switching sequence and the second switch of a pair of switches has a higher switching power loss than the first switch of the pair of switches during the second switching sequence. In one embodiment, the switching power converter includes an LCL converter in an induction power transfer system.

A method for switch wear leveling includes controlling switching for two or more pairs of switches in a switching power converter by controlling each of the two or more pairs of switches closed and open based on a duty cycle control technique. Each switch of the two or more pairs of switches closes and opens in a switching sequence. The two or more pairs of switches connect to a positive terminal and a negative terminal of a DC voltage source. For a first switching sequence, a first switch of a pair of switches has a higher switching power loss than a second switch of the pair of switches. The method includes changing the switching sequence of the two or more pairs of switches from the first switching sequence to a second switching sequence and the second switch of a pair of switches has a higher switching power loss than the first switch of the pair of switches during the second switching sequence.

In one embodiment, the method includes tracking the switching sequence and changing the switching sequence is based on tracking of the switching sequence.

In another embodiment, tracking the switching sequence includes tracking an amount of time switching using each switching sequence and/or tracking an amount of switching cycles for each switching sequence. In another embodiment, the method includes balancing an amount of switching for each switching sequence based on tracking of the switching sequences.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
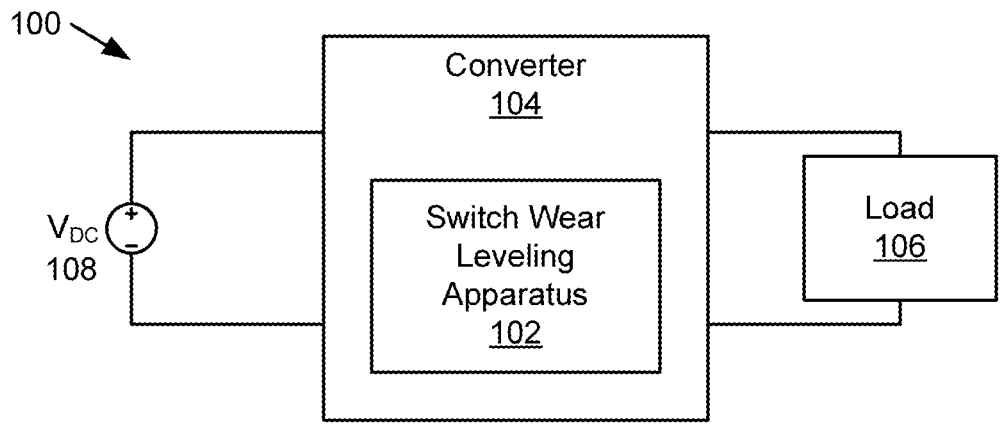
FIG. 1 is a schematic block diagram illustrating one embodiment of a system for switch wear leveling.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or "Flash memory"), an optical fiber, a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Aspects of the present invention are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

Switching power converters typically convert electrical power from one form to another. Switching power converters are often used to convert utility power to another form. One form of the switching power converter is a full wave converter. In some full wave converter topologies, switches are grouped in pairs. Often full wave converters have multiple pairs of switches, and the switches are arbitrarily numbered. The switches are switched in a switching sequence where one pair of switches is arbitrarily chosen to switch first in the switching sequence. The switches may be renumbered or the switching sequence may be altered so that another pair of switches may switch first in the switching sequence.

In some full wave converter topologies each pair of switches connects to a direct-current ("DC") voltage source. For example one pair of switches may connect to terminals of the DC voltage source and another pair of switches may connect to terminals of the DC voltage source with an opposite polarity. In this example, the converter may be an inverter. One form of a converter is an LCL converter. An LCL converter may be used for an inductive power transfer system. In certain modes of operation the LCL converter may have higher switching losses for a first switch of a pair of switches than for a second switch of the pair of switches. Higher switching losses for certain switches may cause uneven wear and may cause the switches with the higher switching losses to fail quicker than other switches with lower switching losses.

Switch wear leveling is a software technique that may be used by a processor controlling switching of a converter. In Symmetric Voltage Cancellation ("SVC") control techniques and other similar phase control techniques, typically one half of a full-bridge (the leading half) heats up and wears more quickly than the other half. This is because one leg may operate with relatively high diode reverse recovery losses (capacitive switching) and the other leg may operate with conventional hard characteristics (inductive switching). See H. H. Wu et al, "Design of Symmetric Voltage Cancellation Control for LCL converters in Inductive Power Transfer Systems," in *IEEE International Electric Machines & Drives Conference (IEMDC), 2011*, 2011, pp. 866-871. This imbalance may cause an imbalance of temperature between halves of the full-bridge and may reduce the overall life of the converter causing premature and unwanted failures in the high power system. See K. Sasaki et al, "Thermal and Structural Simulation Techniques for Estimating Fatigue Life of an IGBT Module," in *Power Semiconductor Devices and IC's, 2008. ISPSD '08. 20th International Symposium on*, 2008, pp. 181-184. In some embodiments where such problems might exist, switch wear leveling may be used to increase switch life and promote a longer system lifespan.

In some applications, for example at a given fixed frequency (i.e. constant waveform) and fixed switch junction temperature, switch fatigue may be directly proportional to time of operation of the switch using the Coffin-Manson law. See M. Ciappa et al, "Lifetime prediction of IGBT modules for traction applications," in *Reliability Physics Symposium, 2000. Proceedings. 38th Annual 2000 IEEE International*, 2000, pp. 210-216. As the temperature changes, the rate of fatigue may increase or decrease. In a resonant LCL converter, the switched frequency is typically constant. The mean number of cycles-to-failure $N_f$ can be computed where $\alpha$ is a proportionality constant, $\Delta T$ is temperature difference against a reference, and n is a positive number.

$$N_f = \alpha(\Delta T)^{-n} \quad (1)$$

To mitigate additional switch wear on one half of a full-bridge and better balance overall system life, the processor may be configured to intelligently alternate the SVC waveform direction on startup (or similar control technique waveform). This operation changes which half of the full-bridge wears more during a given period of operation, thereby wear-leveling the switches. In some cases, switch wear leveling based solely on time and power transfer may be sufficient if general operating conditions are assumed to be relatively constant. In other situations, a more precise wear leveling technique may be achieved by measuring the local switches' temperature profile over time and using a weighted lookup table (or other mathematical modeling technique) to estimate switch wear and, hence, more intelligently control the time which the SVC or other control technique operates in a given direction.

FIG. 1 is a schematic block diagram illustrating one embodiment of a system 100 for switch wear leveling. The system 100 includes a switch wear leveling apparatus 102 in a converter 104 that drives a load 106 and is connected to a DC voltage source 108, which are described below.

The system 100 includes a switch wear leveling apparatus 102. The switch wear leveling apparatus 102 changes a switching order of switches in a converter 104 to that switch wear of switches in the converter 104 is more evenly distributed. The switch wear leveling apparatus 102 will be discussed in more detail with regard to FIG. 2 and FIG. 3.

The system 100 includes a converter 104. In one embodiment, the converter 104 is a switching power converter that converts power from one form to another form. For example, the converter 104 may convert power from a DC voltage source to another form, such as an alternating current ("AC") waveform and may converter an input voltage from one level to another level. In one embodiment, the converter 104 may be called an inverter. In another embodiment, the converter 104 is a DC to DC switching power converter that converts an input DC voltage to an output DC voltage of a different voltage level than the input voltage level. The converter includes two or more pairs of switches that switch in such a way that a first switch of a pair of switches may switch in such a way that the switch may be expected to wear out quicker than a second switch of the switching pair. For example, the switching conditions of the first switch may be such that the first switch has more parasitic power losses than the second switch in the pair.

In one embodiment, the converter 104 is a full-bridge derived topology. For example, the converter 104 may be a voltage driven H-bridge converter. In another example, the converter 104 may be a current driven H-bridge converter. In another example, the converter 104 may be a three-phase voltage driven H-bridge converter. In another embodiment, the converter 104 may be an LCL converter with a voltage driven H-bridge frontend. In another embodiment, the converter 104 may include one or more transformers. The converter 104 may be derived from a buck, a boost, a buck-boost or other topology. One of skill in the art will recognize other topologies suitable for the converter 104.

The system 100 includes a load 106 connected to the converter 104. The load may include computer equipment, power equipment, a power storage component, or the like. The converter 104 may include an output bus connecting to one or more loads. In one embodiment, the system 100 is an inductive power transfer ("IPT") system, the load is a battery, capacitor, or other energy storage device and the converter 104 includes an inductive power transfer topology, such as an LCL converter. One embodiment of a system 100 that includes inductive power transfer is discussed in more detail with regard to FIG. 9.

The system 100, in one embodiment, includes a DC voltage source 108. In one embodiment, the DC voltage source 108 is the output of a converter, such as a corrective power factor converter. In another embodiment, an AC voltage source feeds a rectifier and/or a power factor correction converter functions as a DC voltage source 108. For example, the converter 104 may include at least one stage of a converter where another stage is connected to the converter 104 and serves as the DC voltage source 108. The AC voltage source, in one embodiment, is from a utility power system. In another embodiment, the DC voltage source 108 is derived from a DC power bus. One of skill in the art will recognize other possible DC voltage sources 108.

Figure 2:
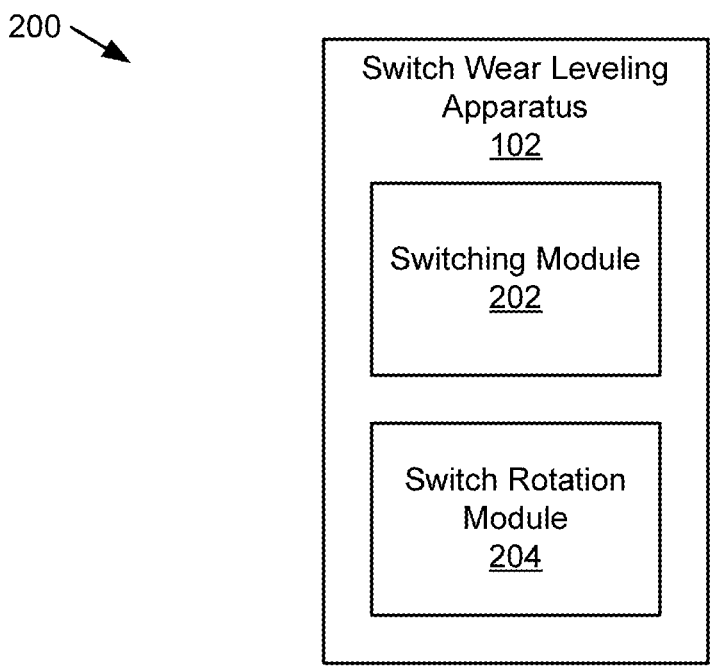
FIG. 2 is a schematic block diagram illustrating one embodiment of an apparatus for switch wear leveling.

FIG. 2 is a schematic block diagram illustrating one embodiment of an apparatus 200 for switch wear leveling. The apparatus 200 includes one embodiment of a switch wear leveling apparatus 102 with a switching module 202 and a switch rotation module 204, which are described below.

The apparatus 200 includes a switching module 202 that controls switching for two or more pairs of switches in a switching power converter, such as the converter 104 of the system 100 of FIG. 1. The switching module 202 controls each of the two or more pairs of switches closed and open based on a duty cycle control technique. The duty cycle control technique, in one embodiment, controls switches either to an open or to a closed position. Typically, for duty cycle control, where the switches are semiconductors switches, the switches are not operated in an active region but are controlled to be fully on or fully off in a manner to minimize parasitic power loss during the change from closed to open or from open to closed. In one embodiment, the switches are semiconductor switches.

A switch, for example, may be an insulated-gate bipolar transistor ("IGBT"). An IGBT typically has a characteristic of having a body diode so that current flows from collector to emitter based on applying voltage to the gate of the IGBT and does not allow current to flow from the collector to the emitter when voltage is not applied to the gate. The body diode of the IGBT allows current to flow from the emitter to the collector.

In another embodiment, an external diode may be used with an IGBT. Such an embodiment may allow selection of favorable diode characteristics not available in the body diode of the IGBT. In other embodiments, a switch may be a metal-oxide-semiconductor field-effect transistor ("MOSFET"), a silicon-controlled rectifier ("SCR"), bipolar transistor, or other semiconductor switching device. In another embodiment, a switch may be an electro-mechanical relay. In another embodiment, a switch may be a combination of devices.

The switching module 202 closes and opens each switch of the two or more pairs of switches in a switching sequence. A switching sequence is a particular order that the switches are opened and closed during a duty cycle. Typically the switching sequence repeats each duty cycle. The two or more pairs of switches connect to a positive and a negative terminal of the DC voltage source 108. In one embodiment, for example in a voltage driven converter topology, the two or more pairs of switches connect to the positive and the negative terminal of the DC voltage source 108 directly.

In other embodiments, the two or more pairs of switches connect to the positive and the negative terminal of the DC voltage source 108 indirectly. For example, a current driven H-bridge may have an inductor between the terminals of the DC voltage source 108 and the switches. One of skill in the art will recognize that other components, such as terminals, wiring, snubber components, sensors, etc. may be between the DC voltage source 108 and the switches, but that the switches open and close to connect to the DC voltage source 108.

For various modes of operations and different topologies of the converter 104, a first switching sequence may operate such that a first switch of a pair of switches has a higher switching power loss than a second switch of the pair of switches. For example, the first switching sequence may be such that a first switch of a pair of switches may switch close with a higher voltage across the first switch than the voltage across the second switch when the second switch closes. For instance, the first switch of the pair may close with a substantial voltage across the switch while the second switch operates under a zero-voltage switching ("ZVS") scenario. The difference in switching power loss between the two switches may be due to topology and component values and types of the converter 104. The difference in switching power loss between the two switches may also be due to a particular loading condition or a particular duty cycle within a duty cycle control technique. A switch controlled by the switching module 202 may be any type of switch used in a switching power converter 104 with two or more pairs of switches where one switch in the pair has higher switching power losses than the second switch of the pair.

The duty cycle control technique may be any type of duty cycle control used to control a converter 104. The duty cycle control technique may have a fixed or a variable duty cycle. The duty cycle control technique may include typical voltage feedback control, such as proportional control, proportional integral derivative ("PID") control, etc. In one embodiment, the duty cycle control technique may include symmetric voltage cancellation ("SVC") control, asymmetric voltage cancellation ("AVC") control, asymmetric duty cycle ("ADC") control, fixed conduction angle with variable voltage control, and/or fixed conduction angle control.

SVC control, for example, typically adjusts a conduction angle to regulate voltage, current, and/or power to the load 106. For SVC control, typically switches are closed and opened in a sequence such that voltage is applied to converter elements symmetrically within a duty cycle to reduce total harmonic distortion ("THD"). SVC control may use conduction angle and/or variable input voltage to control power flow.

AVC control is a variation of SVC and ADC and controls three variables. AVC control may be used with LCL converter topologies. AVC is described in U.S. patent application Ser. No. 13/642,925 titled "METHOD AND APPARATUS FOR CONTROLLING LCL CONVERTERS USING ASYMMETRIC VOLTAGE CANCELLATION TECHNIQUES" for Hunter Wu, et al. filed Oct. 23, 2012, which is incorporated herein by reference in its entirety. Other duty cycle control techniques may also be used where at least a portion of operation of the converter 104 results in the first switch in a pair of switches having a power switching loss that is greater than the switching power loss of the second switch in the pair of switches.

The apparatus 200 includes a switch rotation module 204 that changes the switching sequence of the two or more pairs of switches from the first switching sequence to a second switching sequence so that the second switch of a pair of switches has a higher switching power loss than the first switch of the pair of switches during the second switching sequence. In one embodiment, the converter 104 topology is such that the two or more pairs of switches are arranged symmetrically so that choosing which pair of switches is chosen to close first is an arbitrary decision.

In certain modes of operation, by choosing a particular switching order, the first switch in a pair of switches has more losses than the second switch in the pair of switches and by merely choosing a different switching order and taking advantage of the symmetrical nature of the switches allows the switch rotation module 204 to change the switching sequence so that for the second sequence, the second switch of a pair of switches has a lower switching power loss than the first switch of the pair of switches. The switch rotation module 204 typically allows switch wear leveling.

In one embodiment, the switch rotation module 204 changes the switching sequence at a convenient point in time when changing the switching sequence will not disrupt operation of the converter 104, such as upon startup. In another embodiment, the switch rotation module 204 temporarily suspends switching to allow changing of the switching sequence. For example, the converter 104 may include components to allow a minor interruption in switching, such as a holdup capacitor, or the load 106 may tolerate a minor disruption of power flow.

Figure 3:
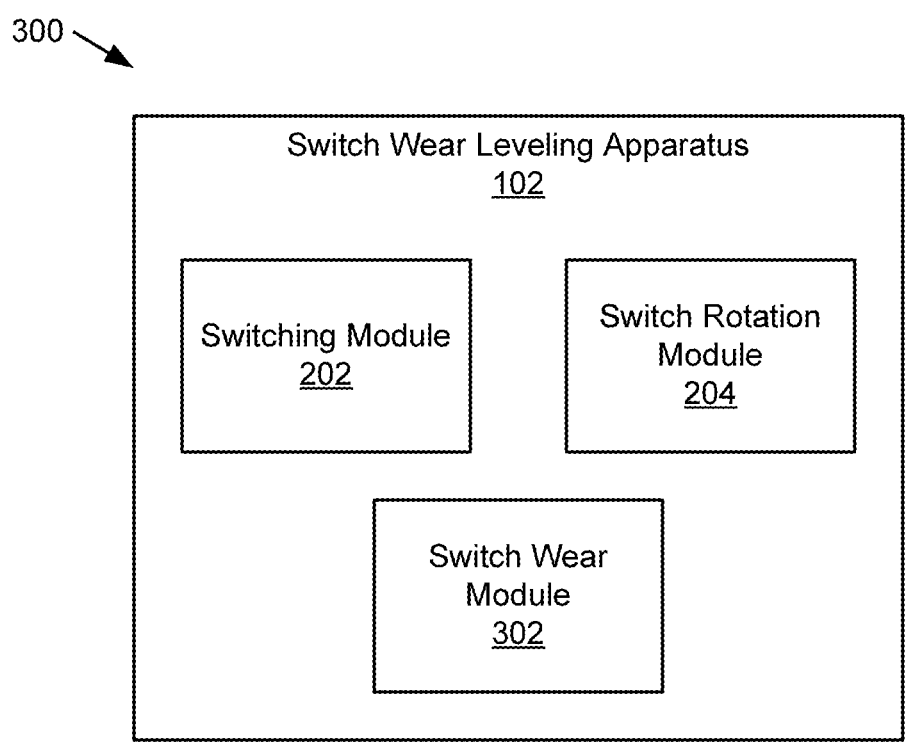
FIG. 3 is a schematic block diagram illustrating another embodiment of an apparatus for switch wear leveling.

FIG. 3 is a schematic block diagram illustrating another embodiment of an apparatus 300 for switch wear leveling. The apparatus 300 includes another embodiment of the switch wear leveling apparatus 102 with a switching module 202 and a switch rotation module 204 which are substantially similar to those described in relation to the apparatus 200 of FIG. 2. The apparatus 300 also includes a switch wear module 302, which is described below.

The apparatus 300, includes a switch wear module 302 that tracks switching sequences and the switch rotation module 204 changes the switching sequence based on tracking of the switching sequences. In one embodiment, the switch wear module 302 tracks switching sequences by tracking an amount of time switching using each switching sequence. For example, if the switch wear module 302 determines that the first switching sequence is used for 100 hours and the second switch sequence has been used for 50 hours, the switch rotation module 204 may change to the second sequence. In another embodiment, the switch wear module 302 tracks the switching sequences by tracking an amount of switching cycles for each switching sequence. For example, if the switch wear module 302 determines that the first switching sequence is used for 1 million switching cycles and the second switch sequence has been used for 500 thousand switching cycles, the switch rotation module 204 may change to the second sequence.

In one embodiment, the switch rotation module 204 uses tracking of the switching sequences to switch between switching sequences to balance an amount of switching for each switching sequence. Where the switch wear module 302 determines that the first switching sequence is used more than the second switching sequence, the switch rotation module 204 may use the second switching sequence to switch to attempt to even out usage of the first and second switching sequences for switch wear leveling.

Figure 4A:
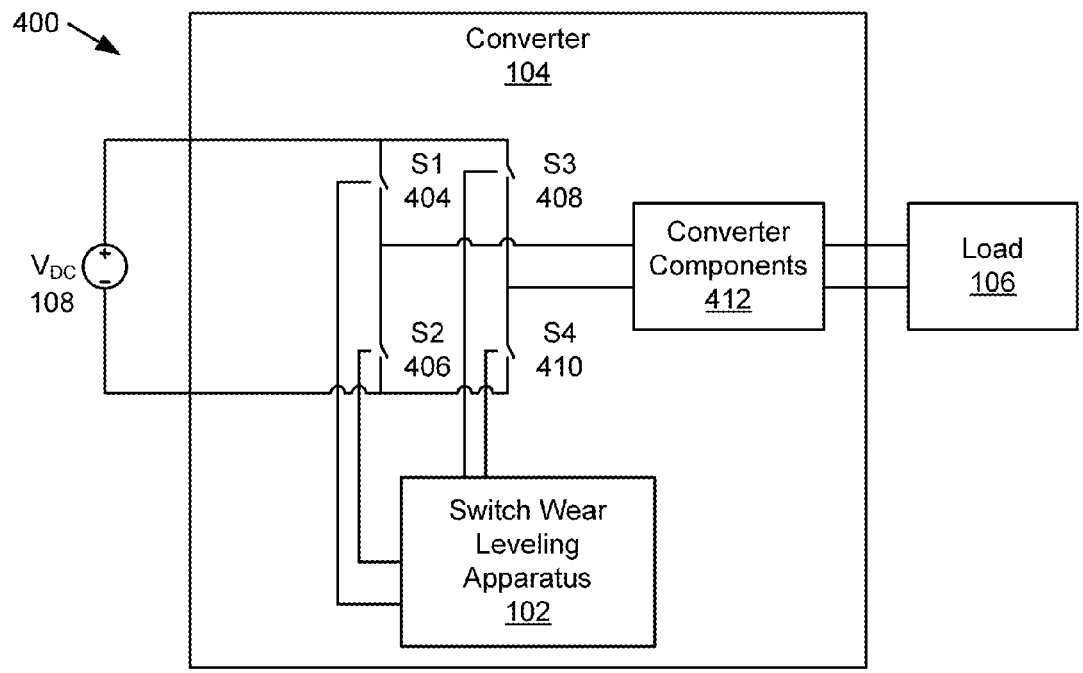
FIG. 4A is a schematic block diagram illustrating one embodiment of an apparatus for switch wear leveling with a voltage driven H-bridge.

FIG. 4A is a schematic block diagram illustrating one embodiment of an apparatus 400 for switch wear leveling with a voltage driven H-bridge. The apparatus 400 includes a converter 104 with a switch wear leveling apparatus 102 along with switches S1 404, S2 406, S3 408, and S4 410 and also other converter components 412, a load 106 and a DC voltage source 108, which are described below. The apparatus 400 depicted in FIG. 4A is one embodiment of the system 100 depicted in FIG. 1.

FIG. 4A depicts switches as simple open/close devices, but one of skill in the art will recognize that the symbol used for the switches S1 404, S2 406, S3 408, and S4 410 may include semiconductor devices, electromechanical devices, combinations of switches, and the like. In one embodiment, a switch pair may be switches S1 404 and S4 410 and another switch pair may be switches S2 406 and S3 408. The first switch sequence may first operate switches S1 404 and S4 410 to connect the DC voltage source 108 to the converter components 412 and then may operate switches S2 406 and S3 408 to connect the DC voltage source 108 to the converter components 412 with a polarity opposite of when switches S1 404 and S4 410 are closed. Note that some switching sequences close switches of a pair of switches at different times rather than at the same time. An example of a switching sequence that does not close switches of a pair of switches at the same time is the SVC control method. Other duty cycle control techniques may have different switching sequences and different timing for operation of each switch.

The apparatus 300 includes converter components 412, which are typically inductors, capacitors, diodes, switches, transformers, snubbers, and the like and are arranges to define a particular topology. The load 106 and DC voltage source 108 are substantially similar to those described above in relation to the system 100 depicted in FIG. 1.

Figure 4B:
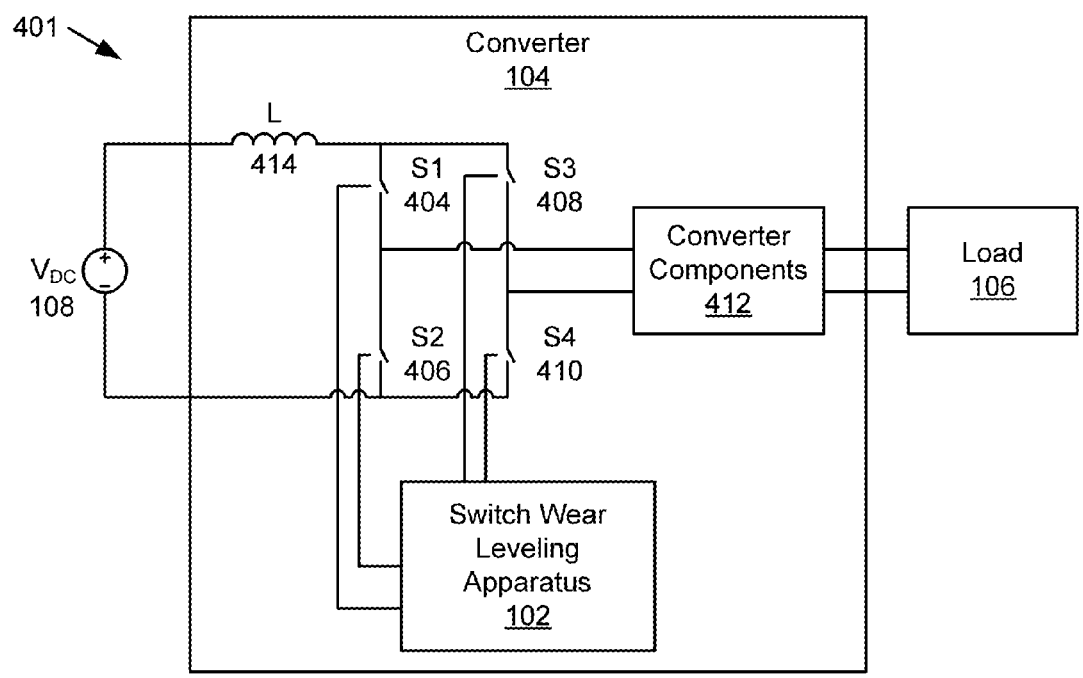
FIG. 4B is a schematic block diagram illustrating one embodiment of an apparatus for switch wear leveling with a current driven H-bridge.

FIG. 4B is a schematic block diagram illustrating one embodiment of an apparatus 401 for switch wear leveling with a current driven H-bridge. The apparatus 401 includes a switch wear leveling apparatus 102 along with switches S1 404, S2 406, S3 408, and S4 410 and also other converter components 412, a load 106 and a DC voltage source 108, which are substantially similar to those described above in relation to the apparatus 400 of FIG. 4A. The apparatus 401 also includes an inductor 414 consistent with a current driven H-bridge converter topology. The duty cycle control technique used by the switching module 202 to control the switches S1 404, S2 406, S3 408, and S4 410 as well as the topology of the converter components 412 may be different than those of the voltage driven H-bridge topology of the apparatus 400 of FIG. 4A.

Figure 4C:
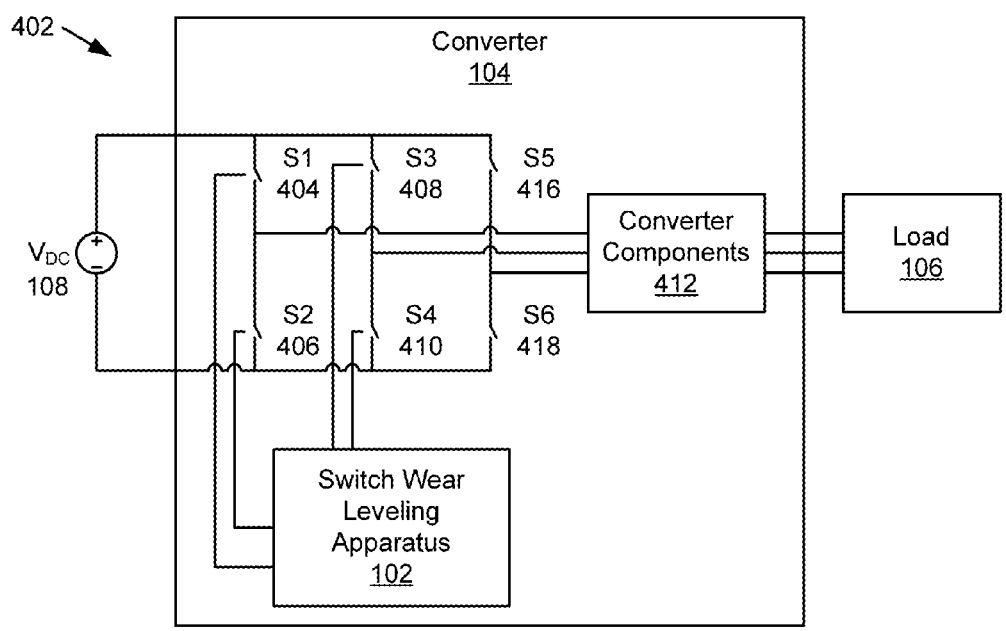
FIG. 4C is a schematic block diagram illustrating one embodiment of an apparatus for switch wear leveling with a three-phase voltage driven H-bridge.

FIG. 4C is a schematic block diagram illustrating one embodiment of an apparatus 402 for switch wear leveling with a three-phase voltage driven H-bridge. The apparatus 401 includes a switch wear leveling apparatus 102 along with switches S1 404, S2 406, S3 408, S4 410, S5 416, and S6 418 and also other converter components 412, a load 106 and a DC voltage source 108, which are substantially similar to those described above in relation to the apparatus 400 of FIG. 4A. The converter components 412, in one embodiment, are configured in a three-phase topology and feed a three phase load 106. The duty cycle control technique used by the switching module 202 to control the switches S1 404, S2 406, S3 408, S4 410, S5 416, and S6 418 as well as the topology of the converter components 412 may be different than those of the voltage driven H-bridge topology of the apparatus 400 of FIG. 4A. The converter 104 includes three pairs of switches and a switching sequence may arbitrarily start with a particular switch. The switch rotation module 204 may change the switching sequence due to change which switches have a higher switching power loss than other switches for switch wear leveling.

Figure 5:
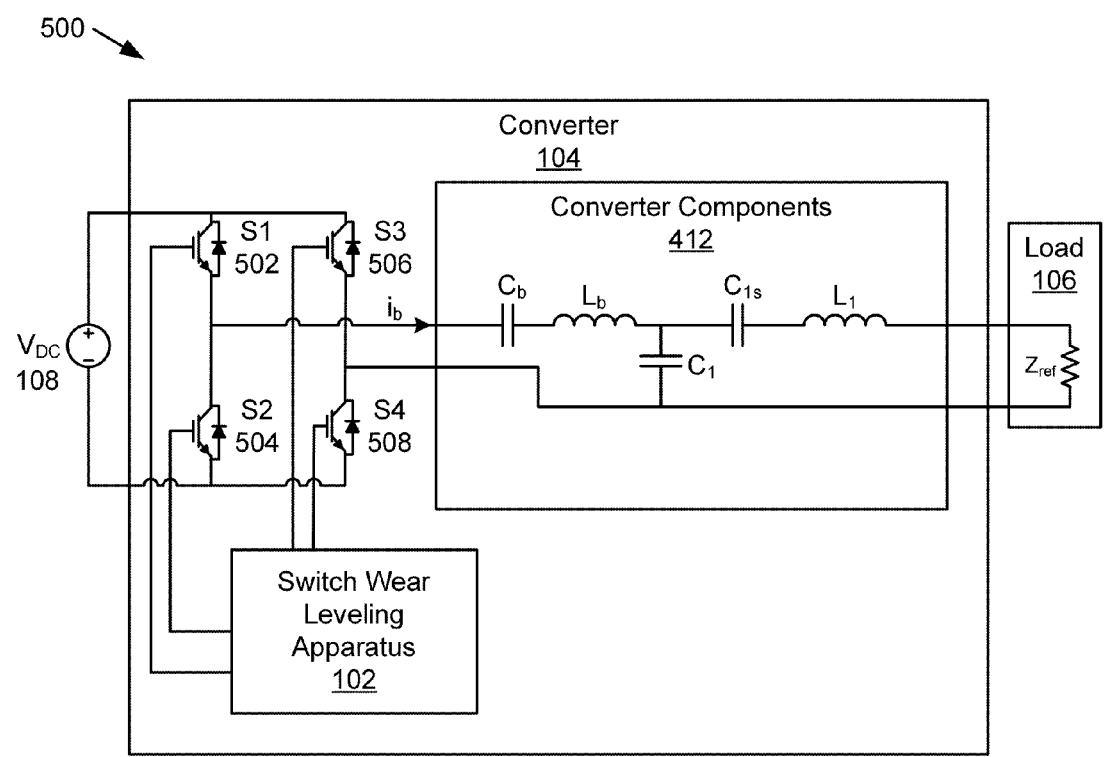
FIG. 5 is a schematic block diagram illustrating one embodiment of an apparatus for switch wear leveling with a voltage driven H-bridge LCL converter.

FIG. 5 is a schematic block diagram illustrating one embodiment of an apparatus 500 for switch wear leveling with a voltage driven H-bridge LCL converter. The apparatus 500 includes converter 104 with switch wear leveling apparatus 102, switches S1 502, S2 504, S3 506, and S4 508, and converter components 412. The switch wear leveling apparatus 102 is substantially similar to those described above. In the depicted embodiment, the converter components 412 are configured as an LCL converter and include capacitor $C_b$, inductor $L_b$, capacitor $C_1$, capacitor $C_{1s}$, and inductor $L_1$, in the configuration depicted in FIG. 5. Switches S1 502, S2 504, S3 506, and S4 508 are substantially similar to S1 404, S2 406, S3 408, and S4 410 of the apparatus 400 and FIG. 4A. Switches S1 502, S2 504, S3 506, and S4 508, in one embodiment, are IGBT's. In one embodiment, the inductor current for inductor $L_b$ flows in the direction as shown (i.e. $i_b$).

In one embodiment, switch S1 502 and switch S4 508 are a pair of switches and switch S2 504 and S3 506 are a pair of switches. In certain modes of operation inductor current $i_b$ is such that the switching power loss of switch S1 502 is higher than the switching power loss of switch S4 508 and the switching power loss of switch S2 504 is higher than the switching power loss of switch S3 506.

Figure 6:
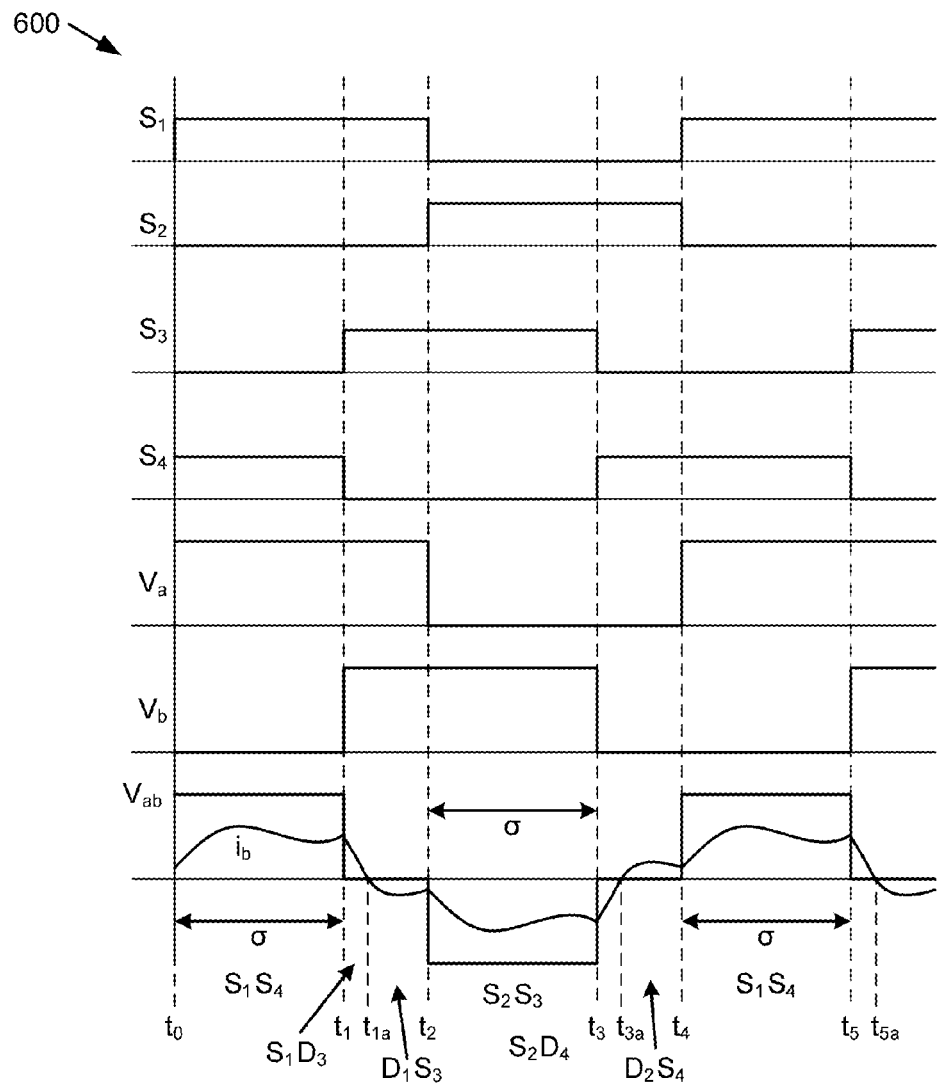
FIG. 6 is a timing diagram for an H-bridge converter.

FIG. 6 is a timing diagram 600 for an H-bridge converter. In one embodiment, the H-bridge converter is the LCL converter in the apparatus 500 of FIG. 5. The timing diagram 600, in one embodiment, is a mode of operation where switches S1 502 and switch S2 504 include switching power losses higher than switches S3 506 and S4 508. At time $t_0$, switch S4 508 is closed and switches S1 502, S2 504, and S3 506, are initially open. Also at time $t_0$, inductor current $i_b$ is positive. When switch S1 502 closes, inductor current $i_b$ is positive. For the inductor current $i_b$ to be positive, current is flowing through the body diode of switch S2 504. Since switch S4 508 is closed, voltage across switch S2 504 is substantially zero so the voltage across switch S1 502 is substantially equal to the DC voltage source 108. Switch S1 502 typically has a significant switching power loss when switch S1 502 closes with a significant amount of voltage across the switch. In one embodiment, switching of S1 502 with in this condition is called capacitive switching.

At time $t_1$, switch S4 508 opens and then switch S3 506 closes. The inductor current $i_b$ is positive at time $t_1$ and continues to flow before and after time $t_1$. In one embodiment, the inductor current $i_b$ continues to flow because of inductance in the converter components 412, such as inductance $L_b$. When switch S4 508 opens, for the inductor current $i_b$ to continue to flow, the inductor current $i_b$ flows through the body diode of switch S3 506. At time $t_1$ when switch S4 508 opens, voltage across switch S4 508 is substantially zero so that switch S4 508 opens in quasi-zero voltage switching condition. In one embodiment, when a switch opens in this quasi-zero voltage switching condition, the switching is called inductive switching. When a switch opens in a quasi-zero voltage switching condition, typically switching power losses are low. When current starts to flow through the body diode of switch S3 506, voltage across switch S3 506 is substantially zero so that when switch S3 506 closes the switching power losses of switch S3 506 are low.

At time $t_{1a}$ the inductor current $i_b$ becomes negative. The inductor current $i_b$ continues to be negative at time $t_2$ when switch S1 502 opens and switch S2 504 closes. Just before switch S1 502 opens, current is flowing through the body diode of switch S1 502. When switch S2 504 closes, the voltage across switch S2 504 is high and is approximately the voltage of the DC voltage source 108. Closing switch S2 504 with a high voltage across switch S2 504 causes relatively high switching power losses. At time $t_3$ the inductor current $i_b$ continues to be negative and switch S3 506 opens and switch S4 508 closes. Again the inductor current $i_b$ does not go to zero instantaneously so the inductor current $i_b$ flows in a negative direction through switch S3 506 until switch S3 506 opens and the inductor current $i_b$ flows through the body diode of switch S4 508. While current is flowing through the body diode of switch S4 508 the voltage across switch S4 508 is low so that when switch S4 508 closes, the switching power losses are low.

At time $t_3a$ inductor current $i_b$ changes from negative to positive. At time $t_4$, switch S2 504 opens. Inductor current $i_b$ continues to flow in a positive direction through the body diode switch S2 504. As is the case at time $t_0$, voltage across switch S1 502 is substantial when switch S1 502 closes and the inductor current $i_b$ is positive so the switching power losses of switch S1 502 are high compared to the switching power losses of switch S4 508. If the switching sequence shown in FIG. 6 continues, the switching power losses for switches S1 502 and S2 504 typically are higher than switches S3 506 and S4 508. However, the switching sequence depicted in FIG. 6 arbitrarily starts at time $t_0$ with switch S4 508 closed and switch S1 502 closes at time $t_0$.

The switching sequence of FIG. 6 may be called the first switching sequence. The switching sequence may be altered by reassigning switch S1 502 to be switch S3 506 and switch S3 506 to be switch S1 502. Similarly switch S2 504 may be reassigned to be switch S4 508 and switch S4 508 may be reassigned to be switch S2 504. This altered switching sequence may be called the second switching sequence. In the second switching sequence the switches in FIG. 5 on the right have higher switching power losses than the switches on the left.

In one embodiment the switch rotation module 204 changes the switching sequence from the first switching sequence to the second switching sequence. In another embodiment, the switch rotation module 204 changes the switching sequence from the second switching sequence to the first switching sequence. If the switch rotation module 204 regularly switches the switching sequence between the first switching sequence and the second switching sequence, the switching power losses of the switches will be more evenly distributed among the switches and the switches may wear more evenly. The switch wear module 302 may track the switching sequence and how long, how many cycles, etc. for each of the first switching sequence and the second switching sequence so that the switch rotation module 204 can manage switch wear leveling and can switch between the first switching sequence and the second switching sequence to balance how long the switches S1 502, S2 504, S3 506, and S4 508 operate in each switching sequence.

Where the converter 104 operates in different modes so switching power loss varies, in one embodiment, the switch wear module 302 may track each mode. For example, one mode of operation may include quasi-zero voltage switching for all of the switches S1 502, S2 504, S3 506, and S4 508 and another mode of operation may include a mode like that described with regard to FIG. 6. The switch wear module 302 may track how long the converter 104 operates in each of the two modes. The switch rotation module 204 may take into account how long the converter 104 operates in each mode in addition to how long or how many cycles the converter 104 operates with the first switching sequence and the second switching sequence.

Figure 7:
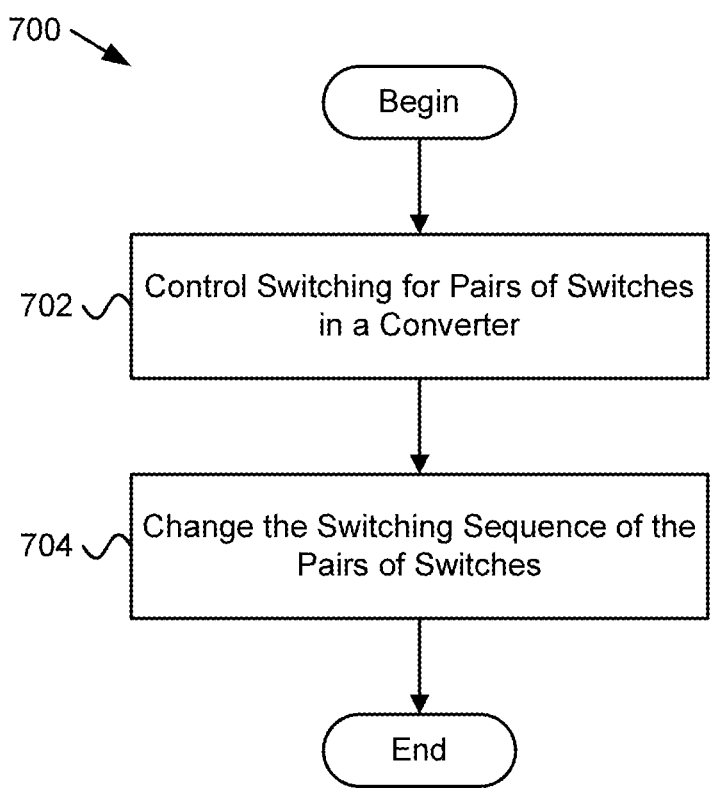
FIG. 7 is a schematic flow chart diagram illustrating one embodiment of a method for switch wear leveling in accordance with the present invention.

FIG. 7 is a schematic flow chart diagram illustrating one embodiment of a method 700 for switch wear leveling in accordance with the present invention. The method 700 begins and controls 702 switching for two or more pairs of switches (i.e. S1 502/S4 508 and S2 504/S3 506 or S1 404/S4 410 and S2 406/S3 408) in a switching power converter 104. In one embodiment, the switching module 202 control each of the two or more pairs of switches closed and open based on a duty cycle control technique, such as SVC, AVC, and the like. The switching module 202 closes and opens each switch of the two or more pairs of switches in a switching sequence. The two or more pairs of switches (i.e. S1 502/S4 508 and S2 504/S3 506 or S1 404/S4 410 and S2 406/S3 408) connect to a positive terminal and a negative terminal of a direct current DC voltage source 108. At least a portion of the operation of the converter 104, for a first switching sequence a first switch of a pair of switches (i.e. S1 502/S4 508 or S1 404/S4 410) has a higher switching power loss than a second switch of the pair of switches (i.e. S2 504/S3 506 or S2 406/S3 408).

The method 700 changes 704 the switching sequence of the pairs of switches (i.e. S1 502/S4 508 and S2 504/S3 506 or S1 404/S4 410 and S2 406/S3 408) from the first switching sequence to a second switching sequence. During the second switching sequence, the second switch of a pair of switches has a higher switching power loss than the first switch of the pair of switches during the second switching sequence. For example, the second switching sequence may operate as shown in FIG. 6 except that switch S1 502 and switch S3 506 are interchanged in operation, and switch S2 504 and switch S4 508 are interchanged in operation. For instance, the second switching sequence may begin with switch S2 504 closed and switch S3 506 closing at time $t_0$. At time T1, switch S2 504 opens and switch S1 502 closes. At time T2, switch S3 506 opens and switch S4 508 closes. At time T3, switch S1 502 opens and switch S2 504 closes. For the second switching sequence switches S3 506 and S4 508 have a higher switching loss then switches S1 502 and S2 504. The switch rotation module 204 may then switch the switching sequence to the first switching sequence at a later time.

Figure 8:
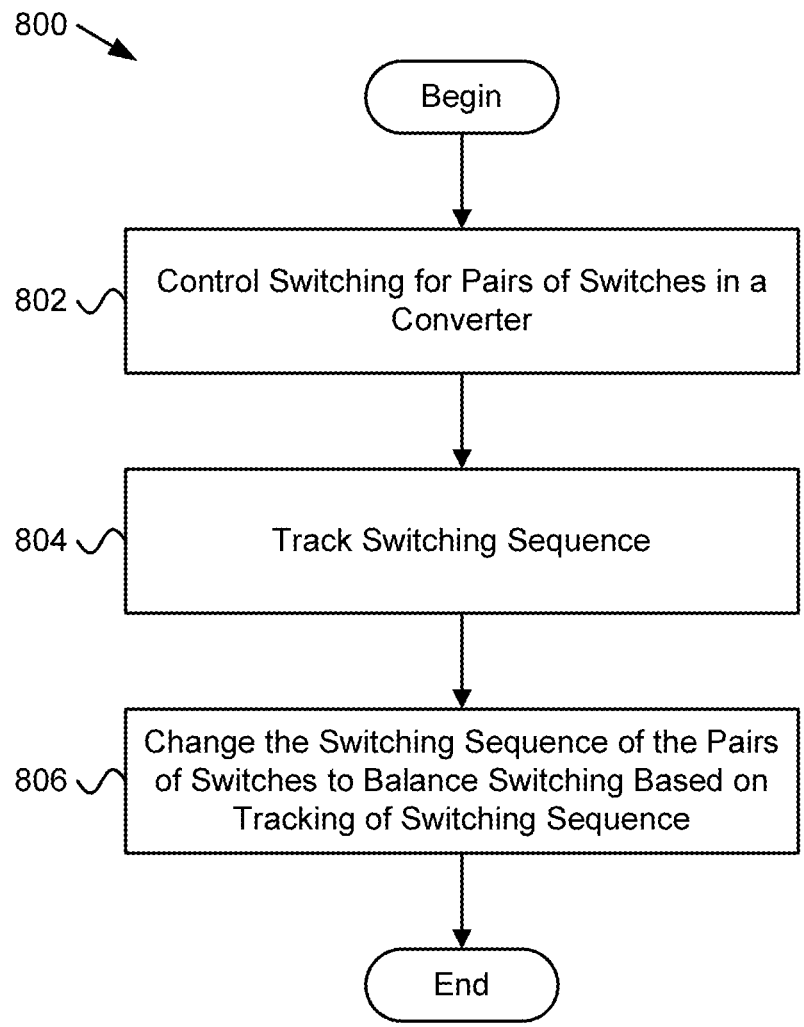
FIG. 8 is a schematic flow chart diagram illustrating one embodiment of a method for switch wear leveling in accordance with the present invention.

FIG. 8 is a schematic flow chart diagram illustrating another embodiment of a method 800 for switch wear leveling in accordance with the present invention. The method 800 begins and controls 802 switching for two or more pairs of switches (i.e. S1 502/S4 508 and S2 504/S3 506 or S1 404/S4 410 and S2 406/S3 408) in a switching power converter 104, as in the method 700 of FIG. 7. The method 800 tracks 804 the switching sequence. For example the switch tracking module 302 may track the switching sequence. The method 800 may track 804 the switching sequence by tracking an amount of time that a first switching sequence and the second switching sequence are used, or may track 804 the switching sequence by tracking an amount of switching cycles of the first switching sequence and the second switching sequence. The method 800 changes 804 the switching sequence of the pairs of switches (i.e. S1 502/S4 508 and S2 504/S3 506 or S1 404/S4 410 and S2 406/S3 408) from the first switching sequence to a second switching sequence, and the method 800 ends. As with the method 700 of FIG. 7, during the second switching sequence, the second switch of a pair of switches has a higher switching power loss than the first switch of the pair of switches during the second switching sequence.

I. Primary AC to DC Power Factor Stage

Figure 9:
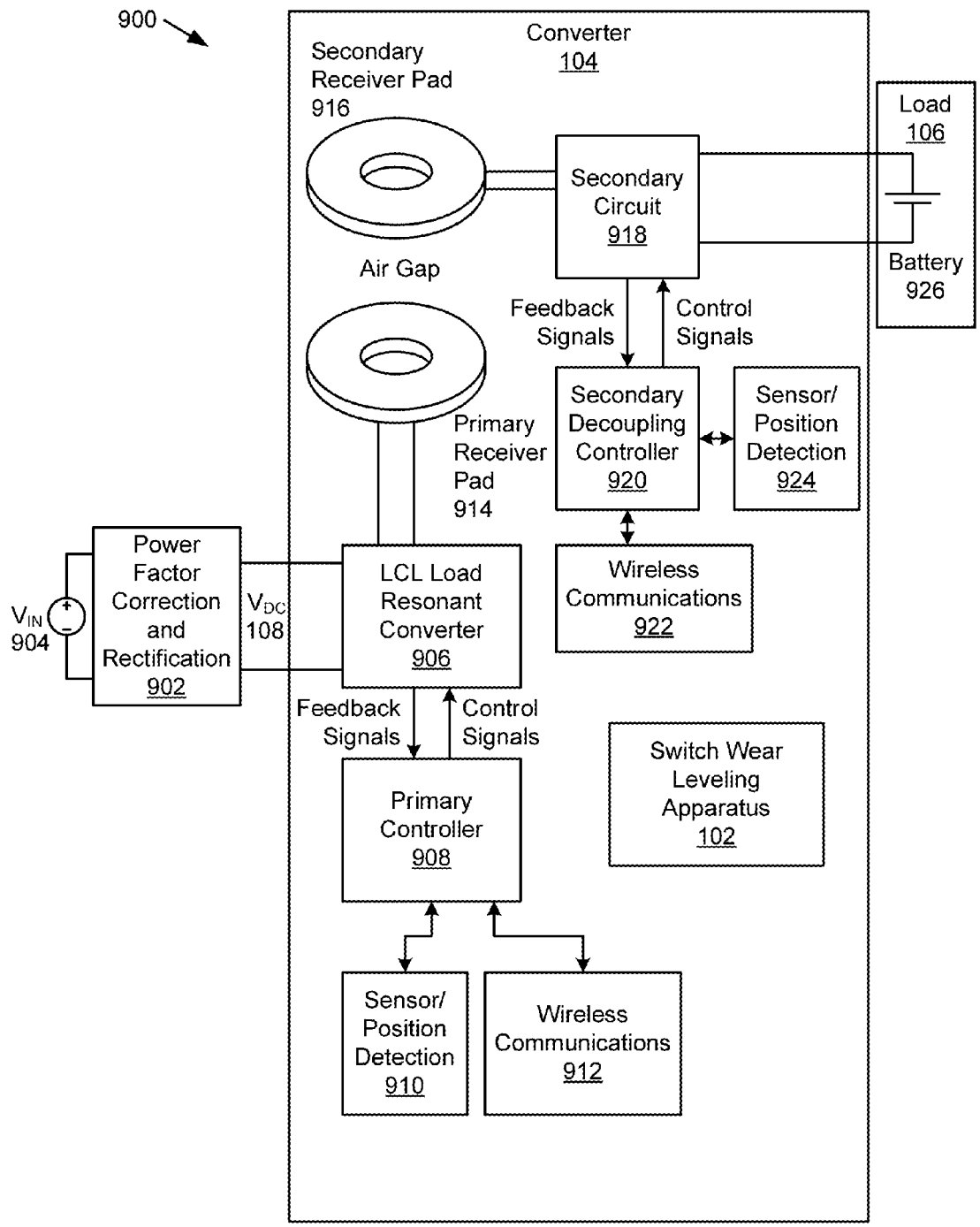
FIG. 9 illustrates a block diagram of an exemplary inductive power transfer charging system.

FIG. 9 illustrates a block diagram of an exemplary inductive power transfer ("IPT") charging system 900. The IPT system 900 of FIG. 9, is one embodiment of a system 100 that may include a switch wear leveling apparatus 102 in a converter 104. The IPT systems 900 described herein may include a power factor stage 902, such as a primary AC to DC power factor stage, fed from a voltage source 904, such as from a utility power grid. In some embodiments, a primary AC-DC converter stage may be configured to convert grid-level voltages to a DC voltage 108, such as a DC bus voltage, for a primary tuned resonant converter. A DC output voltage with very low output ripple is preferred to large ripple systems in order to prevent an amplitude modulated signal appearing in the wireless inductive power transfer system which can cause reduced efficiency and require additional complexity.

In some embodiments, active power factor correction ("PFC") in AC-DC converters may help to ensure the grid voltage and current are closely in phase. PFC may reduce overall grid current requirements and typically reduces grid harmonic. Grid power supply companies typically have certain harmonic requirements for attached industrial equipment. Often grid power supply companies also charge extra for power to industrial equipment that exhibits low power factor.

In the IPT system 900 described herein, one or more suitable stages may be used for PFC. For example, one or more commercial off-the-shelf ("COTS") AC-DC high efficiency power factor corrected converters may be used. The grid voltage 904 may be a wide range of voltage inputs including, for example, single-phase 240 VAC, three-phase 208 VAC, or three-phase 480 VAC. In another embodiment, a 400 VDC output may be used for this stage and 400 VDC is typically an efficient output for a nominal grid input of single-phase 240 VAC grid input. A single-phase 240 VAC grid voltage with a 30 A circuit (suitable for a 5 kW IPT system) is commonplace in the United States even in areas that do not support industrial three-phase voltages, and may be used with the IPT system 900.

For the IPT system 900, the converter 104 includes an LCL load resonant converter 906 controlled by a primary controller 908 that may receive feedback signals from and may send control signals to the LCL load resonant converter 906. The primary controller 908 may receive information from alignment sensors for position detection 910 and may communicate over wireless communications 912. The LCL load resonant converter 906 is coupled to a primary receiver pad 914 coupled to a secondary receiver pad 916 over an air gap. The secondary receiver pad 916 is connected to a parallel decoupling pickup shown as a secondary circuit 918 controlled by a secondary decoupling controller 920 that may receive feedback signals and may send control signals to the secondary circuit 918. The secondary decoupling controller 920 may also communicate with alignment sensors for position detection 924 for control and may communicate wirelessly 922. The secondary circuit 918 may connect to a load 106, such as a battery 926 and may charge the battery 926. The battery 926 may provide power to another load, such as a motor controller (not shown). The secondary receiver pad 916, secondary circuit 918, secondary decoupling controller 920 and load 106 may be located in a vehicle.

II. Primary Tuned Resonant Converter

The IPT systems 900 described herein may contain a primary tuned resonant converter. In some embodiments, the LCL load resonant converter 906 shown in FIG. 19 may be used. The LCL load resonant converter 906 may include a switching section and an LCL tuning section. This converter may include the following advantages:

The inverter bridge typically only has to supply the real power required by the load 106 and any losses in the resonant tank. The high track currents are constrained to self-circulate in the resonant tank. For example, in most practical applications where $Q_1 > 1$ and $i_b < i_1$ (see FIG. 19), the switches have low conduction losses and a high converter efficiency may be achieved.

The output current is typically independent of load, making it a constant current source which may be ideal for IPT applications. The primary receiver pad current $i_1$ is typically only dependent on one control variable and hence the power output, or uncompensated power ("SU") in equation (2), is directly controlled.

To design the LCL load resonant converter, in one embodiment the reactance of each branch is tuned by the conventional equation in M. Borage et al, "Analysis and design of an LCL-T resonant converter as a constant-current power supply," *IEEE Transactions on Industrial Electronics*, vol. 52, pp. 1547-1554, 2005:

$$X_1 = \omega L_b = \frac{1}{\omega C_1} = \omega L_1 - \frac{1}{\omega C_{1s}} = \omega L_{1eq} \qquad (2)$$

Here $C_{1s}$ is a series tuning capacitor to reduce the reactance of the pickup to a desired operating value. For this system, phase shift control or symmetric voltage cancellation ("SVC") is used to directly control the track current ($i_1$) with one control variable ($\sigma$). SVC is described in more detail in H. H. Wu et al, "Design of Symmetric Voltage Cancellation Control for LCL converters in Inductive Power Transfer Systems," in *IEEE International Electric Machines & Drives Conference* ("*IEMDC*"), 2011, 2011, pp. 866-871, which is incorporated herein by reference. To determine the track current under SVC, and assuming fundamental mode analysis, the following equation may be used:

$$i_1 = \frac{2\sqrt{2}\, V_{dc}}{\pi X_1} \sin\left(\frac{\sigma}{2}\right) \qquad (3)$$

The maximum obtainable track current can be determined when δ is set to 180°. For the LCL converter, the specifications in Table I are calculated according to the design equations. The reflected impedance of a fully tuned parallel resonant tank is given by:

$$Z_r = \frac{\omega^2 M^2}{Z_2} = \omega \frac{M^2}{L_{2eq}}(Q_{2v} - 1 \cdot j) \qquad (4)$$

It should be noted from (4) that a constant reflected capacitive reactance is in series with the track inductor and one method to directly compensate for this in the design (see H. H. Wu et al, "Design of Symmetric Voltage Cancellation Control for LCL converters in Inductive Power Transfer Systems," in *IEEE International Electric Machines & Drives Conference* ("*IEMDC*"), 2011, 2011, pp. 866-871.) is to short the secondary pickup inductance with its series tuning capacitor. This gives a new primary operating range of inductance for a targeted vertical height range dependent on the mutual inductance of the magnetics.

As the coupling changes in the system, a complex phenomenon of variations in both $Z_r$ and equivalent $L_1$ will occur. This will cause the bridge current $i_b$ to increase beyond its nominal. In addition, $i_b$ is inversely proportional to $M_2$, which is dependent on the loading condition on the secondary side. Hence, $i_b$ is:

$$i_b = \frac{(V_{ab})_1}{j\omega\Delta L_1 + Z_r} \quad (5)$$

Because the system may be allowed to change its coupling by 100% ($k_{max}=200\% k_{min}$) or more, the maximum $i_b$ in some embodiments may be designed for at least 2 times the minimum $i_b$. With variations in the primary self-inductance, the bridge current inductor must be sized for associated maximum currents as determined by the coupling range. The system design parameters as shown in Table I are exemplary parameters for a system capable of handling a change in coupling of 2 times. The system may be modified to accommodate a larger range of coupling such as a variance upwards of about 3 or about 4 times the minimum coupling.

In some embodiments, a 5 kW output capable wireless inductive power transfer system may be designed and implemented demonstrating an air gap of 165 mm to 265 mm and an overall system efficiency >90% under full load across the entire conical volume of operation. For the LCL Converter, Table I shows the exemplary and chosen values for each of the described parameters. A frequency of 20 kHz was also chosen to be within the capabilities of standard IGBT switch technology for hard switching applications.

TABLE I

Design Parameters for LCL Converter.

Figure 10:
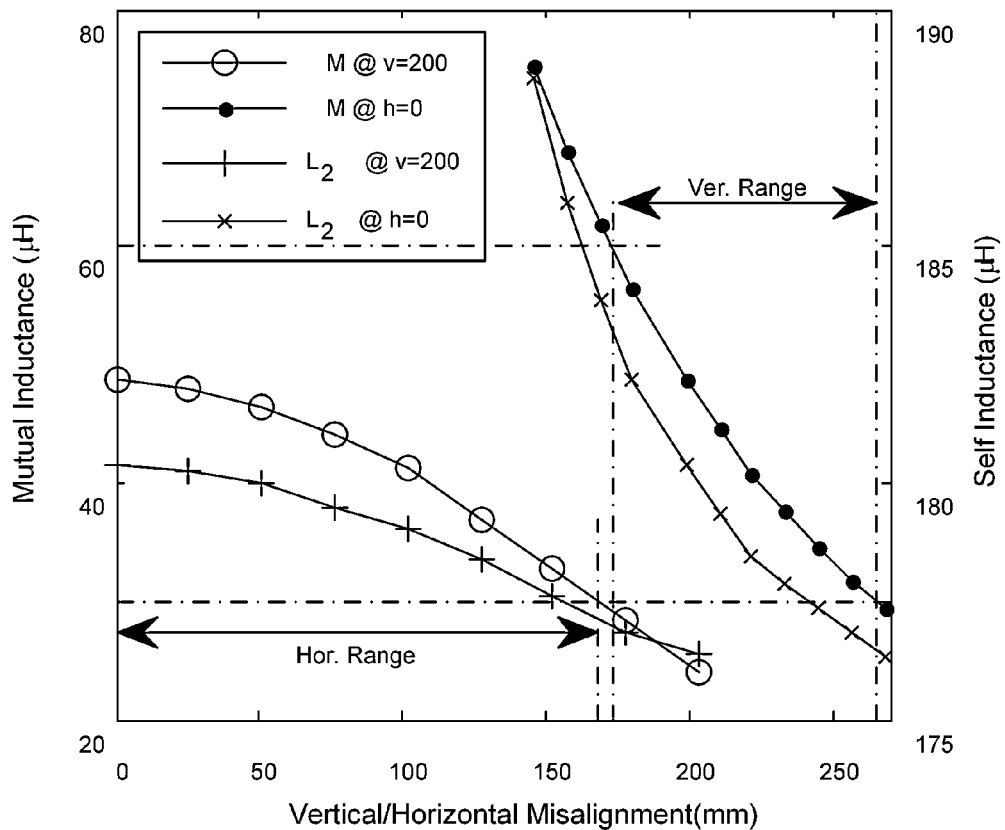
FIG. 10 illustrates misalignment conditions for vertical and horizontal misalignment. h=0 trend represents the profile of vertical misalignment under zero horizontal offset. v=200 trend represents the profile of horizontal misalignment under 200 mm of height separation.

| Parameter | Value | Parameter | Value |
|---|---|---|---|
| $V_{dc}$ | 400 V | $C_{1s}$ | 680.73 nF |
| $X_1$ | 9 Ω | $L_1$ (FIG. 10) | 177-188 µH |
| $i_{1\_max}$ | 40 A | $L_{1\_short}$ | 161-172 µH |
| $L_b$ | 71.62 µH | Switch | IRG7PH42UPBF |
| $C_1$ | 884.19 nF | Diode | RHRG75120 |
| ω | 1.257 × 10⁵ rad/s (f = 20 kHz) | | |

A. Switch and Diode Selection of the Switching Section

After the topology and control strategy is chosen for the primary converter, the semiconductor devices may be selected next. Any suitable semiconductor device capable of performing the functions described herein may be used. Exemplary semiconductor devices include the International Rectifier IGBT IRG7PH42UPBF discrete device, other discrete or module-based Insulated Gate Bipolar Transistors ("IGBT"), other discrete or module-based Metal Oxide Field Effect Transistors ("MOSFET"), or similar technologies including Silicon Carbide ("SiC") or Gallium Nitride ("GaN") type semiconductor devices.

Figure 12:
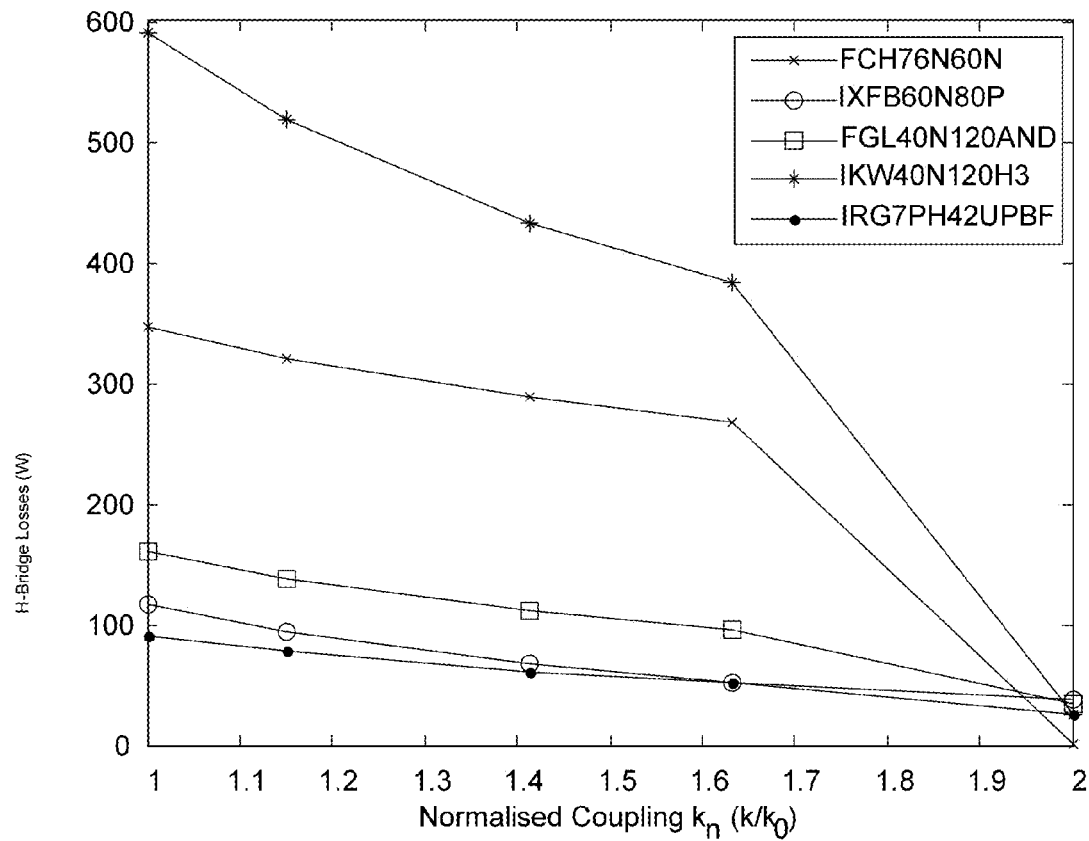
FIG. 12 illustrates comparison of losses for a selection of switches for H-bridge.

To evaluate preferred semiconductor devices, a range of power IGBT and MOSFET semiconductors may be included in a comparison. According to one design criteria, these devices need a breakdown voltage of at least 800 V to be deemed reliable when being hard switched in an H-bridge environment at 400 VDC. In addition, the performance of the system over a wide range of coupling conditions may be simulated to compare the performance because the point of best operation may not result in a reasonable result when the pad height is allowed to vary with a coupling coefficient change of 100%. FIG. 12 shows the losses of the selected power devices over the whole range of coupling conditions. It can be seen that International Rectifier IGBT IRG7PH42UPBF coupled with a very fast external diode (Fairchild RHRG75120) has better performance compared to majority of other devices especially power MOSFETs. Power MOSFETs often suffer from huge diode reverse recovery losses because of the internal body diodes in the MOSFET package. This may be especially true at lower coupling coefficients when the conduction angle is large.

Figure 13:
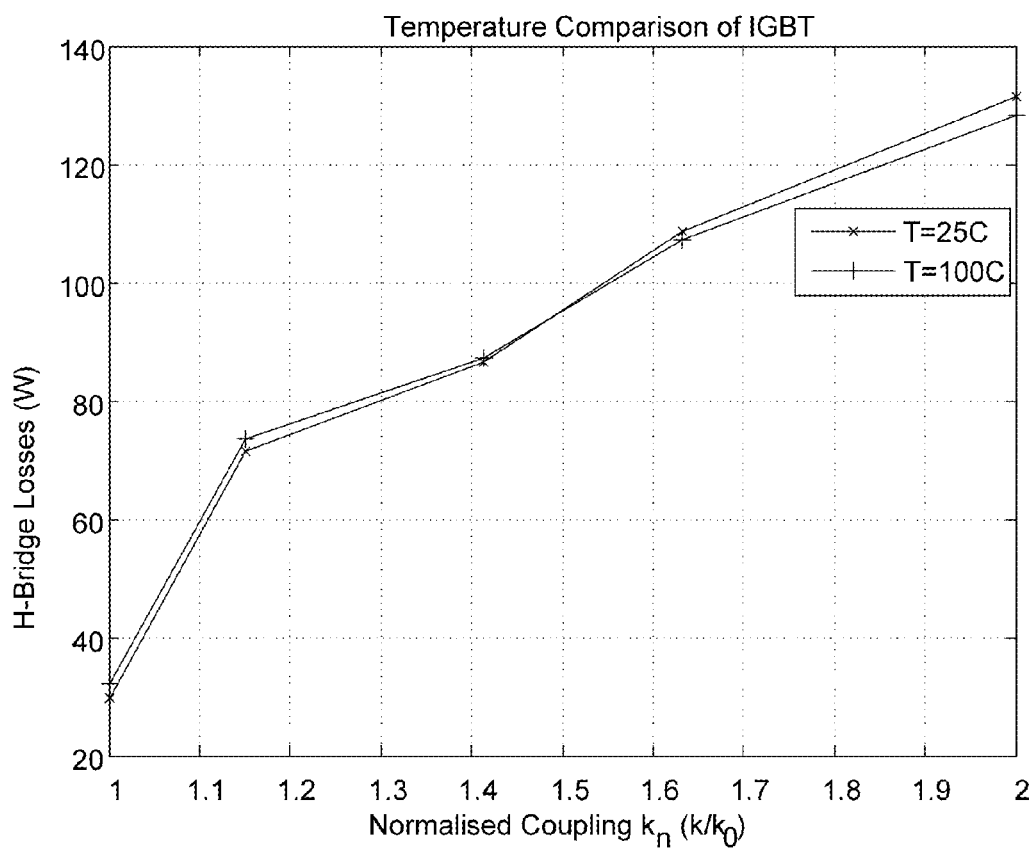
FIG. 13 illustrates the losses in the H-bridge for different temperatures for IRG7PH42UPBF.

The operating characteristics for the IRG7PH42UPBF IGBT at the two temperature extremes are shown in FIG. 13. It can be seen that the losses are much higher at weaker coupling in the H-bridge. In addition, the losses have a weak temperature dependence profile. Here the system's thermal control system, such as a heat sink, must accommodate the maximum power losses point of the graph which corresponds to a coupling of the worst case and a temperature of 100° C.

Any suitable thermal design may be used to control temperatures. Such designs should concentrate on removing substantially all or all heat from switches and/or diodes into suitably sized thermal control systems and/or heat sinks, such as, for example aluminum heat sinks. The heat sinks may be cooled by any suitable method, such as forced convection air cooling. For the primary electronics, the switches may be configured on the bottom of the printed circuit board in some embodiments such that the entire top of the switch housings may be thermally mated to a heat sink below the board. For reasons of electrical isolation, the switch top may be first mated to a heat spreader, such as an alumina heat spreader wafer (e.g. TO-225 footprint product). The wafer may then be mated to the heat sink. Each mated joint may include a ceramic loaded thermal paste, or functional alternative, for a low thermal resistance joint. In embodiments using an aluminum heat sink on the primary, the aluminum heat sink typically has a high thermal capacity and especially high surface area heat sink extrusion (exemplary part numbers include MM60167 available from M&M Metals or equivalent).

On the secondary circuit 918, in one embodiment suitable aluminum heat sinks may include a moderate capacity and surface area extrusion (exemplary part numbers include MM32647 available from M&M metals or equivalent). Both the primary and secondary electronics assemblies may include an air cooling fan directed down the heat sink fin channels. Suitable fans include fans that are 12 volt DC high capacity, low power, low noise designs consuming less than 5 watts. Model number D7025V12 from Sofasco or equivalent may be suitable.

Figure 14:
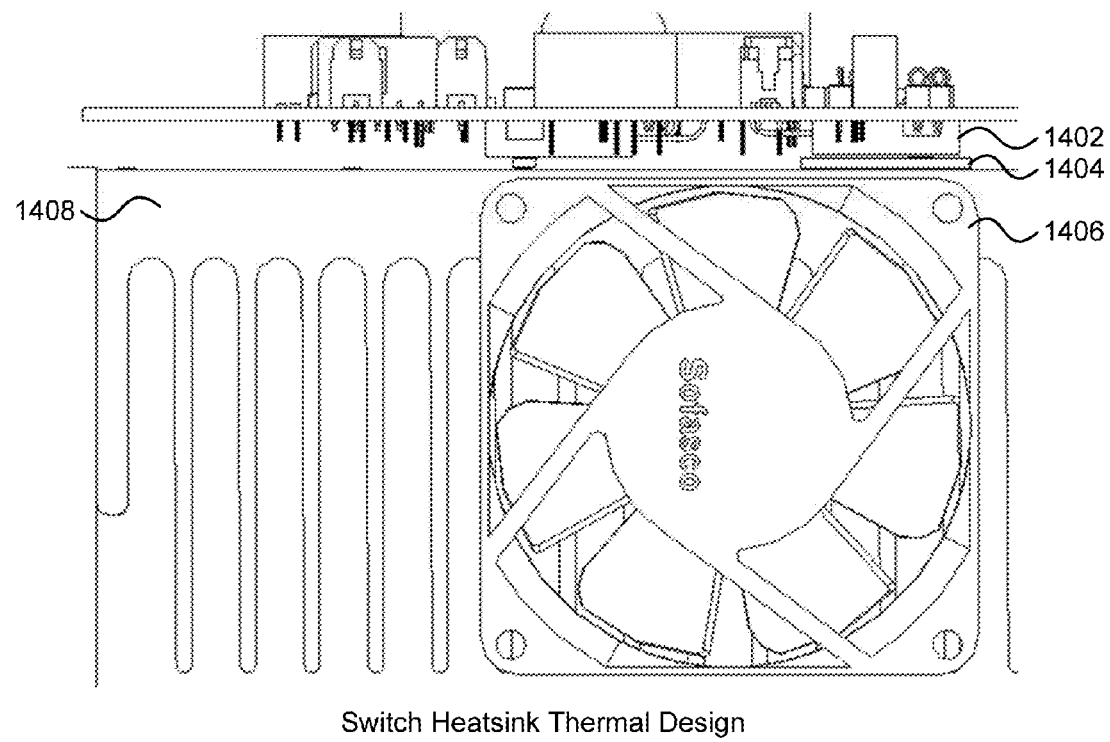
FIG. 14 illustrates an exemplary switch Heatsink Thermal Design.

FIG. 14 illustrates an exemplary thermal configuration for the primary electronics (the secondary configuration may be identical or similar). Thermal analysis indicates that the above-described exemplary design adequately controls the electronic component temperatures. Other suitable designs that control the electronic component temperatures may also be used. At an average power dissipation of 23 watts per switch and external diode, the temperature gradient on the heat sink is predicted to be less than about 0.8° C. and the heat sink temperature averages about 38° C. The case temperatures on the switches are less than about 45° C. and the junction temperatures are predicted to be less than about 85°

C. These temperatures tend to promote good electronics performance and long life for the components. Power dissipations in all other electronic components on the primary and secondary printed circuit boards has been kept low and copper trace area designed to be high in the printed circuit board design. As measured with an infrared thermal camera. The temperatures of all other components do not exceed about 60° C.

Item 1402 Example of a high dissipation component (switch or diode)

Item 1404 Alumina heat spreader wafer

Item 1406 Air cooling fan

Item 1408 Aluminum heat sink

B. Switch Gate Drive Circuitry of the Switching Section

Figure 15:
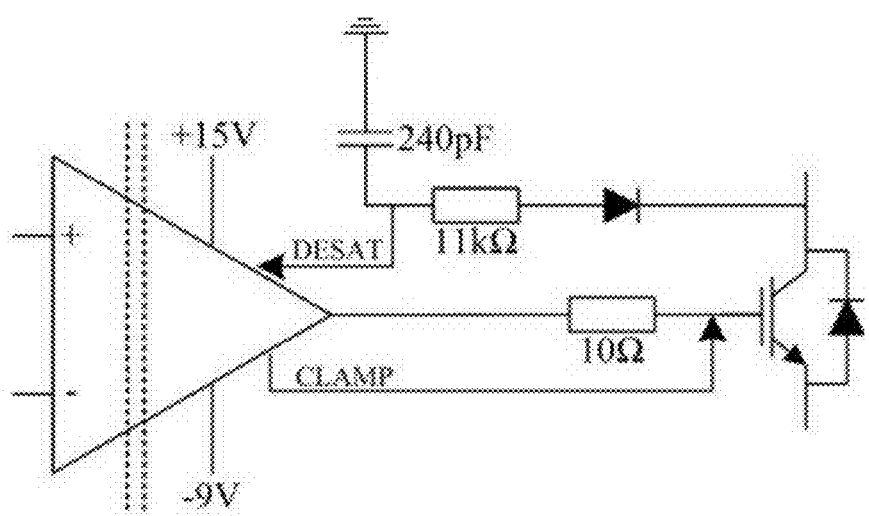
FIG. 15 illustrates an exemplary simplified IGBT Gate Drive Circuit.

In some embodiments, each switch (such as International Rectifier IRG7PH42UPBF IGBT) and diode pair (such as Fairchild RHRG75120 diode) in the full-bridge switching configuration is driven with a gate driver, such as an Infineon 1ED020112-F gate driver, as shown in FIG. 15. The gate driver may be fully isolated internally and may be properly isolated in the printed circuit board layout to accommodate creepage and clearance constraints. The gate drive design may include desaturation detection and miller clamp control. Additionally, fast zener clamps and diodes (not pictured) may be used at each of the gate driver's inputs and outputs to improve reliability and safety of the driver under typical conditions.

It should be noted that in some embodiments an important part of driving the full-bridge switch configuration is proper printed circuit board layout. In some embodiments, stray inductances between same legs and between each leg of the full-bridge topology are reduced through circuit board layout design to maintain switching without bouncing the switch inputs. The proper circuit board design mitigates stray inductances to produce a clean and efficient switching waveform.

C. Bridge Inductance of the LCL Tuning Circuit

Figure 16:
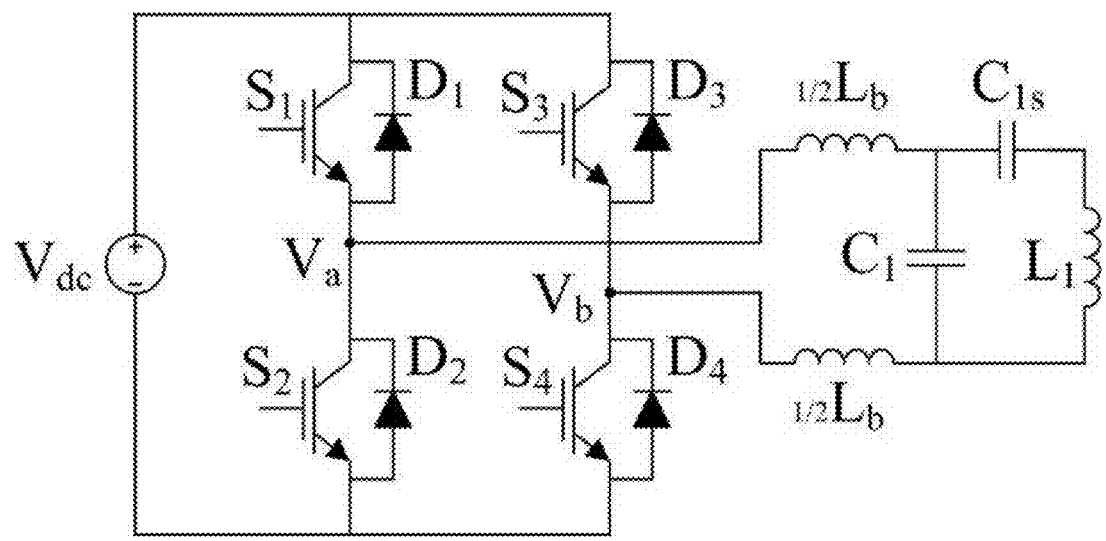
FIG. 16 illustrates an exemplary LCL Converter with Split Inductor Design.

In some embodiments, an aspect of the circuit design built and characterized herein may be that the $L_b$ inductor is implemented in a split arrangement with two inductors, each with the value of $L_b/2$ on either side of the full-bridge switching output as shown in FIG. 16. This may be done to allow for smaller ferrite mass in each inductor and to reduce switching harmonics seen by sensitive measurement IC's. Measurement across the parallel tank capacitance $C_1$ in FIG. 16, may be an important part of real-time characterization of the system. The RMS voltage across $C_1$ may be required, for safety reasons, to be isolated from general control circuitry. Isolated voltage measurement, in some embodiments, may be costly and complex; the frequency and bandwidth of the signal may primarily determine the cost and complexity of such circuitry. By reducing the harmonics and hence the signal bandwidth, the isolated voltage measurement cost and complexity may be significantly reduced.

Figure 17:
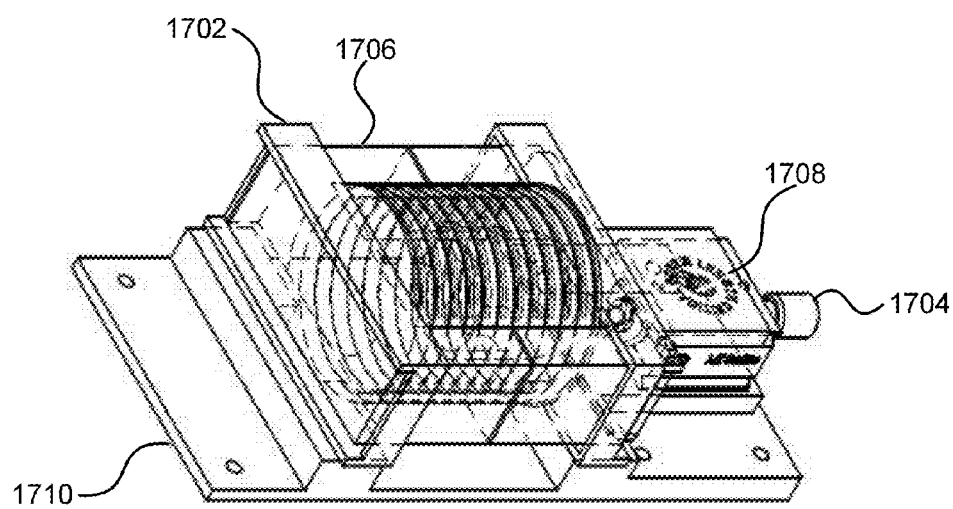
FIG. 17 illustrates an exemplary adjustable Inductor.

In addition, each of these inductors may be configured to have adjustable inductor designs, such as the mechanically tunable inductor design pictured in FIG. 17. In FIG. 17, Item 1 includes a plastic positioning bobbin for the ferrite E pieces. Item 2 is a single axis mechanical stage. Items 3, of which there are two halves, are ferrite E55 cores, for example from Ferroxcube. Item 4 is a bracket connecting the moving portion of the stage to one of the E pieces. Item 5 is an assembly bracket for positioning all of the parts of the assembly. The inductance may be adjusted using a mechanical stage (or other similar translation actuator) (Item 2) that manipulates the air gap between two halves of a ferrite E shaped core arrangement around which litz wire may be coiled. This allows rapid and easy tuning of the LCL resonant tank (LCL tuning circuit) during the production stage of the system because the reactance can be accurately controlled to within about 1% of the desired value by turning and then locking the 80 threads per inch adjustment screw. The application of a finely tunable mechanically adjusted inductor such as disclosed herein to inductive wireless power transfer systems is novel.

Figure 18:
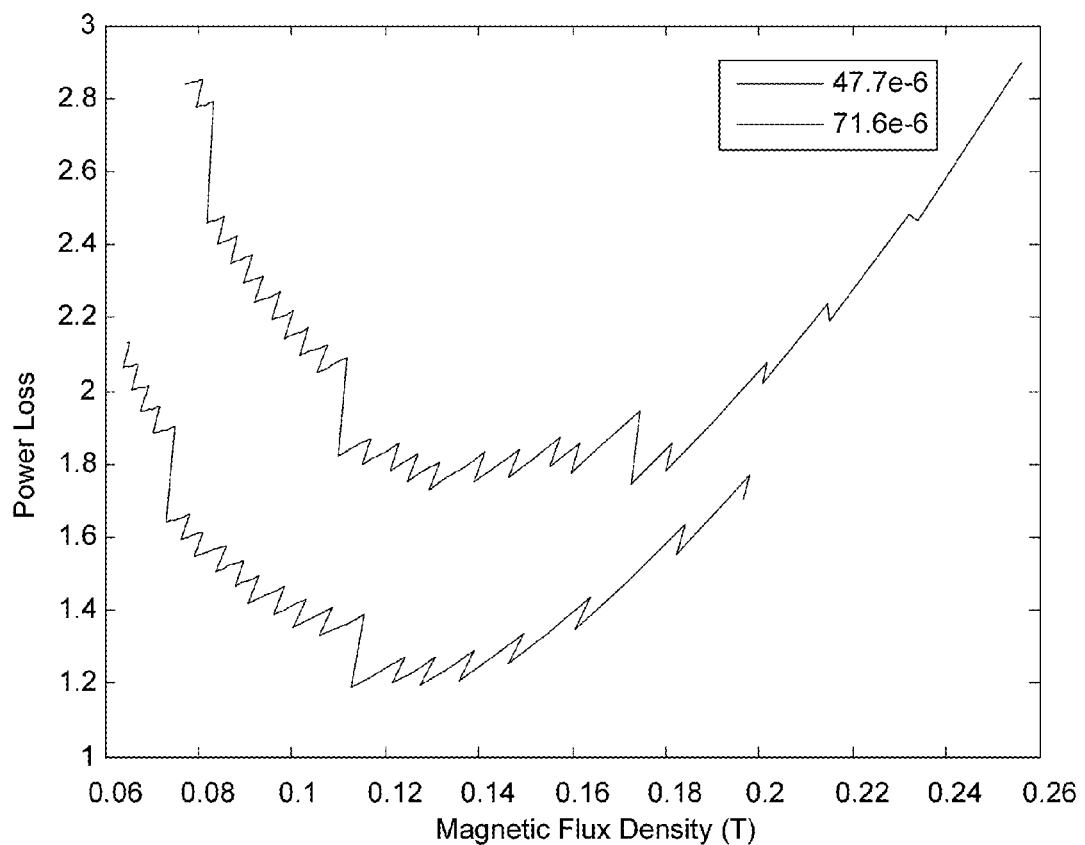
FIG. 18 illustrates an exemplary flux density of AC inductor design for LCL converter using E55 core.

The AC inductor ($L_b$) design process for losses and flux density may involve using the fundamental principle of the balance of magneto motive force. Using this principle, the number of turns, air gap and magnetic flux density can be chosen. FIG. 18 shows the flux density and power losses in the ferrite for different air gaps and number of turns (although not shown, but incorporated). The small step jumps are increments in turns and the larger jumps are 1 mm air gap increments. Thus, by using two inductors the flux density may be kept very low and the design may be easily achieved. In addition, the RMS flux density should be kept far below 0.2 T (because ~0.28 T peak) which is the absolute saturation density of the 3C90 material used.

D. Capacitive Network of the LCL Tuning Circuit

In some embodiments, the capacitive network shown in an LCL converter (as shown in FIG. 16) may include a series compensation capacitor ($C_{1s}$) and a parallel tank capacitor ($C_1$). To determine the capacitances for such a system, the following method may be used:

1. Determine desired operating angular frequency $\omega = 2*\pi*f$ where f is the frequency in Hertz.
2. Determine input DC voltage to primary ($V_{dc1}$), desired output voltage ($V_{dc2}$), and desired output current ($I_{dc2}$). Output Power, $P_{out} = V_{dc2} * I_{dc2}$.
3. For a given pad set, determine the coupling coefficient (k) range and nominal air gap between primary and secondary receiver pads 914, 916.

$$k = \sqrt{1 - \frac{(L_1)_s}{(L_1)_o}}$$

where $(L_1)_s$ is the primary receiver pad inductance with the secondary receiver pad 916 shorted at a given height and $(L_1)_o$ is the primary receiver pad inductance with the secondary receiver pad 916 open circuit at a given height. $k_0$ is thus the coupling coefficient k with the pads set at nominal air gap.

4. Determine maximum primary RMS AC Voltage ($V_{ac1}$) where $V_{ac1} = V_{dc1} *$ $$\frac{2\sqrt{2}}{\pi} \sin\left(\frac{\sigma}{2}\right)$$

when $\sigma = 180°$. And determine required maximum RMS AC Track Current ($I_{1max}$) using IPT modeling. The desired primary reactance ($X_{1\_des}$) is thus $$X_{1\_des} = \frac{V_{ac1}}{I_{1max}}.$$

5. Determine secondary receiver pad inductance when at the nominal height above primary and primary receiver pad 914 is open circuit ($L_{20}$) and associated reactance ($X_{20}$). $X_{20} = \omega * L_{20}$ where $\omega$ is the angular frequency of the system.

6. Determine open circuit voltage ($V_{oc}$) at maximum height (i.e. $k_{mm}$) $V_{oc}=I_{1max}*X_{20}*k_{min}$ (assuming primary and secondary receiver pad inductances are very close to each other) and from that determine the desired secondary reactance $$(X_{2\_des}), X_{2\_des} = \frac{V_{oc}}{I_{dc2}}$$

7. For the given secondary resonant circuit (shown in FIG. 29) determine required secondary series compensation capacitance ($C_{2s}$) and secondary parallel tank capacitance ($C_2$) using the following equations $C_{2s}=[\omega*(X_{20}-X_{2\_des})]^{-1}$ and $C_2=[\omega*X_{2\_des}]^{-1}$
8. Determine the nominal primary receiver pad inductance ($L_{10}$) and reactance ($X_{10}$) with secondary at maximum height and secondary coil shorted in series with the secondary series compensation capacitance $C_{2s}$.
9. For the given primary LCL tuning circuit (shown in FIG. 16) determine required primary series compensation capacitance ($C_{1s}$) and primary parallel tank capacitance ($C_1$) using the following equations $C_{1s}=[\omega*(X_{10}-X_{1\_des})]^{-1}$ and $C_1=[\omega*X_{1\_des}]^{-1}$
10. The primary bridge inductance ($L_b$) can thus be determined $$L_b = \frac{X_{1\_des}}{\omega}.$$

If the bridge inductance is split between both legs of the inverter, the associated inductance is halved for each inductor.

E. Coil Interaction

In some embodiments, $L_1$, as shown in FIG. 16, is a magnetic pad design used to transfer power to a secondary circuit 918. In a resonant wireless IPT converter, the primary magnetic pad acts as the primary half of a loosely coupled transformer with some amount of self-inductance and mutual inductance. The self-inductance may be used (as shown in II.D.) to tune the circuit; therefore the system, in general, must be fairly tolerant to this change in self-inductance in order to maintain efficiency in resonant power transfer.

III. Magnetics

The IPT systems described herein may include magnetic systems. In some embodiments, any suitable magnetic system may be employed. Such systems are capable of producing and receiving a magnetic field over an air gap. A circular pad topology may be used in systems as described herein. See, e.g., M. Budhia et al, "Design and Optimisation of Circular Magnetic Structures for Lumped Inductive Power Transfer Systems," *IEEE Transactions on Power Electronics*, vol. PP, pp. 1-1, 2011; F. Nakao et al, "Ferrite core couplers for inductive chargers," in *Proceedings of the Power Conversion Conference, 2002. PCC Osaka 2002.*, 2002, pp. 850-854 vol. 2; H. H. Wu et al, "A review on inductive charging for electric vehicles," in *IEEE International Electric Machines & Drives Conference ("IEMDC")*, 2011, 2011, pp. 143-147; H. H. Wu et al., "A 1 kW inductive charging system using AC processing pickups," in *6th IEEE Conference on Industrial Electronics and Applications ("ICIEA")*, 2011 2011, pp. 1999-2004; H. Chang-Yu et al, "LCL pick-up circulating current controller for inductive power transfer systems," in *IEEE Energy Conversion Congress and Exposition ("ECCE")*, 2010 2010, pp. 640-646.

In addition to circular designs, other pad designs may be employed, such as the pad design described in U.S. Provisional Application No. 61/544,957, filed Oct. 7, 2011, the entirety of which is incorporated herein by reference. Other pad designs include polarized pad designs such as those described in M. Budhia et al, "A new IPT magnetic coupler for electric vehicle charging systems," in *36th Annual Conference on IEEE Industrial Electronics Society, IECON 2010*, 2010, pp. 2487-2492; M. Budhia et al, "Development and evaluation of single sided flux couplers for contactless electric vehicle charging," in *IEEE Energy Conversion Congress and Expo ("ECCE")*, 2011, 2011, pp. 614-621; M. Chigira et al, "Small-Size Light-Weight Transformer with New Core Structure for Contactless Electric Vehicle Power Transfer System," in *IEEE Energy Conversion Congress and Expo ("ECCE")*, 2011, 2011, pp. 260-266; H. Jin et al, "Characterization of novel Inductive Power Transfer Systems for On-Line Electric Vehicles," in *Twenty-Sixth Annual IEEE Applied Power Electronics Conference and Exposition ("APEC")*, 2011, 2011, pp. 1975-1979; Y. Nagatsuka et al, "Compact contactless power transfer system for electric vehicles," in *International Power Electronics Conference ("IPEC")*, 2010 2010, pp. 807-813.

The primary and secondary circuits may use the same or different pads. In some embodiments, the same pad design may be used on both the primary circuits (e.g., $L_1$ in FIG. 16) and secondary circuits (e.g., $L_2$ in FIG. 29).

Figure 19:
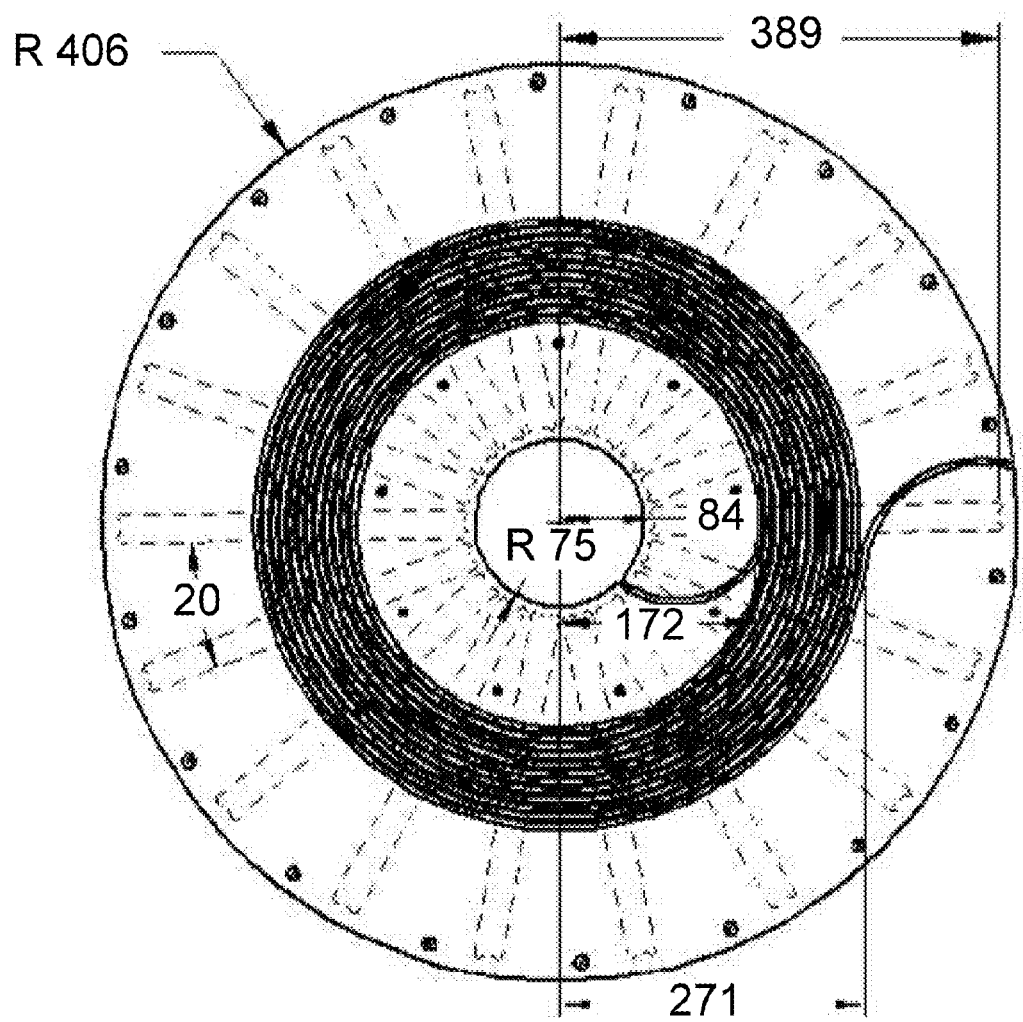
FIG. 19 illustrates an exemplary circular pad structure and dimension (Top View)
Figure 22:
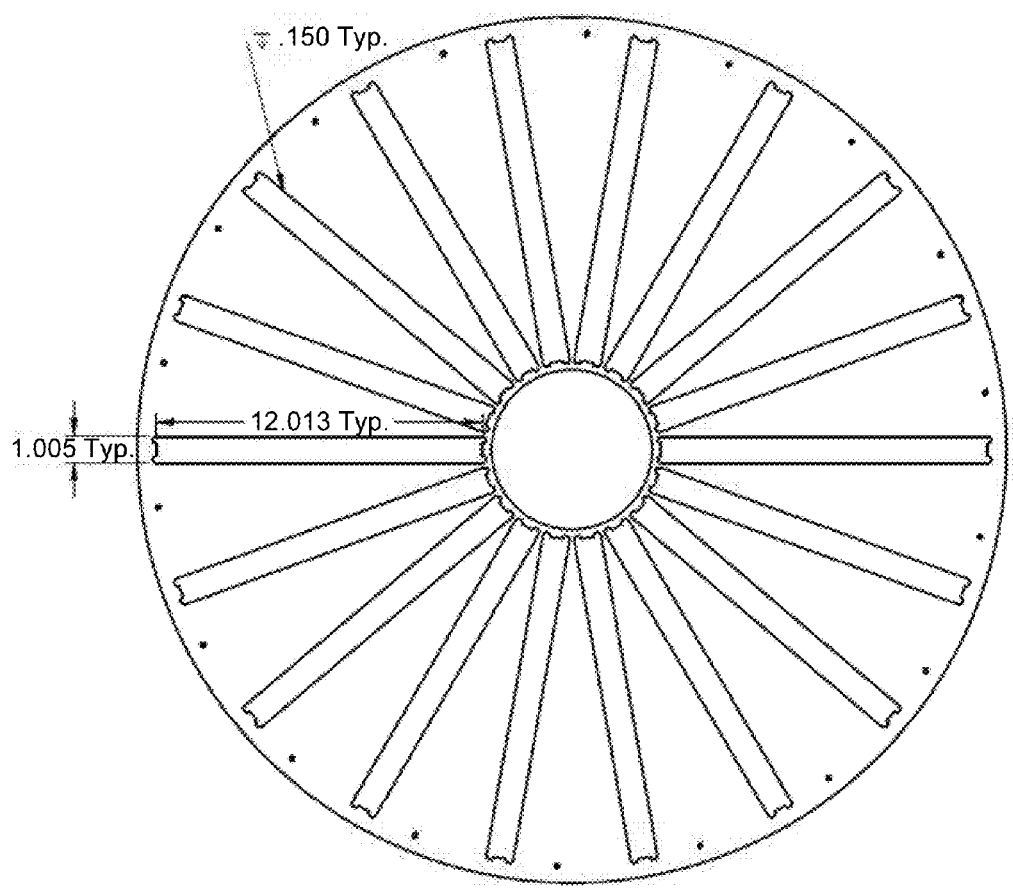
FIG. 22 illustrates the dimensions and configuration of exemplary an ferrite arm support structure.

In vehicular applications, the vehicles width may limit the width of the pad. In addition, to meet magnetic field safety standards and for ease of installation, the size of the pad is preferably much smaller than the width of the vehicle. The pad size may vary in diameter depending on the constraints of the application to be used (e.g., vehicular, industrial, etc.). Pad diameters may include from about 150 mm to 1500 mm, such as 150 mm to 305 mm, 305 to 610 mm, or 610 mm to 1500 mm. For example, in some embodiments, an 813 mm diameter circular pad design (32 inches) with dimensions as illustrated in FIG. 19 and FIG. 22 may be used.

The ferrite bar length, the bar position, and the inner and outer coil radius may follow the design optimization outlined in M. Budhia et al, "Design and Optimisation of Circular Magnetic Structures for Lumped Inductive Power Transfer Systems," *IEEE Transactions on Power Electronics*, vol. PP, pp. 1-1, 2011. The receiver and transmitter pads may be different or identical in structure.

For example, in some embodiments, each long ferrite leg may be composed of 3 linear I cores (OR49925IC) with dimensions of about 101×25×25 mm. The winding, in one embodiment, are composed of about 1300 strands of AWG36 Litz wire. It should be noted that the volume of ferrite bars used is overrated for magnetic flux density saturation purposes and that this pad may transfer up to 10 kW of power at 20 kHz if a larger power converter is used. Each pad weighs about 20.4 kg (45 lbs).

The design principles for choosing the number of ferrite legs and the position and area of the coils are decided in the circular pad design optimization. M. Budhia et al, "Design and Optimisation of Circular Magnetic Structures for Lumped Inductive Power Transfer Systems," *IEEE Transactions on Power Electronics*, vol. PP, pp. 1-1, 2011.

The coil coverage area is typically located in the middle of the ferrite legs and the area, in one embodiment, should be about 40% of leg length. The number of turns may be controlled by the designer for the amp turns required for the particular application. For example, the design example disclosed herein uses 12 turns of litz wire on each of the primary and secondary receiver pads 914, 916.

Figure 20:
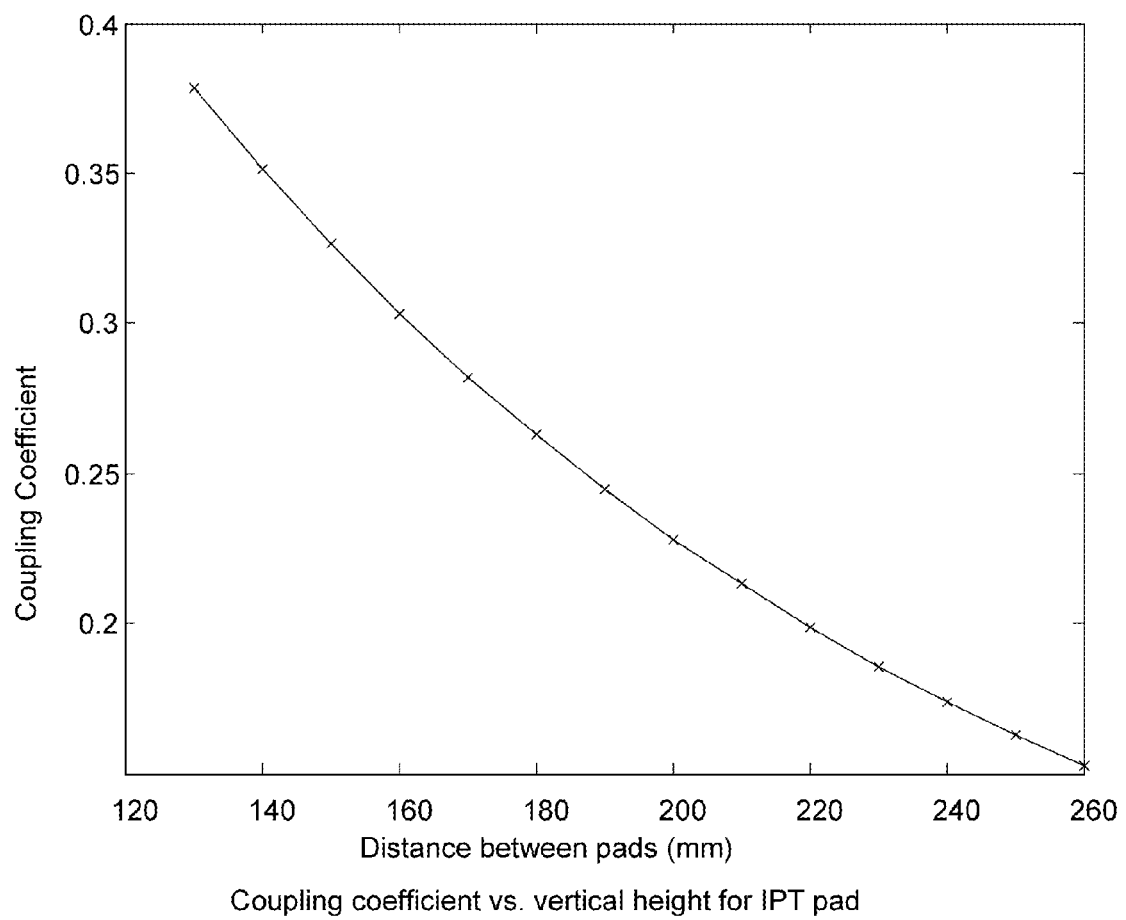
FIG. 20 illustrates coupling coefficient vs. vertical height for an exemplary IPT pad.
Figure 21:
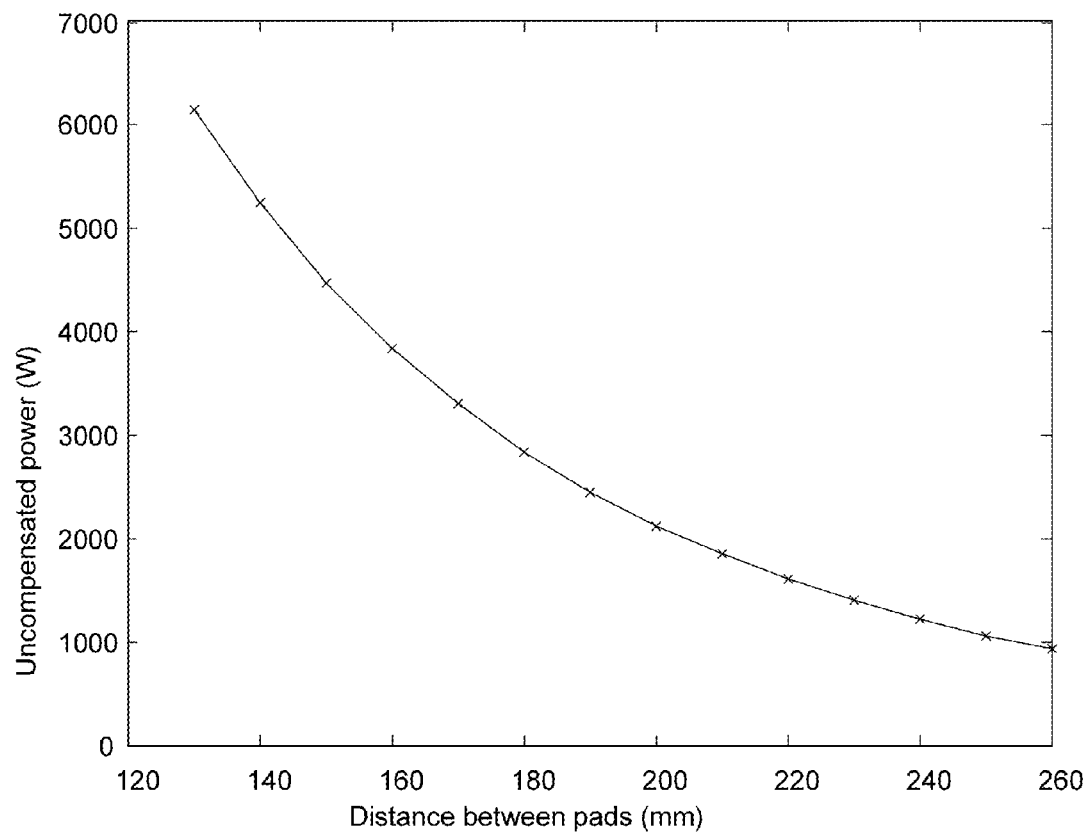
FIG. 21 illustrates uncompensated power of exemplary IPT pads for different vertical heights.

To model how an exemplary pad will behave under different vertical heights, the coupling coefficient vs. height is shown in FIG. 20. In addition, the coupling coefficient data and the primary track current of 40 A is used to predict the highest possible uncompensated power ("SU"), achievable under variations in height. Usually an uncompensated power of above 1 kW is sufficient to guarantee the 5 kW power transfer in a resonant converter assuming that $Q_2$ of 5. This illustrates that the highest operating point achievable for the exemplary pad in FIG. 20 is around 260 mm (10.3"). The uncompensated power is proportional to the coupling coefficient squared. See FIG. 21.

The pad structural design may comprise an all plastic structure that fits around from about 3 to 100 ferrite arms, such as about 18 ferrite arms, in a two part clam shell like configuration. In some embodiments, about three ferrite bars, such as those available from Magnetics Inc., part number 0R49925IC, go into each of the 18 ferrite arms. Any suitable material that does not affect the magnetic performance may be used to fabricate the design. In some embodiments, the clam shell halves are about 0.375 inch thick and the channels cut to accept the ferrite arms are 0.150 inch deep on each half as depicted in FIG. 22. However, these parameters may be adjusted to varying thicknesses and depths depending on the total diameter of the pad and the system capabilities needed for the specific IPT application.

Figure 23:
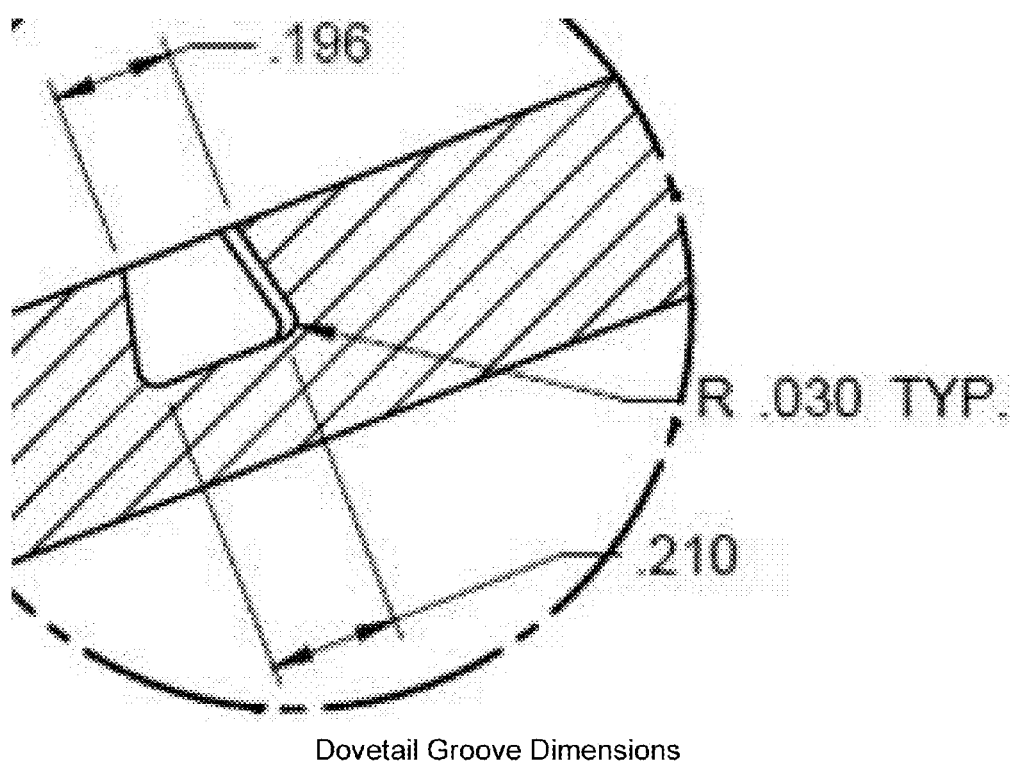
FIG. 23 illustrates exemplary dove tail groove dimensions.

In some embodiments, the fit to the ferrite bar dimensions is nominal to slight clearance fit which can help to hold the bars rigidly and tightly. Suitable adhesive and/or fasteners may also be used to secure the ferrite bars and/or litz wire. In one embodiment, the corners of the channels are radiused as shown in FIG. 23 to allow tool access and aid in assembling or disassembling the bars. On the top portion of one of the two clamshell halves a dove tail groove is included and traverses the desired spiral foot print for positioning of the litz wire. The groove dimensions for one embodiment are depicted in FIG. 23. The application of a capturing dove tail groove to litz wire positioning in inductive wireless power transfer systems is novel and provides advantages. For the depicted embodiment, at assembly placing the litz wire is facilitated since it snaps into place. Further the litz wire may be positioned very accurately (for example +/−0.05 mm or +/−0.025 mm). The accurate positioning helps the magnetic performance of the as built pads to correspond with the analytically modeled magnetic performance. Because of the accurate positioning, the expectations of litz wire length are also accurate. Thus the coil inductance, coil resistance, and other coil electrical parameters are held to a tight tolerance improving performance and efficiency of the system.

In one embodiment, the spiral footprint comprises about 12 evenly growing radius turns of the groove in FIG. 23. It may start with a radius of about 7.0 inches and ends with a radius of about 10.7 inches. However, the radii and number of turns may be adjusted depending on the system needs and target application.

For an example system, typical core losses for the chosen ferrite material are about 696 mW/cm$^3$ at 100 kHz, 200 mT of field and 100° C. The ferrite may be a manganese zinc material and equivalent material and shapes may be procured from various ferrite manufacturers.

In some embodiments, the litz wire that is placed in the spiral groove includes enough length for a twisted pair lead wire going to each pad assembly described. The wire in the dove tail grooves has only nylon serving and the enamel applied to the individual strands. For lead section up to the plastic pad each part of the twisted pair may be wrapped in two layers of Kynar heat shrink insulation (FIT-225 or equivalent). The twisted pair may then be wrapped in a layer of Halar braided tube overwrap protection. Suitable litz wire may include litz wire comprising 1300 strands of 38 gauge copper wire twisted/braided per specification 1300/38S80DN (HM Wire) or equivalent.

IV. Primary Controller

The IPT systems described here may include a primary controller 908, which has both hardware and software associated therewith.

A. Hardware

Any suitable primary controller may be used to control the resonant switching waveform. In some embodiments, a Field Programmable Gate Array ("FPGA") development board using a Xilinx Spartan 3AN FPGA may be used to develop a primary track current controller. A custom wireless communication card may also be added to the development board to accommodate a custom application communication protocol over a wireless protocol layer, such as the standard 802.15.4 wireless protocol layer. The FPGA development platform typically allows for extreme flexibility in an initial IPT system. Additional, more cost effective solutions exist and will typically allow much finer control over the entire system at much higher data throughput rates. One such alternative embodiment for a controller is the use of a Digital Signal Controller ("DSC") or Digital Signal Processor ("DSP") such as the Freescale MC56F84xx or series DSC.

B. Software

1. Overview

In embodiments employing an FPGA, the internal firmware development may be done in a Hardware Design Language ("HDL"). In embodiments employing a DSC or a DSP, the internal firmware development may be done in software coding languages such as C or C++. Such firmware may be broken in to subsections, for example six different subsections. The subsections may include, for example, a Processor subsection, a Communications subsection, an Analog to Digital Converter ("ADC") subsection, an LED Display subsection, a Switch Control subsection, and a Switch Fault and Ready Filter subsection.

Beyond these firmware subsections, additional software may be added as an application layer to the processor subsection and may be done in any suitable language, such as the C or C++ language. Interaction such as manual control and data-logging may be handled independently by any suitable user interface, such as a Graphical User Interface ("GUI") on a PC over a wireless interface. The manual control and interaction may be optional but assists in producing data-rich analysis of the system.

a. Processor

The processor subsection may comprise a processor, such as a 32-bit processor, running at a clock frequency of from about 30 MHz-100 MHz and may require data and program memory. Other suitable processors may be 64-bit or may have a different clock speed or may have single or multiple cores. The primary clock may be adjusted with an external Phase Locked Loop ("PLL") but due to the important nature of the frequency in some embodiments, an HDL block may perform clock timing verification and hold the processor (and all other subsections) in reset (thus preventing power transfer) until timing can be fully verified against a known reference clock signal. The processor subsection, in one embodiment, is fully in charge of the application layer of software. It accepts current and voltage measurements throughout the LCL converter and directly determines the phase angle and hence the primary track current (as described in IV.B.1.e below). Additionally, the processor may be configured to control communications, perform reporting, and implement manual control commands issued by an operator if desired.

b. Communications

The communication subsection, in one embodiment, is configured to translate high-level data transmission into low-level bit encoding required by the wireless communication chips. The communication subsection may ensure proper transmission and reception of wireless data.

c. Analog to Digital Converter ("ADC")

The ADC subsection, in one embodiment, is configured to automatically communicate with external ADC integrated circuits, filter the data, and periodically report critical measurement parameters to the processor subsection.

d. LED Display

The light emitting diode ("LED") display subsection is configured to reduce processor loading by handling visual status reporting. It reads the status of each subsection automatically and, in one embodiment, immediately visually reports any problems that may occur as well as power level status information. The LED display subsection may directly control a set of RGB colored LED's on the FPGA development board.

e. Switch Control

The switch control subsection, in one embodiment, is configured to translate desired phase from the processor to correct waveform control on each full-bridge switch. This subsection requires a clock running faster than the other subsections, such as at 100 MHz-500 MHz (allowing for a direct low-latency control resolution). Because this subsection runs on a separate clock, the HDL may handle the asynchronous issues between clock domains elegantly so as to prevent any potential metastability issues from damaging the system.

Figure 24:
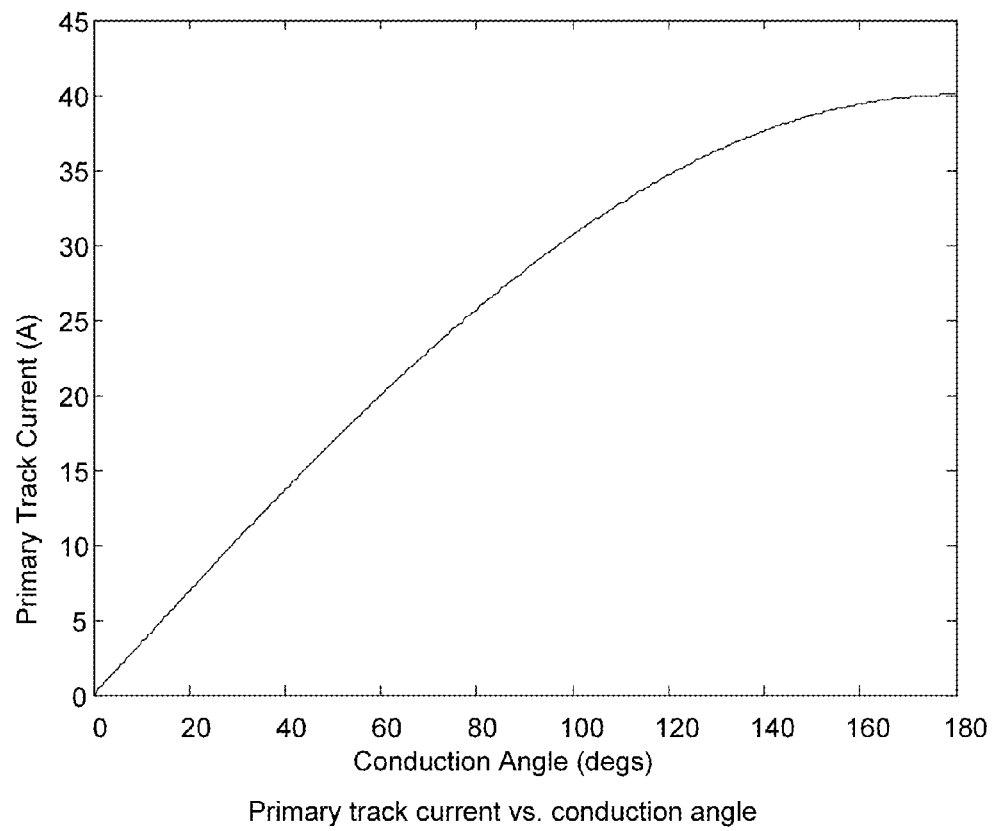
FIG. 24 illustrates primary track current vs. conduction angle.

Symmetric Voltage Cancellation ("SVC") or phase shift ("PS") control may be employed as a method for switch control because of its wide acceptability when using LCL converters. When the conduction angle is varied from 0-180°, the change in primary current is shown in FIG. 24. FIG. 24 shows that the primary track current can be fully controlled from zero up to 40 A. Other embodiments include the use of Asymmetric Voltage Cancellation ("AVC") as described in U.S. patent application Ser. No. 13/642,925, filed Oct. 23, 2012, the entire disclosure of which is herein incorporated by reference in its entirety.

f. Switch Fault and Ready Filter

The switch fault and ready filter subsection is configured to primarily filter false fault and ready signals from the gate drive circuitry. Due to the electrically noisy environment of a switching inverter, digital signal reporting from the high power circuitry can often bounce causing false signals. This subsection digitally filters and debounces the input signals so as to ensure the readings are correct.

2. Dual Side Control and Optimal Efficiency

Dual Side Control for an IPT system is described below and is described in more detail, including other embodiments, in U.S. patent application Ser. No. 13/748,187 entitled "DUAL SIDE CONTROL FOR INDUCTIVE POWER TRANSFER" and filed on Jan. 23, 2013 for Hunter Wu, et al., which is incorporated herein by reference for all purposes.

In some embodiments, at least one desirable aspect of the inductive charging systems as described herein is the ability to control the power (or current) used to charge the on-board battery. By grouping the formulas (3) and (22), it can be seen from the following formula (6) that the power delivered to the battery 926 is dependent on both control variables duty cycle ("D") and conduction angle ("σ"), which are more conventionally known as decoupling and primary track current control. See G. A. Covic et al, "Self tuning pick-ups for inductive power transfer," in *IEEE Power Electronics Specialists Conference, 2008. PESC 2008.*, 2008, pp. 3489-3494; P. Si et al, "Wireless Power Supply for Implantable Biomedical Device Based on Primary Input Voltage Regulation," in *2nd IEEE Conference on Industrial Electronics and Applications, 2007. ICIEA 2007.*, 2007, pp. 235-239.

$$P_{out} = \frac{V_{dc}^2}{\omega^2} \frac{M^2}{L_{1eq}^2 L_{2eq}^2} R_{dc}(1-D)^3 \sin^2\left(\frac{\sigma}{2}\right) \tag{6}$$

Several ways have been proposed in the past to implement a control algorithm. One possible option is to use primary track current control by itself. See G. B. Joung et al, "An energy transmission system for an artificial heart using leakage inductance compensation of transcutaneous transformer," *IEEE Transactions on Power Electronics*, vol. 13, pp. 1013-1022, November 1998 1998; P. Si et al, "A Frequency Control Method for Regulating Wireless Power to Implantable Devices," *IEEE Transactions on Biomedical Circuits and Systems*, vol. 2, pp. 22-29, March 2008 2008. Another more recent development is to control the primary track current via σ when M varies. Duty cycle control is used against load resistance changes. In essence, $I_1$ is controlled so that it is inversely proportional to M governed by (21) to keep $V_{oc}$ fixed, and D is used to control power output due to load changes by (6). This type of approach will be referred to as secondary decoupling control. However, both of these methods, though they may be implemented In some embodiments, are non-optimal control strategies for obtaining the highest overall system efficiency. In this system according to the embodiments described herein, a new dual side control strategy is used to achieve the highest efficiency for the system with load and coupling variations.

The efficiency analysis approach used in some embodiments described herein breaks the system into separate sections and analyzes the efficiency of each section individually. One assumption of the efficiency analysis is that only conduction losses are considered, because the switching losses of the H-bridge on the LCL converter vary in a very complex nature. Even under pure, real, reflected resistance conditions, one leg may operate with relatively high diode reverse recovery losses (capacitive switching) and the other leg may operate with conventional hard characteristics (inductive switching). See, e.g., H. H. Wu et al, "Design of Symmetric Voltage Cancellation Control for LCL converters in Inductive Power Transfer Systems," in *IEEE International Electric Machines & Drives Conference ("IEMDC")*, 2011, 2011, pp. 866-871. In addition, the switching characteristics of each semiconductor device strongly depend on the operating temperature and internal device parameters that have relatively large discrepancies.

Figure 25:
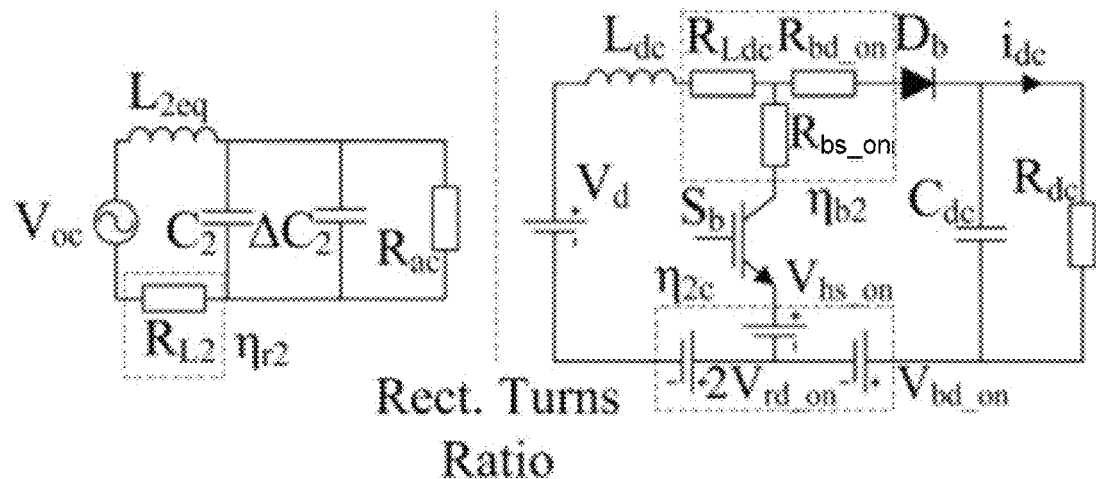
FIG. 25 illustrates equivalent efficiency model circuit diagram of an exemplary secondary decoupling pickup (secondary circuit) (see also FIG. 29)

To aid the explanation of the analysis, FIG. 25 may be referenced. The conduction losses in semiconductor devices, in one embodiment, are modeled separately into two parts, one being the forward voltage drop at zero current ($V_{rd\_on}$, $V_{hs\_on}$, $V_{bd\_on}$), and the other being the equivalent linear resistance in series. Each of these would be considered separately. It should be noted that $R_{Lds}$ comprises the summation of the ESR in $L_{dc}$ and the linear resistance of the diodes in the rectifier bridge.

The efficiency of the boost converter after the rectifier is given by:

$$\eta_{b2} = \frac{P_{out}}{P_{out} + P_{ldc} + P_{switch} + P_{diode}} \quad (7)$$

Here only the linear resistance is considered and expanding (7) will result in:

$$\eta_{b2} = \frac{1}{1 + \frac{R_{ldc} + DR_{bs\_on} + (1-D)R_{bd\_on}}{(1-D)^2 R_{dc}}} \quad (8)$$

By assuming $R_{bs\_on}$ is approximately equal to $R_{bd\_on}$, (8) can be simplified to:

$$\eta_{b2} = \frac{1}{1 + \frac{8\omega C_2 (R_{ldc} + R_{bd\_on})}{\pi^2 Q_{2v}}} \quad (9)$$

The losses due to the forward voltage drop of the devices can be derived in a similar manner, and by assuming $V_{hs\_on}$ and $V_{hd\_on}$ are similar, the efficiency can be expressed as:

$$\eta_{c2} = \frac{1}{1 + \frac{\pi V_{rd\_on} + \sqrt{2} V_{bd\_on}}{\sqrt{2}(1-D)V_{out}}} \quad (10)$$

Next, for the secondary resonant circuit, the detuning effect due to pad inductance variations is considered. To simplify the analysis, the pad inductance is mathematically treated as a constant and the parallel tuning capacitor is treated as a variable. In addition, the ESR of the tuning capacitors is neglected as their losses are an order of magnitude lower than other components. The equation for the magnitude of $i_2$ is:

$$|i_2| = i_{ac}\sqrt{1 + Q_{2v}^2 (1+\alpha)^2} \quad (11)$$

where $$\alpha = \Delta C_2 / C_2 \quad (12)$$

Following the approach proposed in (7) and using (11), the efficiency is given by:

$$\eta_{r2} = \frac{1}{1 + \frac{\omega C_2 R_{l2}}{Q_{2v}}(1 + Q_{2v}^2(1+\alpha)^2)} \quad (13)$$

Figure 26:
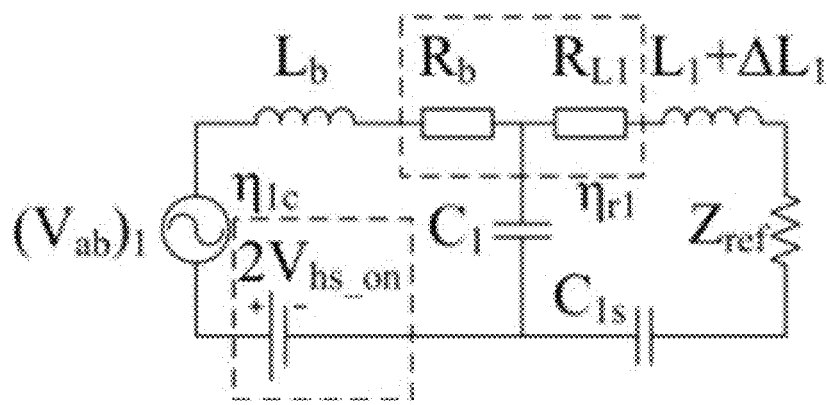
FIG. 26 illustrates equivalent efficiency model circuit diagram of an exemplary primary LCL converter (see also FIG. 11)

If equations (9), (10) and (13) are multiplied together, the result will be the efficiency of the secondary resonant circuit, the secondary rectification circuit, and the secondary decoupling converter. The next derivation is to determine the efficiency of the LCL load resonant converter and associated resonant network. The equivalent circuit shown in FIG. 26 is used to model the losses. Firstly, the parallel impedance of a secondary detuned resonant circuit is given by:

$$Z_p = R_{ac} \| \frac{1}{j\omega \Delta C_2} = \frac{R_{ac}(1 - jQ_{2v}\alpha)}{1 + Q_{2v}^2 \alpha^2} \quad (14)$$

Note that all the ESR losses on the secondary are neglected and because their values are much smaller than the reactance and load resistance components, $i_2$ is given by:

$$I_2 = \frac{V_{oc} - V_{ac2}}{j\omega L_2} = \frac{j\omega M I_1 - \frac{M^2}{L_{2eq}} I_1 \frac{R_{ac}(1-jQ_{2v}\alpha)}{1+Q_{2v}^2\alpha^2}}{j\omega L_{2eq}} \quad (15)$$

From first principles the reflected impedance is:

$$Z_r = \frac{\omega^2 M^2 I_2}{V_{oc}} = \frac{\omega M^2}{L_{2eq}}\left(\frac{Q_{2v}}{1+Q_{2v}^2\alpha^2} - j - j\frac{\omega \Delta C_2 Q_{2v}}{1+Q_{2v}^2\alpha^2}\right) \quad (16)$$

It should be noted that (16) simplifies down to (4) if $\Delta C_2$ is set to zero. Similar to before, the linear resistance losses are separated from the forward voltage drop at zero current. By using a similar approach as in (7), the efficiency for the primary is:

$$\eta_{r1} = \frac{1}{1 + \frac{R_{L1} + R_b \omega^2 C_1^2 \left(\begin{array}{c}(R_{L1} + \text{Re}(Z_r))^2 + \\ (\omega L_1 + \text{Im}(Z_r))^2\end{array}\right)}{\text{Re}(Z_r)}} \quad (17)$$

Similar to (9), the efficiency due to forward voltage drop is given by:

$$\eta_{c1} = \frac{1 - \pi V_{hs\_on}}{\omega L_b \sqrt{\frac{2P_{out}}{\text{Re}(Z_r)}}} \quad (18)$$

By grouping (9), (10), (13), (17) and (18) the overall system efficiency is given by:

$$\eta = \eta_{r1} \cdot \eta_{c1} \cdot \eta_{r2} \cdot \eta_{b2} \cdot \eta_{c2} \quad (19)$$

Using (19), in one embodiment the highest efficiency point can be found. However, typically this function is much higher than fourth order against $Q_{2v}$ which means an analytical solution of a global maximum may not be directly determined. Fortunately, through extensive analysis, this function would always have a global maximum and using a simple detection routine, the maximum may be found. The values for the analysis are listed in Table II. Rb is the sum of the ESR of $L_b$ and the linear resistance of the switches. To determine variables M and α, FIG. 10 can be used. $Q_{2v}$ is calculated using (15). In this example, an approximate 37 W was used to power the FPGA controller and all the sensors for the 5 kW system.

TABLE II

System Parameters for Efficiency Analysis.

| Parameters | Values | Parameters | Values |
|---|---|---|---|
| $R_{Ldc}$ | 0.0166 Ω | $R_{L1}$ | 0.0636 Ω |
| $R_{bd\_on}$ | 0.035 Ω | $R_b$ | 0.1194 Ω |

TABLE II-continued

System Parameters for Efficiency Analysis.

| Parameters | Values | Parameters | Values |
|---|---|---|---|
| $V_{bd\_on}$ | 0.95 V | $V_{hs\_on}$ | 0.9 V |
| $R_{L2}$ | 0.0569 Ω | $V_{rd\_on}$ | 0.77 V |

Figure 27:
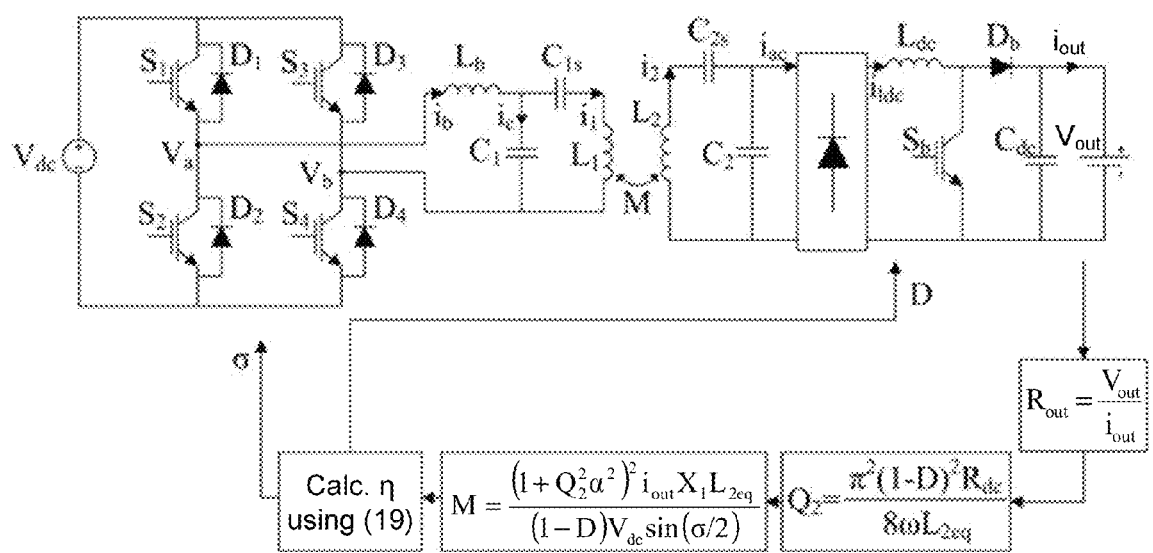
FIG. 27 illustrates an exemplary controller block diagram for optimal efficiency.

To practically implement this system, the controller block diagram shown in FIG. 27 may be used. In one embodiment, the duty cycle D is used as the primary control variable and the conduction angle σ is constantly updated to keep the output power (current) in regulation.

The equivalent load resistance of the battery 926 may be determined by measuring the battery voltage and the charging current. These two sensors are typically necessary for safety reasons when charging large batteries for EVs, hence no additional hardware may be needed. To determine the coupling coefficient, observer equations may be directly used to predict its operating value. Firstly, the track current must be determined, perhaps through measurement using a current transformer ("CT"). However, if the PFC stage can maintain, for example, a constant 400 VDC bus during operation, it is possible to directly estimate $i_1$ using (3) without any extra CT. By using the estimated track current, M (and k) can be directly determined when $i_1$ and $R_{dc}$ are already known:

$$M = \frac{\sqrt{1+Q_2^2\alpha^2}}{1-D} \frac{I_{out}X_1}{V_{dc}\sin(\sigma/2)} L_{2eq} \qquad (20)$$

Figure 28:
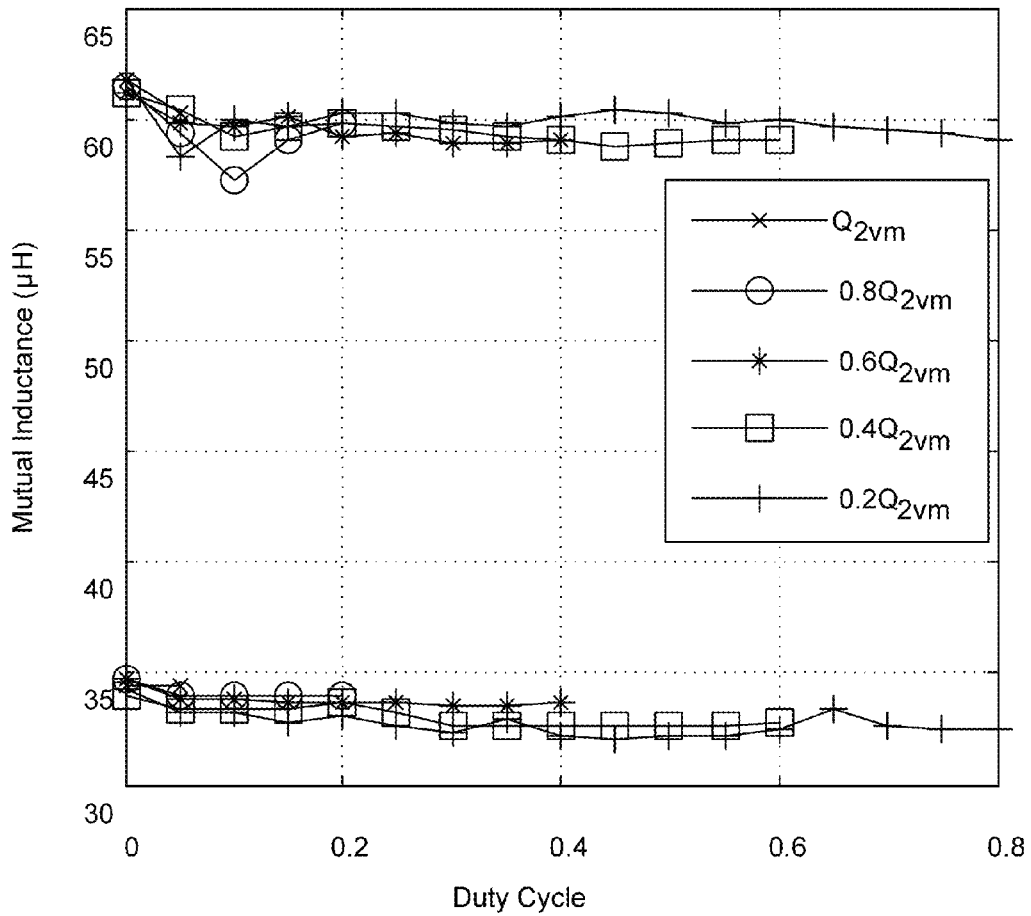
FIG. 28 illustrates coupling coefficient estimation using (21). Blue trace is for k=2 $k_{min}$ (M=60 µH) and Red trace is for k=1.14 $k_{min}$ (M=34.2 µH)

FIG. 28 shows that the mutual inductance (or coupling) can be determined without much error over a wide range of load and duty cycle conditions. Estimates of the system parameters in Table II are needed for optimal efficiency control using (19). One method of creating accurate estimates is to directly measure during manufacturing the ESR values of each component and then program the controller for each unit with the measured parasitic values. A potential shortcoming of this technique is that the ESR of the two IPT pads can vary if stray metal objects are bought into close proximity during operation. There are several ways to accurately detect pad ESR during operation which can be alternatively applied. In some embodiments, an alternative method may be undertaken by installing an input voltage and current sensor before the resonant converter with a nominal added cost, the input power may be measured directly. With access to the input and output power of the system, the efficiency may be determined and the optimum may be found by searching for the peak. This is a practical implementation approach taken in some embodiments in the systems described herein for the closed loop controller. Although it can be argued that measuring efficiency in this way is not completely accurate, the general trend may still be determined using sensors that may have 1% measurement error. The peak of the function shown in FIG. 39 may be tracked quite accurately.

In some embodiments, the processor on the primary controller 908 is configured to be responsible for tracking the system efficiency and optimizing primary SVC control and secondary decoupling control to ensure optimal system efficiency.

V. Secondary Tuned Network (Secondary Circuit, FIG. 29)

The IPT systems described herein may include a secondary tuned network.

A. Capacitive Network of the Secondary Resonant Circuit

Figure 29:
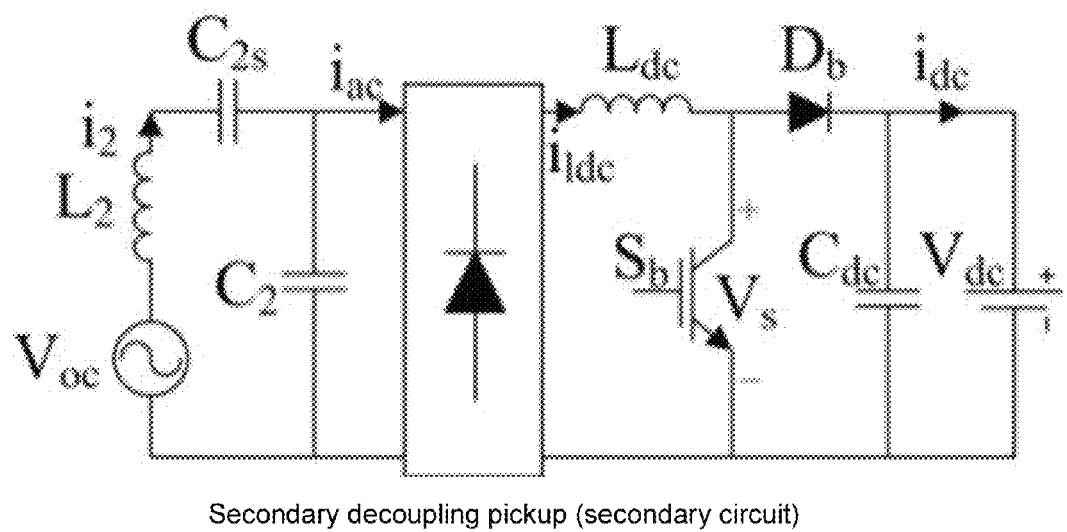
FIG. 29 illustrates an exemplary parallel pickup or secondary circuit with a secondary resonant circuit, a secondary rectification circuit, and a secondary decoupling circuit (in the form of a secondary decoupling converter)

In some embodiments, the capacitive network shown with a secondary decoupling converter and illustrated in FIG. 29 may include a series compensation capacitor ($C_{2s}$) and a parallel tank capacitor ($C_2$). To determine the capacitances for this system, in one embodiment the following method may be used:

1. Determine desired operating angular frequency ω=2*π*f where f is the frequency in Hertz.
2. Determine input DC voltage to primary ($V_{dc1}$), desired output voltage ($V_{dc2}$), and desired output current ($I_{dc2}$). Output Power, $P_{out}=V_{dc2}*I_{dc2}$.
3. For a given pad set, determine the coupling coefficient (k) range and nominal air gap between primary and secondary receiver pads 914, 916.

$$k = \sqrt{1 - \frac{(L_1)_s}{(L_1)_o}}$$

where $(L_1)_s$ is the primary receiver pad inductance with the secondary receiver pad 916 shorted at a given height and $(L_1)_o$ is the primary receiver pad inductance with the secondary receiver pad 916 open circuit at a given height. $k_0$ is thus the coupling coefficient k with the pads set at nominal air gap.

4. Determine maximum primary RMS AC Voltage ($V_{ac1}$) where $V_{ac1}=V_{dc1}*$ $$\frac{2\sqrt{2}}{\pi}\sin\left(\frac{\sigma}{2}\right)$$

when σ=180°. And determine required maximum RMS AC Track Current ($I_{1max}$) using IPT modeling. The desired primary reactance ($X_{1\_des}$) is thus $$X_{1\_des} = \frac{V_{ac1}}{I_{1max}}.$$

5. Determine secondary receiver pad inductance when at the nominal height above primary and primary receiver pad is open circuit ($L_{20}$) and associated reactance ($X_{20}$). $X_{20}=\omega*L_{20}$ where ω is the angular frequency of the system.
6. Determine open circuit voltage ($V_{oc}$) at maximum height (i.e. $k_{min}$) $V_{oc}=I_{1max}*X_{20}*k_{min}$ (assuming primary and secondary receiver pad inductances are very close to each other) and from that determine the desired secondary reactance $$(X_{2\_des}), X_{2\_des} = \frac{V_{oc}}{I_{dc2}}$$

7. For the given secondary resonant circuit (shown in FIG. 29) determine required secondary series compensation capacitance ($C_{2s}$) and secondary parallel tank capacitance ($C_2$) using the following equations $C_{2s}=[\omega*(X_{20}-X_{2\_des})]^{-1}$ and $C_2=[\omega*X_{2\_des}]^{-1}$ 8. Determine the nominal primary receiver pad inductance ($L_{10}$) and reactance ($X_{10}$) with secondary at maximum height and secondary coil shorted in series with the secondary series compensation capacitance $C_{2s}$.
9. For the given primary LCL tuning circuit (shown in FIG. 16) determine required primary series compensation capacitance ($C_{1s}$) and primary parallel tank capacitance ($C_1$) using the following equations $C_{1s}=[\omega*(X_{10}-X_{1\_des})]^{-1}$ and $C_1=[\omega*X_{1\_des}]^{-1}$
10. The primary bridge inductance ($L_b$) can thus be determined $$L_b = \frac{X_{1\_des}}{\omega}.$$

If the bridge inductance is split between both legs of the inverter, the associated inductance is halved for each inductor.

B. Coil Interaction $L_2$ as shown in FIG. 29 is the magnetic pad design used to transfer power to a secondary circuit 918. In the secondary of a wireless IPT converter, the secondary magnetic pad (secondary receiver pad 916) acts as the secondary half of a loosely coupled transformer with some amount of self-inductance and mutual inductance. The self-inductance is used (as discussed above) to tune the circuit; therefore the system, in general, must be fairly tolerant to this change in self-inductance to maintain efficiency in resonant power transfer. It should be noted however that the secondary self-inductance changes much less than the primary self-inductance.

VI. Secondary Rectification Circuit

Depending on the end point load, the IPT systems described herein may include an optional secondary rectification circuit. When employed, the secondary rectification circuit is configured to transform the high frequency AC waveform into a DC waveform. The secondary rectification circuit may be a standard full-wave bridge rectifier consisting of four high-speed diodes selected for low loss operation. For example, in some embodiments, four Fairchild RHRG75120 diodes were selected to perform the rectification. The diodes used for rectification may be configured to have very fast diode reverse recovery times, low voltage drops, high voltage ratings, and high current ratings. Other embodiments include synchronous rectification techniques employing switches to perform low-loss rectification.

VII. Secondary Decoupling Circuit

The IPT systems may optionally include a secondary decoupling circuit. Any suitable decoupling circuit may be used. A secondary decoupling circuit may include a switching power converter, such as a boost converter. For example, a parallel pickup (secondary circuit 918) with decoupling control shown in FIG. 29 was used in some exemplary embodiments. See, e.g., J. T. Boys et al, "Stability and control of inductively coupled power transfer systems," IEE Proceedings—Electric Power Applications, vol. 147, pp. 37-43, 2000; G. A. Covic et al, "Self tuning pick-ups for inductive power transfer," in IEEE Power Electronics Specialists Conference, 2008. PESC 2008., 2008, pp. 3489-3494; N. A. Keeling et al, "A Unity-Power-Factor IPT Pickup for High-Power Applications," IEEE Transactions on Industrial Electronics, vol. 57, pp. 744-751, 2010; J. T. Boys et al, "Single-phase unity power-factor inductive power transfer system," in IEEE Power Electronics Specialists Conference, 2008. PESC 2008., 2008, pp. 3701-3706; Y. Xu et al, "Modeling and controller design of ICPT pick-ups," presented at the International Conference on Power System Technology, 2002. Proceedings. PowerCon 2002., 2002.

In some embodiments, the secondary decoupling circuit described above has the following advantages:

The parallel resonant circuit acts as a current source under steady state conditions (see, e.g., G. A. Covic et al, "Self tuning pick-ups for inductive power transfer," in IEEE Power Electronics Specialists Conference, 2008. PESC 2008., 2008, pp. 3489-3494.), and may function well for charging most types of batteries.

The secondary decoupling controller 920 may be easy to use and may be capable of regulating the output voltage of the pickup to any desired value by simply controlling the duty cycle of the switch $S_b$. See J. T. Boys et al, "Stability and control of inductively coupled power transfer systems," IEE Proceedings—Electric Power Applications, vol. 147, pp. 37-43, 2000. In addition, the secondary side control acts as a protection feature to the batteries if the wireless communications link is temporarily not operational.

Operating the secondary decoupling controller switch at high switching frequencies produces a reflected impedance to the primary ($Z_r$) that is constant, and current drawn from the power supply will have the ability to ideally have minimal EMI from the secondary side compared to slow switching operation. Here, the open circuit voltage from first principles is given by:

$$V_{oc} = j\omega M I_1 \qquad (21)$$

And if the battery 926 can be modeled as an equivalent DC resistance under steady state, then the output power is given by:

$$P_{out} = P_{max}(1-D) = \omega I_1^2 \frac{M^2}{L_{2eq}} Q_{2\nu}(1-D) \qquad (22)$$

where $$Q_{2\nu} = \frac{R_{ac}}{X_2} = \frac{\pi^2(1-D)^2 R_{dc}}{8\omega L_{2eq}} \qquad (23)$$

$$L_{2eq} = \frac{(\omega L_2 - 1/\omega C_{2s})}{\omega} \qquad (24)$$

$Q_{2\nu}$ in (23), is different from the $Q_2$. $Q_2$ is the overall quality factor and can be defined as the product of the voltage Q ($Q_{2\nu}$) and current Q ($Q_{2i}$). See N. A. Keeling et al, "A Unity-Power-Factor IPT Pickup for High-Power Applications," IEEE Transactions on Industrial Electronics, vol. 57, pp. 744-751, 2010. Here, $Q_{2\nu}$ is treated the same way and $Q_{2i}$ is self-contained during the definition of tuning by $L_{2eq}$ and $L_{1eq}$. The key part of the design strategy is to choose an $L_{2eq}$ in (24) that will meet the power requirements in (22). The design parameters are shown in Table III. The $V_{oc}$ parameter is not given here, since it is dependent on the coupling condition and primary track current used. The main purpose of $L_{dc}$ is to keep the rectifier current continuous and the guidelines to choosing it can be found in, for example, P. Si et al, "Analyses of DC Inductance Used in ICPT Power Pick-Ups for Maximum Power Transfer," in 2005 IEEE/PES Transmission and Distribution Conference and Exhibition: Asia and Pacific, 2005 pp. 1-6.

TABLE III

Design Parameters for IPT Pickup.

| Parameter | Value | Parameter | Value |
|---|---|---|---|
| $V_{out}$ | 300 V | $L_{dc}$ | 550 μH |
| $X_2$ | 9.81 Ω | $i_{out}$ | 0-17 A |
| $C_2$ | 811.19 nF | Diode ($D_b$) | IDT16S60C |
| $L_2$ | 177-188 μH | Switch | IRG7PH42UPBF |
| $C_{2s}$ | 611.19 nF | Diode (Rectifier) | RHRG75120 |

Figure 30:
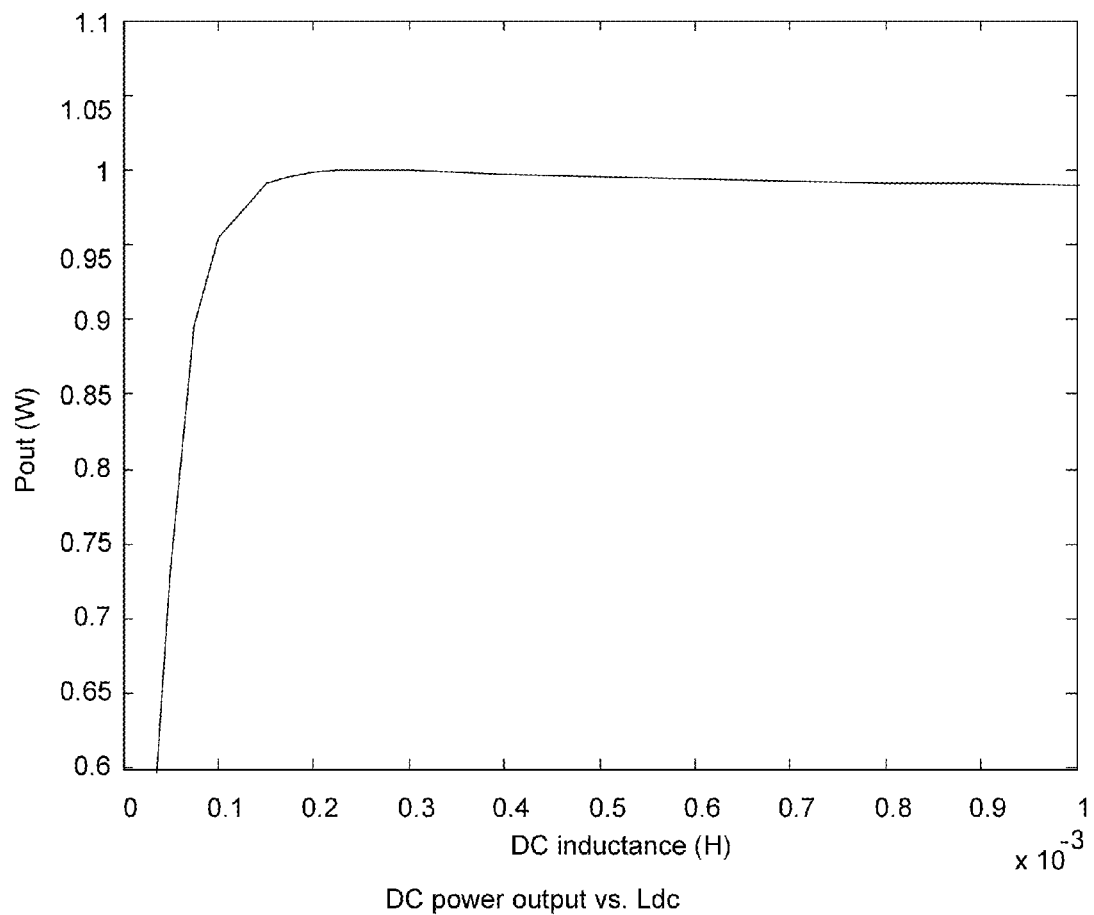
FIG. 30 illustrates DC power output vs. Ldc.
Figure 31:
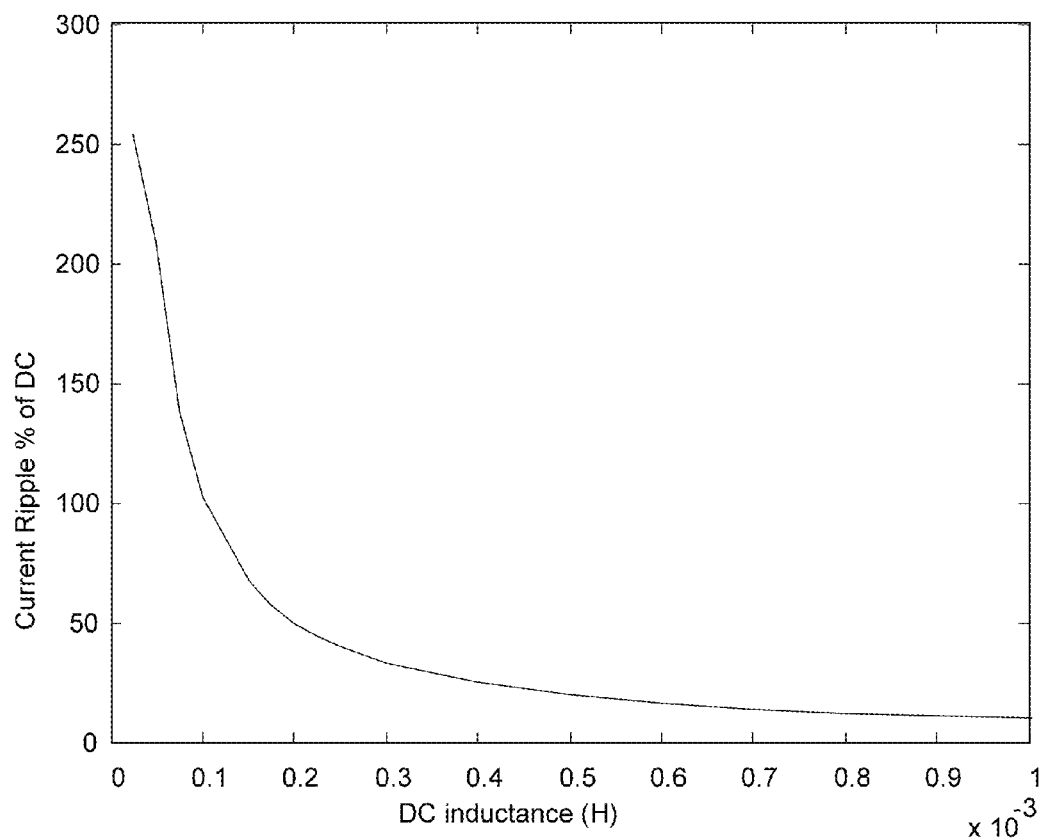
FIG. 31 illustrates AC current peak to peak amplitude normalized against DC average value vs. Ldc.

In some embodiments, a process for choosing a particular $L_{dc}$ for the parallel resonant pickup may be used. For example, a process may be followed to analyze the required minimum DC inductance for the circuit. One direct method is to measure the amount of output power that can be drawn normalized against the maximum, and a reasonable $L_{dc}$ can be chosen (FIG. 30). However, the process is slightly more complicated, because even if the power is available there may be large harmonic ripples on the DC current which reversed through the rectifier may result in a non-unity displacement power factor. See also P. S1 et al, "Analyses of DC Inductance Used in ICPT Power Pick-Ups for Maximum Power Transfer," in 2005 *IEEE/PES Transmission and Distribution Conference and Exhibition: Asia and Pacific,* 2005 pp. 1-6. This phenomenon when reflected back to the primary converter may result in extra loading on the H-bridge network and it may be better to reduce the ripple current to less than 20% during operation to avoid significant reflection. As such, the plot in FIG. 31, shows that the ripple can be reduced to 20% when the DC inductance is increased to around 500 μH.

Figure 32:
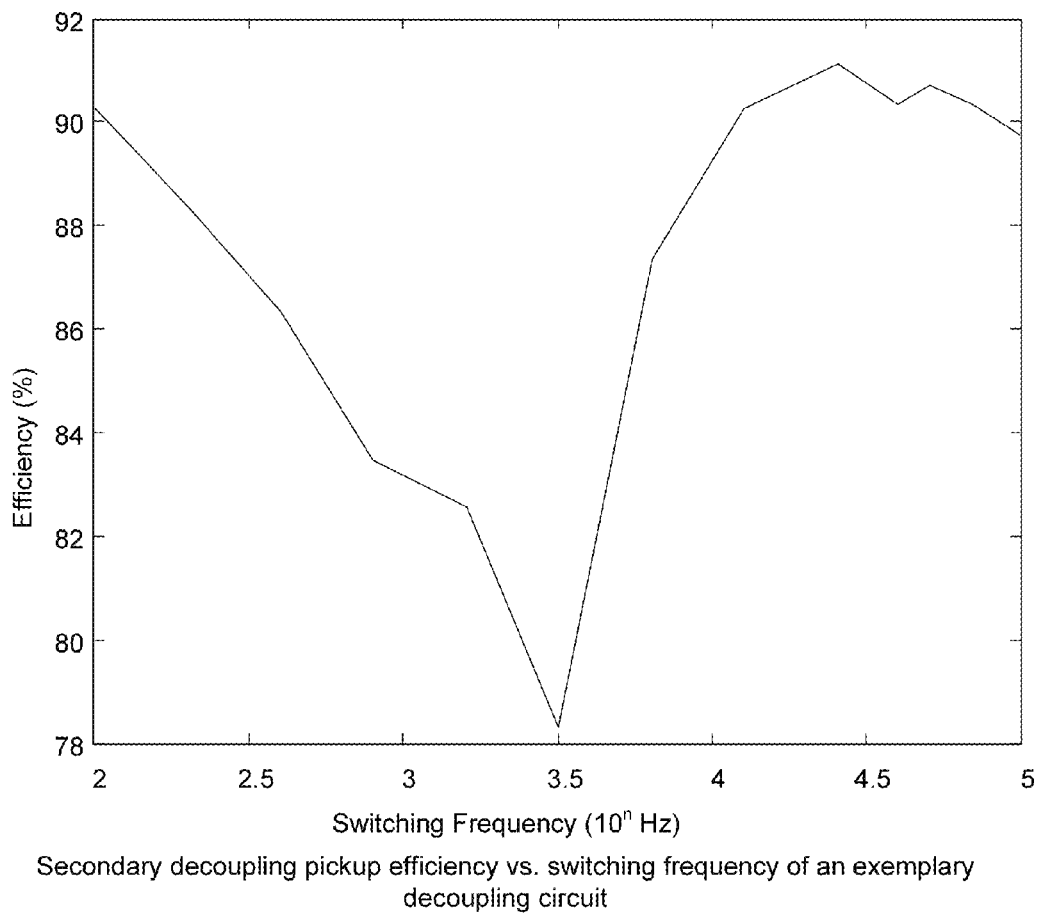
FIG. 32 illustrates secondary decoupling pickup efficiency vs. switching frequency of an exemplary decoupling circuit.

Next, the analysis of the switching frequency for the secondary decoupling controller 920 may be somewhat complex and there is an optimal frequency at which the system can operate during fast switching. There may be also a significant efficiency drop to 78% when the switching frequency is selected at the resonant pole of $L_{dc}$ and the parallel resonant tank. As such, a much higher or lower frequency may be selected. Lower switching frequency is not typically used in systems described herein because it creates EMI back on the grid when the pickup is being switched on and off. As such, high switching frequency is preferred. It can be seen in FIG. 32 that once the frequency is above 10 kHz its efficiency is maintained quite high.

Figure 33:
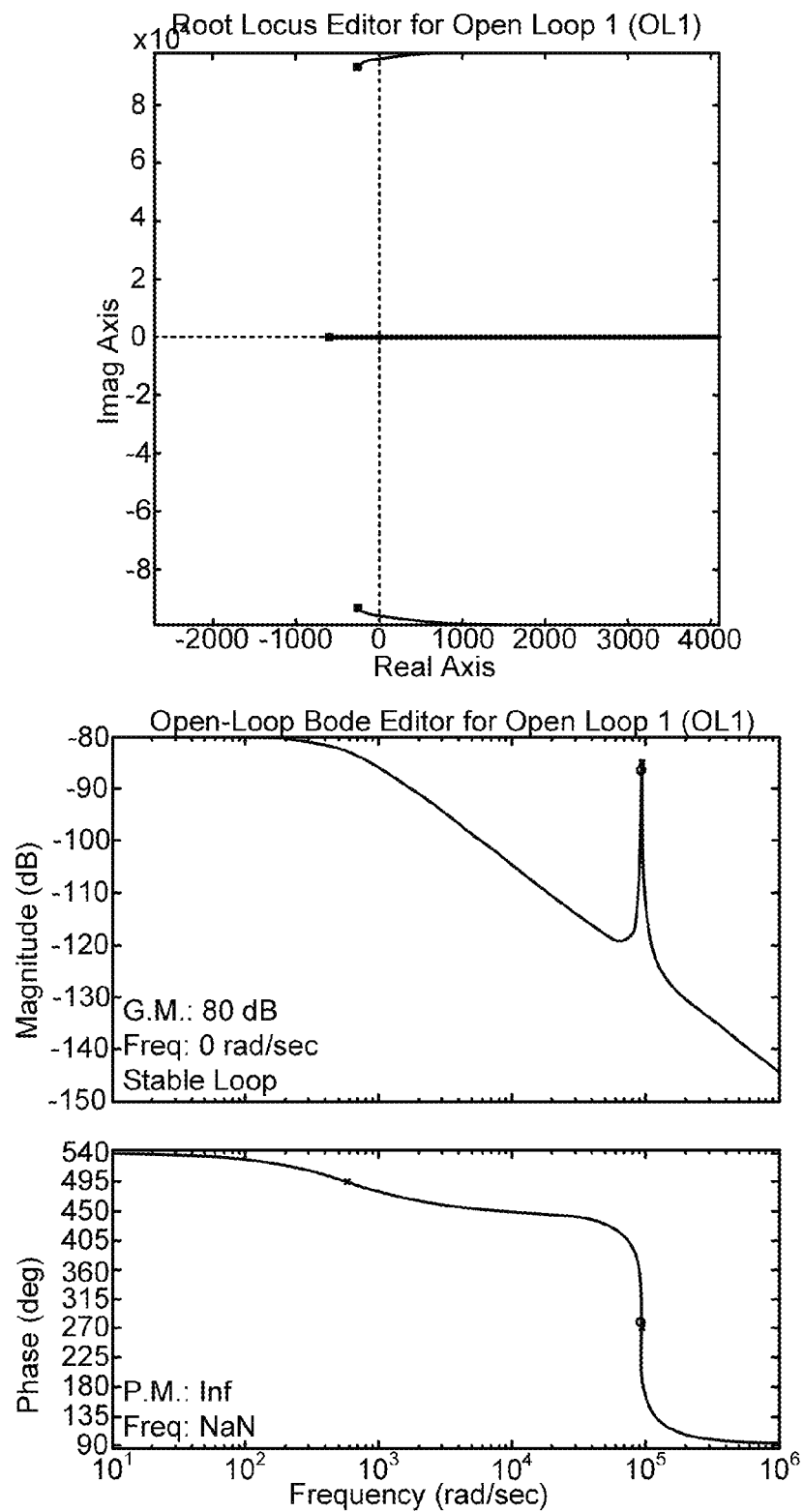
FIG. 33 illustrates root locus and bode plot of an exemplary decoupling circuit.

Using the DC equivalent circuit theory and state space averaging (see, e.g., J. T. Boys et al, "Controlling inrush currents in inductively coupled power systems," in *The 7th International Power Engineering Conference,* 2005. *IPEC* 2005, 2005, pp. 1046-1051.), the following transfer function for a parallel tuned decoupling circuit is shown in equation (25). The root locus plot of this transfer function using the system parameters is shown in FIG. 33. This root locus depicts that there are three poles and two zeros. It should be noted that the zeros is a right hand plane zero which means that the output would always act in the negative direction of what is expected when a step function is at the input. With this in consideration, there are still significant assumptions in the analysis model and pushing the system close to the verge of instability is not a wise choice.

$$\frac{V_o(s)}{d(s)} = \frac{-\frac{I_{d'}}{C_{dc}}\left(s^2 + \left(\frac{r}{L_{dc}} - \frac{R_L(1-D)^2}{L_{dc}}\right)s + \frac{1}{L_{dc}C_{2'}}\right)}{s^3 + \left(\frac{1}{C_{dc}R_L} + \frac{r}{L_{dc}}\right)s^2 + \left(\frac{1}{C_{2'}L_{dc}} + \frac{r}{L_{dc}R_LC_{dc}} + \frac{(1-D)^2}{L_{dc}C_{dc}}\right)s + \frac{1}{C_{2'}L_{dc}R_LC_{dc}}} \quad (25)$$

A. Switch and Diode Selection

Any suitable switch and diode combination may be used for the systems described herein. For example, in some embodiments, for simplicity, cost, and to avoid loss caused by adding snubbing devices to MOSFET type switches, the same International Rectifier IGBT IRG7PH42UPBF switch (identical to the switch used in the primary tuned LCL load resonant converter) may be used for a secondary decoupling control switch $S_b$ shown in FIG. 29. The gate drive circuitry is also similar to that shown in FIG. 15. The diode $D_b$ shown in FIG. 29 may be selected from any suitable component or component set, such as two paralleled IDH16S60C Silicon Carbide ("SiC") schottky diodes from Infineon. The SiC diodes have a positive temperature coefficient; therefore, no additional balancing care is required to ensure thermal run-away does not occur as would be the case in typical silicon schottky diodes. Additionally, the SiC diodes exhibit very low conduction loss and near zero reverse recovery time.

The switches and diodes on the secondary electronics may be configured to use the same bottom configuration and same heat spreader wafers with thermal paste as those on the primary (FIG. 14). The aluminum heat sink may have a moderate capacity and surface area extrusion, such as MM32647 or equivalent, available from M&M Metals. Both the primary and secondary electronics assemblies may include an air cooling fan directed down the heat sink fin channels. The fans may be 12 volt DC high capacity, low power, low noise designs consuming less than 5 watts. Model number D7025V12 from Sofasco or equivalent may be suitable. The secondary thermal configuration is similar to that depicted in FIG. 14.

VIII. Secondary Decoupling Controller

The IPT systems described here may optionally include a secondary decoupling controller 920, which has both hardware and software associated therewith.

A. Hardware

Any suitable secondary decoupling controller 920 may be used to control decoupling switch waveforms. In some embodiments, a Field Programmable Gate Array ("FPGA") development board using a Xilinx Spartan 3AN FPGA may be used to develop a secondary decoupling controller 920. A custom wireless communication card may also be added to the development board to accommodate a custom application communication protocol over a wireless protocol layer, such as the standard 802.15.4 wireless protocol layer. The FPGA development platform may allow for a high amount of flexibility in an initial IPT system. Additional, more cost effective solutions exist and may allow much finer control over the entire system at much higher data throughput rates. One such alternative embodiment for a secondary decoupling controller 920 is the use of a Digital Signal Controller ("DSC") or Digital Signal Processor ("DSP") such as the Freescale MC56F84xx or series DSC.

B. Software

1. Overview

In some embodiments employing an FPGA or alternate processor, the internal firmware development may be done in a Hardware Design Language ("HDL"). In some embodiments employing a DSC or a DSP, the internal firmware development may be done in software coding languages such as C or C++. Such firmware may be broken in to subsections, for example five different subsections. The subsections may include, for example, a Processor subsection, a Communications subsection, an Analog to Digital Converter ("ADC") subsection, an LED Display subsection, and a Switch Control subsection.

Beyond these firmware subsections, additional software may be added as an application layer to the processor subsection and may be done in any suitable language, such as the C or C++ language. Interaction such as manual control and data-logging may be handled independently by any suitable user interface, such as a Graphical User Interface ("GUI") on a PC over a wireless interface. The manual control and interaction is optional but assists in producing data-rich analysis of the system.

a. Processor

The processor subsection may comprise a processor, such as a 32-bit processor running at a clock frequency of from about 30 MHz-100 MHz and required data and program memory. Other suitable processors may be used. The primary clock may be adjusted with an external PLL but due to the important nature of the frequency, an HDL block may perform clock timing verification and hold the processor (and all other subsections) in reset (thus preventing power transfer) until timing can be fully verified against a known reference clock signal. The processor subsection may be fully in charge of the application layer of software. It accepts current and voltage measurements throughout the secondary decoupling controller 920 and directly helps to determine the power transfer of the IPT system in dual side control (as described in IV.B.2). Additionally, in some embodiments the processor may be configured to control communications, perform reporting, and implement manual control commands issued by an operator if desired.

b. Communications

The communication subsection may be configured to translate high-level data transmission into low-level bit encoding required by the wireless communication chips. The communication subsection, in one embodiment, may help to ensure proper transmission and reception of all wireless data.

c. Analog to Digital Converter ("ADC")

The ADC subsection may be configured to automatically communicate with external ADC integrated circuits, filter the data, and periodically report measurement parameters to the processor subsection.

d. LED Display

The LED display subsections may be configured to reduce processor loading by handling all visual status reporting. It reads the status of each subsection automatically and visually reports problems that may occur as well as power level status information. The LED display subsection, in one embodiment, directly controls a set of RGB colored LED's on the FPGA development board.

e. Switch Control

The switch control subsection may be configured to translate the desired decoupling duty cycle from the processor to correct waveform control on the decoupling switch. This subsection helps to ensure that duty cycle control is timed so that new values are reloaded at appropriate intervals regardless of when the processor requests the change in duty cycle. This subsection, in one embodiment, produces a fault-tolerant Pulse Width Modulated ("PWM") signal that may automatically decouple the secondary circuit 918 in case of a detected failure.

IX. Wirelessly Powered Load

Figure 34:
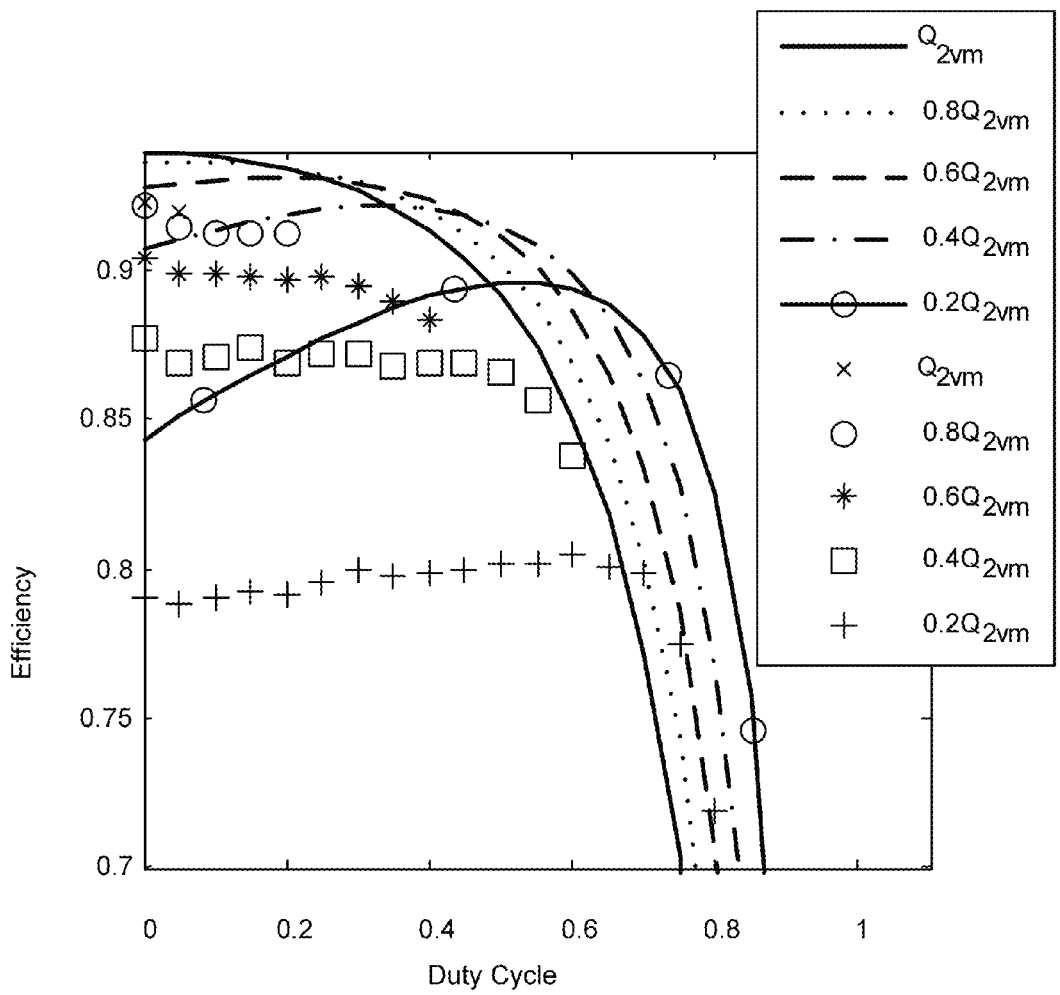
FIG. 34 illustrates efficiency of an exemplary system @ k=1.14 $k_{min}$ (v=246 mm, h=0 mm). Line represents analytically calculated results and markers represented experimental measured results. The data is taken for different loading conditions, when matched to a percentage of the maximum $Q_{2v}$ loading condition.
Figure 35:
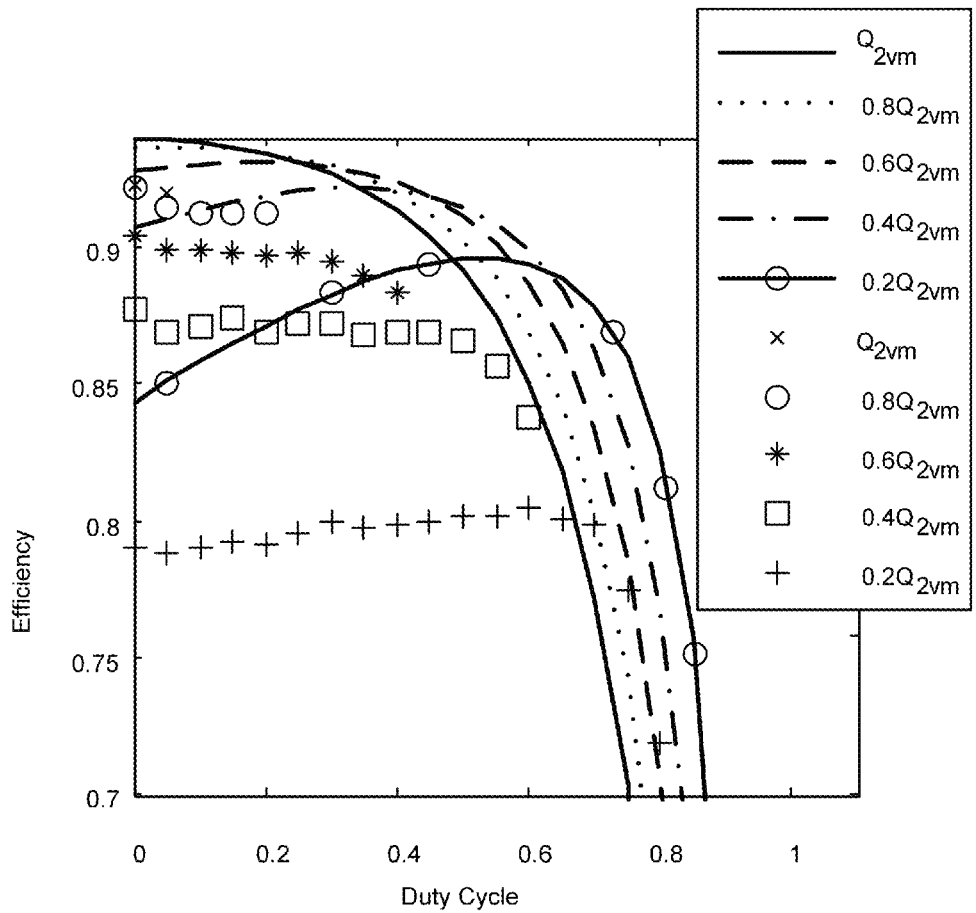
FIG. 35 illustrates efficiency of an exemplary system @ k=2.0 $k_{min}$ (v=172 mm, h=0). Line represents analytically calculated results and markers represented experimental measured results. The data is taken for different loading conditions, when matched to a percentage of the maximum $Q_{2v}$ loading condition.
Figure 36:
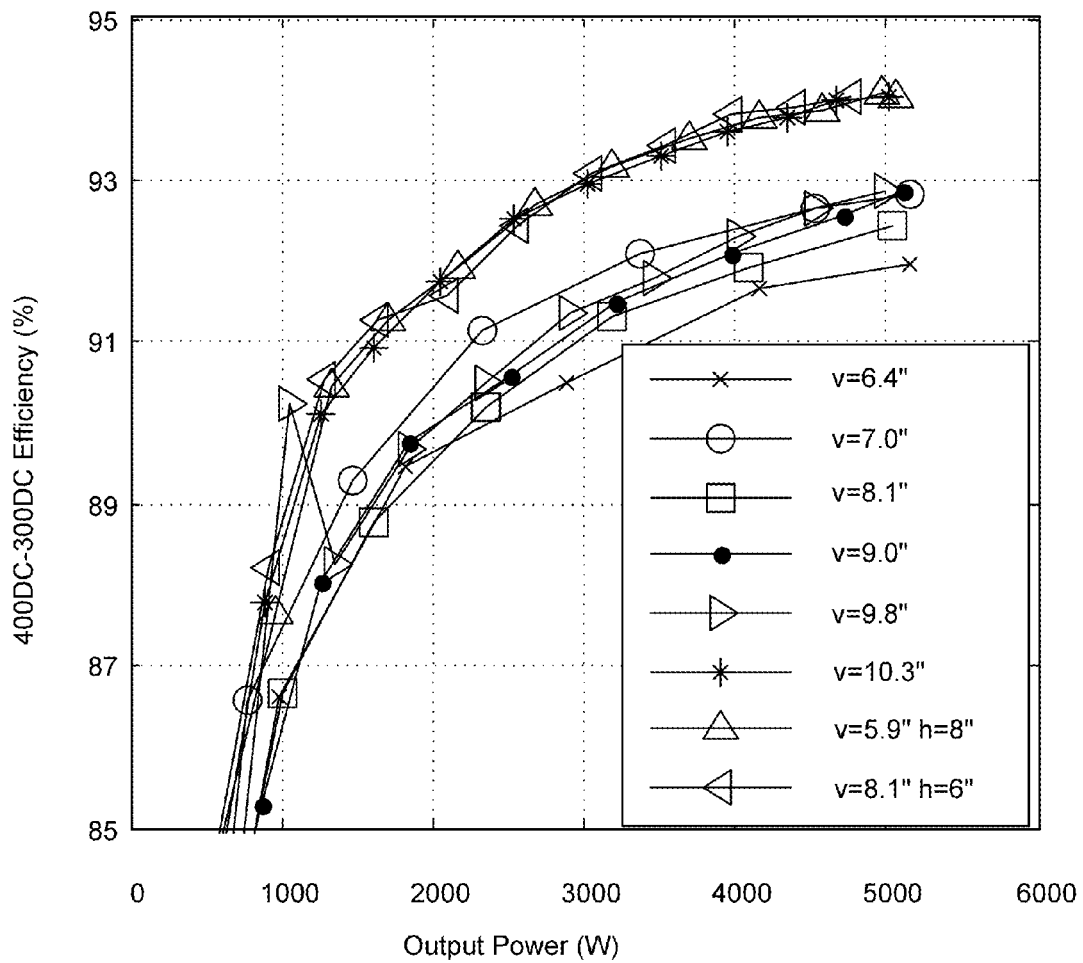
FIG. 36 illustrates practical overall system efficiency measurements when output voltage is allowed to vary. 5 kW transfer occurs when the DC output is 300 V.

FIG. 34 and FIG. 35 illustrate overall wireless IPT efficiency when using dual side control and hence secondary decoupling control (shown as Duty Cycle) from grid input on the primary to DC output on the secondary under fixed output voltage conditions (300 V) and under worst case coupling conditions. It should be noted that most loads attached to high power IPT systems will likely require a constant DC voltage output such as electric vehicles when charging batteries; however, if the system output voltage is allowed to vary under varying loading conditions the overall system efficiency can be improved under light load conditions. FIG. 36 shows overall system efficiency without dual side control but with the output voltage varying under several different vertical and horizontal magnetic pad misalignment conditions.

X. Fault Protection and Safety

Fault protection is an important aspect of high voltage and high power systems to ensure human and property safety. The 5 kW or greater wireless IPT systems described herein may use three layers of hardware fault tolerance and multiple additional layers of software fault protection.

A. Hardware Fault Protection

In some embodiments, the first layer of hardware fault protection may exist on each of the primary switch gate drivers and at the input of the AC-DC power factor stage. In addition to standard fuse protection, the AC-DC power factor stage, in one embodiment, has the ability to detect unusually high current spikes and power down the system until a manual reset is performed. On the LCL converter, the gate drive circuitry of each switch has desaturation protection such that if any switch is detected to be in desaturation (i.e. failure mode), all gate drivers will be shut down and the system will report a switch fault. Should additional safety be required on this layer of fault protection, a standard normally-open contactor can be added to the input or output of the AC-DC power factor stage.

In some embodiments, the second layer of hardware fault protection may exist in both the primary and secondary resonant networks. In one embodiment, a Metal Oxide Varistor ("MOV") from Littelfuse (part number V25S750P) is placed in parallel with the parallel tuning capacitor $C_1$ in FIG. 16 and the parallel tuning capacitor $C_2$ in FIG. 29. Each MOV typically protects against transient voltages above 750 VAC or 970 VDC and has the ability to dissipate 890 J of energy which is sufficient in the embodiment to remove the capacitive energy storage in the system and help to ensure human safety. In the unlikely event that the MOV itself fails, the most likely mode of failure is a short which effectively detunes the IPT system and prevents additional power transfer.

In some embodiments, the third layer of hardware fault protection may exist on the secondary decoupling circuit. In the very unlikely event that all software fails to control the output power properly and the primary continuously provides constant track current without regard to output power, a Schmitt trigger circuit automatically decouples the secondary and regulates the output voltage between 310 V and 330 V thus keeping all systems operating properly without overvoltage conditions. This layer of fault protection is particularly unique as many similar systems either do not have secondary decoupling control or if they do, the control remains purely in software. Furthermore, this level of fault protection allows trending toward dynamic in-motion wireless inductive power transfer.

B. Software Fault Protection

In some embodiments, the software on board the primary controller 908 and secondary decoupling controller 920 may be configured to constantly monitor current levels and voltage levels throughout the entire IPT system. If at any time, any current or voltage exceeds a predefined maximum, each independent controller prevents further power transfer and reports the appropriate overvoltage or overcurrent error to the user. Additionally, communication is monitored for consistency and reliability. If communication is deemed unreliable or a certain period has passed without communication, each independent controller prevents further power transfer and reports the appropriate communication error to the user.

Another important aspect of safety is ensuring that no ferrimagnetic objects between primary and secondary magnetic coils (primary and secondary receiver pads 914, 916) are heating due to eddy currents. The software on the primary controller 908 and secondary decoupling controller 920 constantly monitors system efficiency and can detect if any efficiency drop occurs due to unrecognized ferrimagnetic material. In the event that such a drop is detected, the IPT system prevents heating of such objects by shutting down each individual controller and reporting the appropriate error message to the user.

C. Magnetic Safety

The International Commission on Non Ionizing Radiation Protection ("ICNIRP") guidelines, a standard currently adopted in many EU and Oceania countries, is commonly used to determine the maximum magnetic field exposed to humans by a wide range of new inductive charging standards (such as SAE-J2954, ISO/IEC PT61980).

Figure 37:
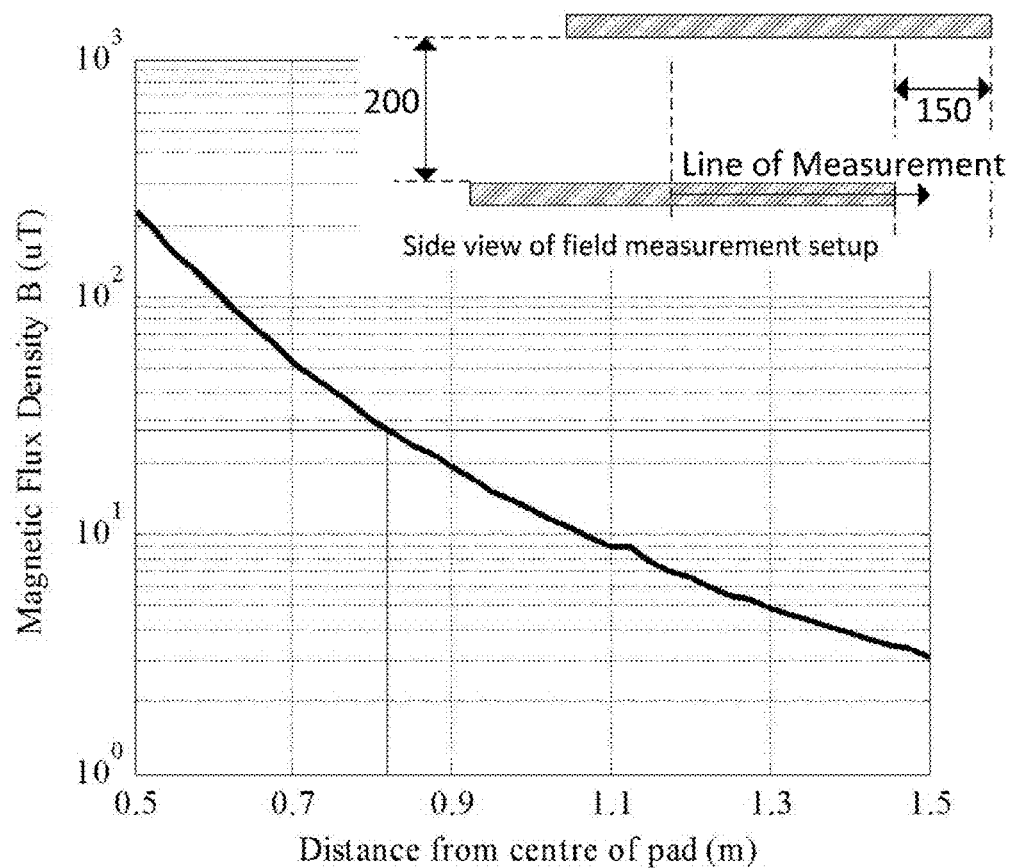
FIG. 37 illustrates magnetic field measurement results for an exemplary 5 kW system operating under worst conditions. The highest field strength was found at vertical height of 200 mm and horizontal misalignment of 150 mm.
Figure 38:
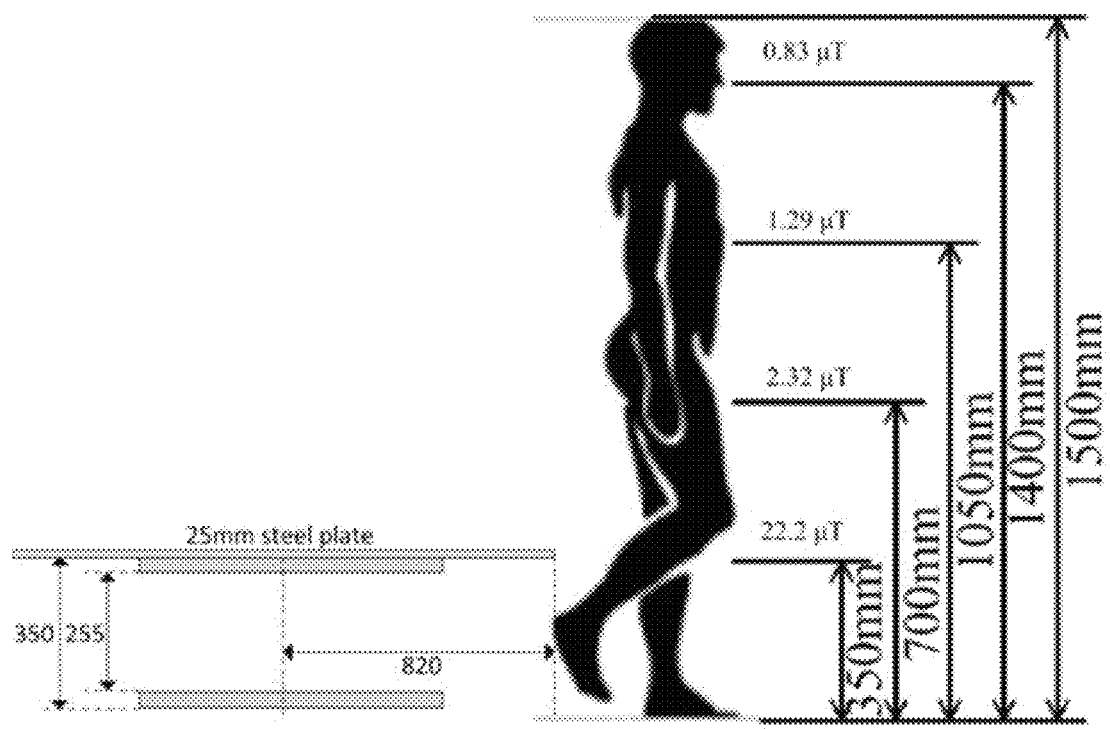
FIG. 38 illustrates body average measurement from 4 measurement points on a 1500 mm tall female human body. The highest field strength was found at vertical height of 255 mm and zero horizontal misalignment.

The magnetic field measurements of the disclosed IPT systems, in various embodiments, meet the stringent ICNIRP standards by using the measurement technique proposed by ARPANSA. See M. Budhia et al, "Design and Optimisation of Circular Magnetic Structures for Lumped Inductive Power Transfer Systems," *IEEE Transactions on Power Electronics*, vol. PP, pp. 1-1, 2011. There are typically two limits to meet: 1) Absolute maximum magnetic field exposed to the body must not exceed 27.3 µT and 2) The average field strength by taking measurements at the head, chest, groin and knees must be below 6.25 µT. FIG. 37 shows that for one embodiment, the absolute maximum magnetic field strength can be met at 0.82 m, which is less than half of the width of a typical passenger vehicle. The measurement was taken for all possible operating conditions and the worst case alignment conditions are shown in FIG. 37. FIG. 38 shows that the body average of 4.36 µT is measured using the four point measurement and as a standard case scenario (see M. Budhia et al, "Design and Optimisation of Circular Magnetic Structures for Lumped Inductive Power Transfer Systems," *IEEE Transactions on Power Electronics*, vol. PP, pp. 1-1, 2011.), a minimum height female of 1500 mm is used as the worst case. Note that maximum and average field strength shown here corresponds to different height and misalignment conditions for the absolute worst case.

XI. System Results

Figure 39:
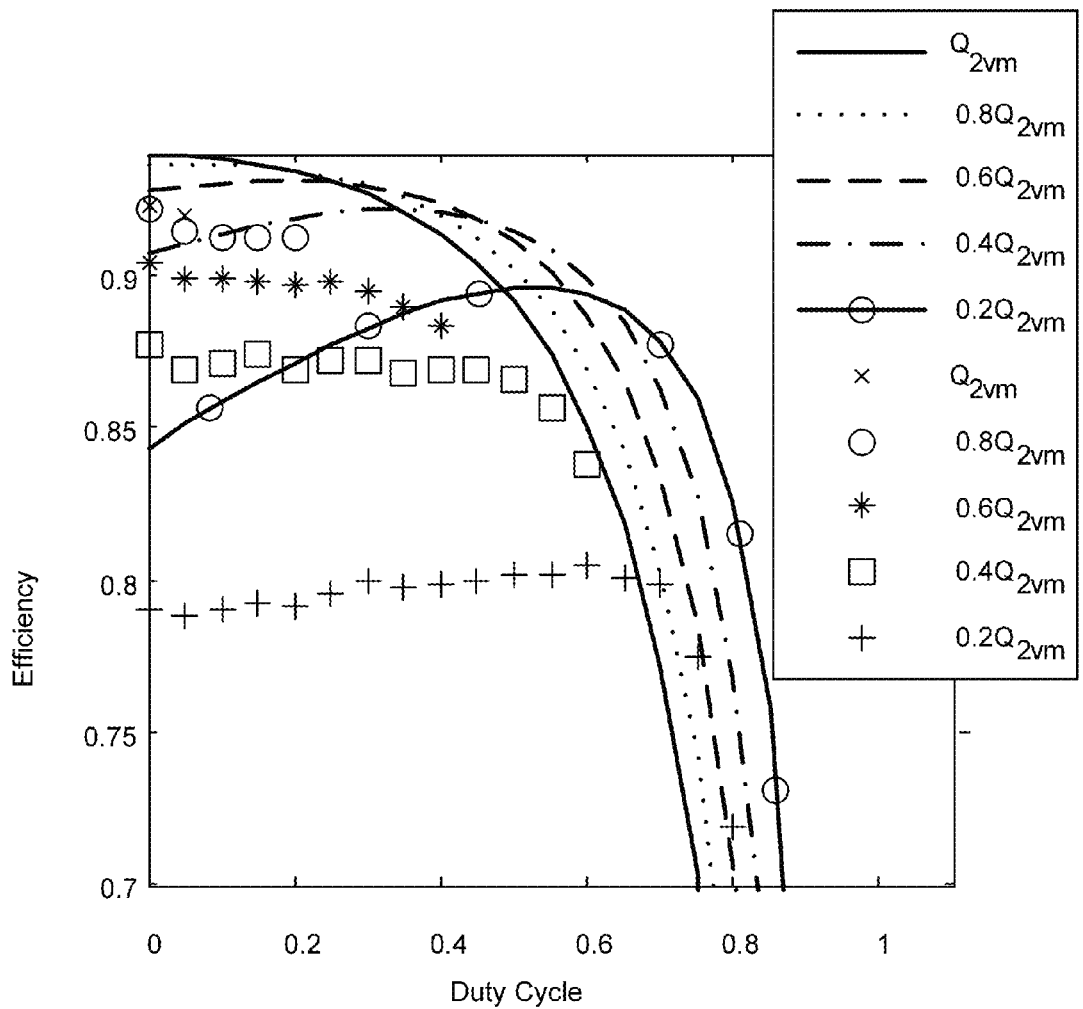
FIG. 39 illustrates efficiency of an exemplary system @ k=1.14 $k_{min}$ (v=246 mm, h=0 mm). Line represents analytically calculated results and markers represented experimental measured results. The data is taken for different loading conditions, when matched to a percentage of the maximum $Q_{2v}$ loading condition.
Figure 40:
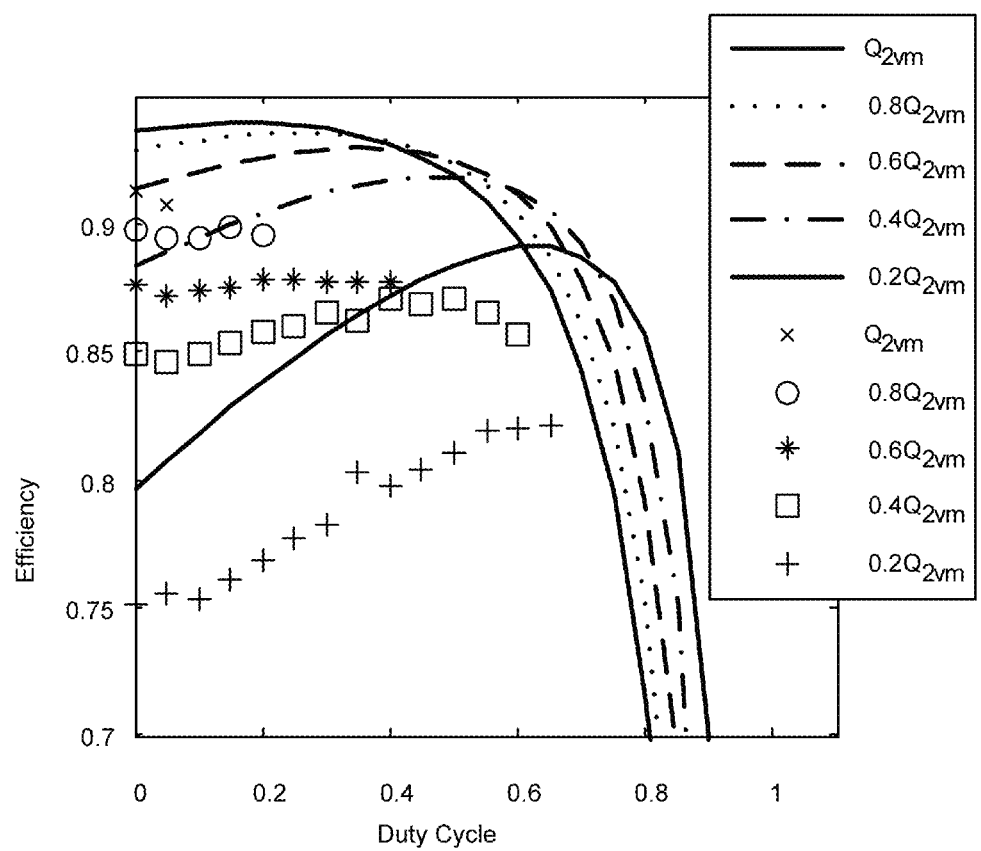
FIG. 40 illustrates efficiency of an exemplary system @ k=2.0 $k_{min}$ (v=172 mm, h=0). Line represents analytically calculated results and markers represented experimental measured results. The data is taken for different loading conditions, when matched to a percentage of the maximum $Q_{2v}$ loading condition.

Practical experimental measurements have been used to validate the system efficiency analysis from the previous section on dual side control. FIG. 39 and FIG. 40 show the analytical and experimental results against changes in duty cycle during operation under different coupling conditions. $Q_{2vm}$ is the maximum $Q_{2v}$ achievable and used to denote the specific loading condition. For example, $Q_{2vm}$ refers to 5 kW output and 0.8 $Q_{2vm}$ refers to 4 kW output, and so on. For the experimental results, duty cycle is limited at higher $Q_{2v}$ (load conditions), to keep within the component tolerances of the physical system. Although there are differences in the absolute values between predicted and measured efficiency, the duty cycle at which the highest efficiency occurs is nearly the same and the slopes of the waveforms are nearly identical.

The large differences in efficiency value at lower power are due to the assumption of neglecting the switching losses in the system. When switching losses are included in the system level simulation, the simulation results directly match on top of the experimental results; however, it is not shown here for purposes of clarity. Using these figures, a direct comparison between the efficiency of each control scheme is possible.

For primary side control, duty cycle is always maintained at zero, and it can be seen that at lower $Q_{2v}$, the efficiency obtained is definitively lower than the optimal peak that appears in the measurement. For secondary side control, the duty cycle is controlled to keep the output voltage constant against load resistance variations by keeping $D=(1-R_{dc\_min}/R_{dc})$. Similarly, it can be seen that the efficiency of secondary decoupling control is not optimal. To make a clear comparison, the experimental results from FIG. 39 and FIG. 40 are listed in Table IV. It can be seen when $k=1.14\ k_{min}$, primary control efficiency is slightly better than secondary decoupling control efficiency; however, the optimal control is better than both. When $k=2\ k_{min}$, the secondary decoupling control is better than the primary; however, the optimal is still the best. It should be noted that when $k=2\ k_{min}$ and $P_{out}=1$ kW, an efficiency improvement of ~7% and loss reduction of ~25% is achieved compared against secondary decoupling control.

TABLE IV

System efficiency measurements at $1.14k_{min}$ and $2k_{min}$. The first value is analytical results and second value is experimental measurement.

| Efficiency | K | 5 kW ($R_{dc}$ = 18 Ω) | 4 kW ($R_{dc}$ = 22.5Ω) | 3 kW ($R_{dc}$ = 30 Ω) | 2 kW ($R_{dc}$ = 45 Ω) | 1 kW ($R_{dc}$ = 90 Ω) |
|---|---|---|---|---|---|---|
| Primary | $1.14k_m$ | 0.945/ 0.923 | 0.942/ 0.922 | 0.934/ 0.904 | 0.915/ 0.877 | 0.856/ 0.791 |
| Secondary | $1.14k_m$ | 0.945/ 0.923 | 0.941/ 0.913 | 0.932/ 0.883 | 0.911/ 0.837 | 0.845/ 0.719 |
| Optimal | $1.14k_m$ | 0.945/ 0.923 | 0.943/ 0.922 | 0.938/ 0.904 | 0.931/ 0.877 | 0.909/ 0.804 |
| Primary | $2k_m$ | 0.943/ 0.912 | 0.936/ 0.898 | 0.923/ 0.876 | 0.895/ 0.850 | 0.819/ 0.751 |
| Secondary | $2k_m$ | 0.943/ 0.912 | 0.941/ 0.896 | 0.939/ 0.877 | 0.929/ 0.856 | 0.896/ 0.744 |
| Optimal | $2k_m$ | 0.946/ 0.912 | 0.943/ 0.899 | 0.939/ 0.878 | 0.930/ 0.871 | 0.907/ 0.820 |

Figure 41:
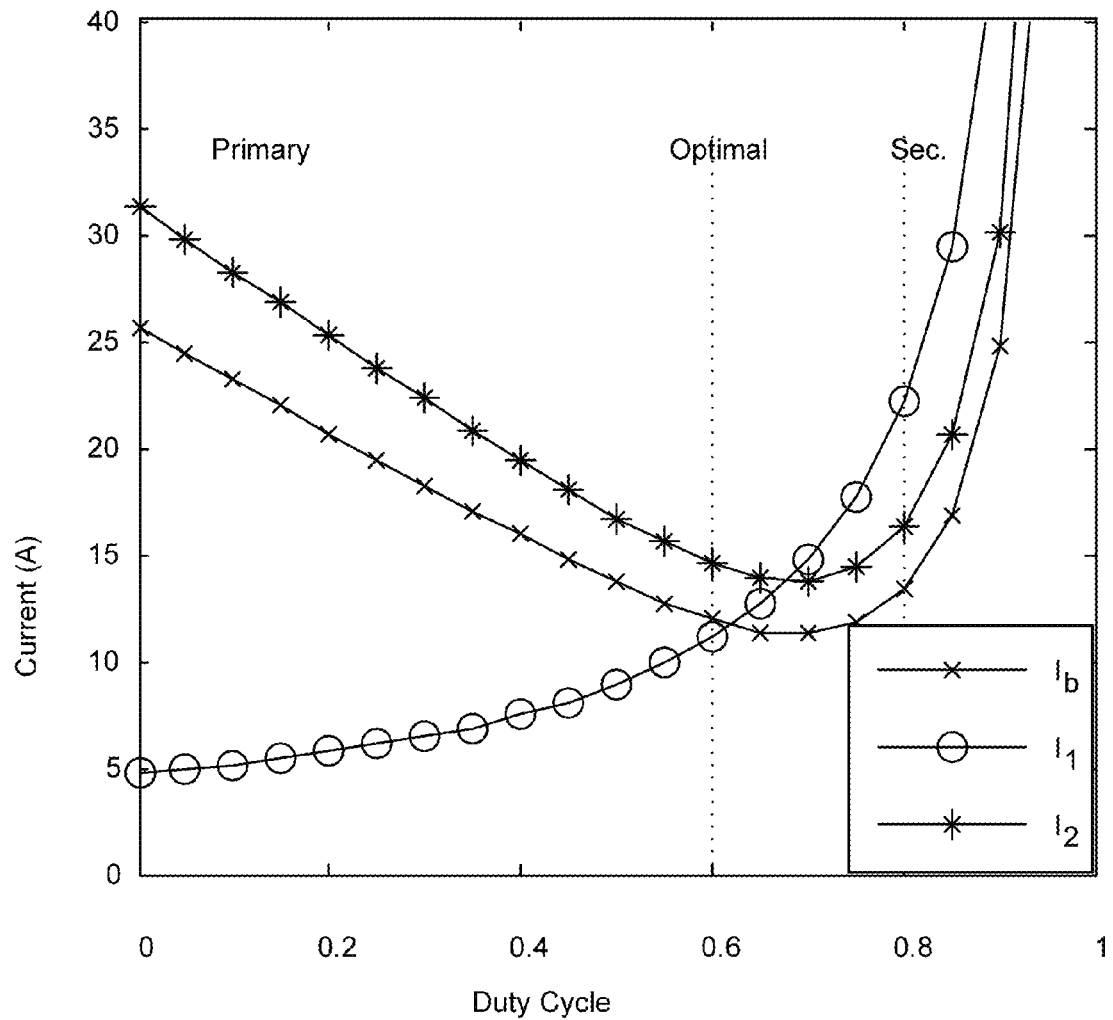
FIG. 41 illustrates current values for waveforms $i_b$, $i_1$, and $i_2$ for $Q_{2v}$=0.2$Q_{2vm}$ and k=2 $k_{min}$.

For a typical IPT system, one may assume that the highest efficiency is achieved when the minimum primary track current is used for the required power transfer. However, due to high conduction losses in the H-bridge in (17) and (18) at low σ, the highest efficiency no longer occurs at the minimum primary current. To illustrate the large efficiency differences at $k=2\ k_{min}$ and $Q_{2v}=0.2\ Q_{2m}$, the RMS values of the key waveforms are shown in FIG. 41. It can be seen that the highest efficiency, which occurs at D=0.6 in FIG. 40, corresponds very close to the minimum $i_b$ in FIG. 41. In comparison to primary side control, $i_1$ and $i_2$ are much smaller for optimal control. In comparison to secondary side control, $i_b$ is much smaller for optimal control.

Figure 42:
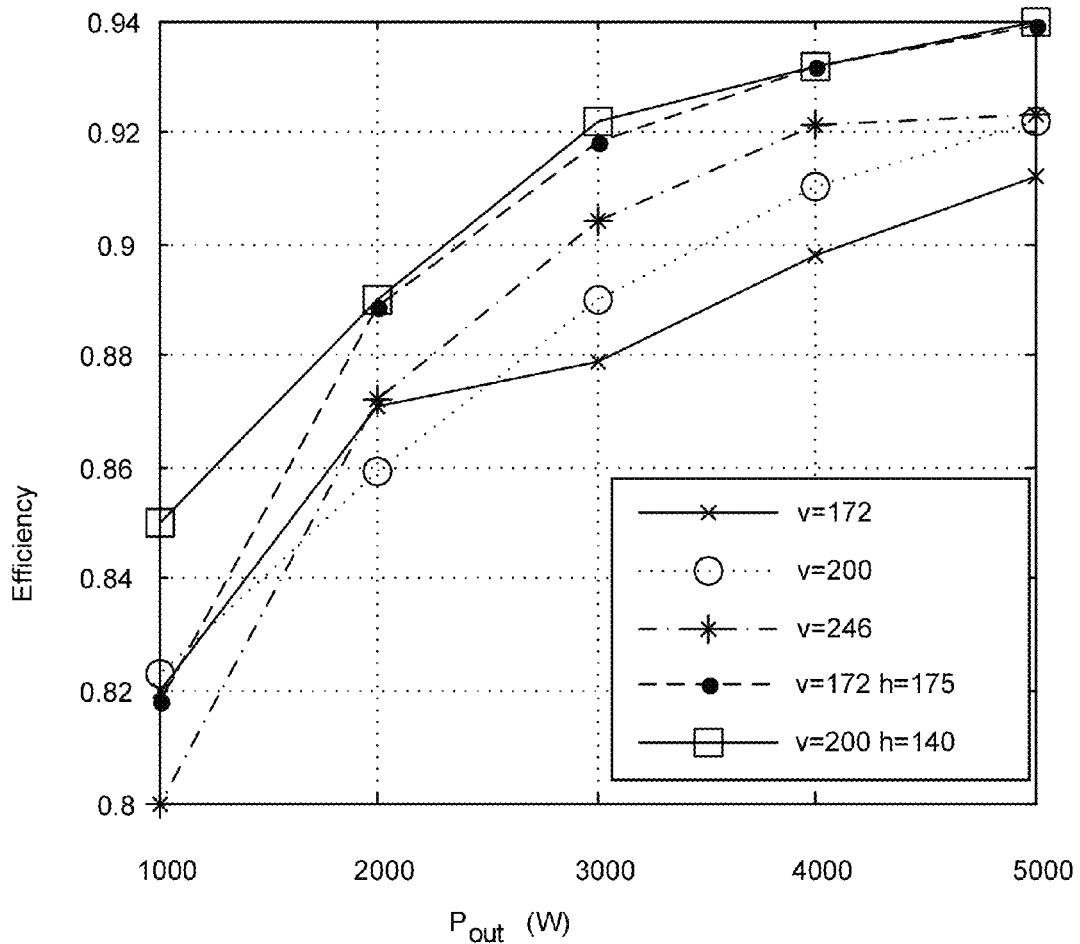
FIG. 42 illustrates efficiency measurement of an exemplary system under a wide range of operating conditions. v=172 is for a vertical height of 172 mm with zero horizontal misalignment. v=200, h=140 is for a vertical height of 200 m and horizontal misalignment of 140 mm.

The system level charging efficiency from 400 VDC to 300 VAC is shown in FIG. 42 for a range of vertical and horizontal heights. This efficiency does not include the front PFC and rectification stage. With these features, it may be shown that the efficiency from this stage can reach as high as 98%. See F. Musavi et al, "A High-Performance Single-Phase Bridgeless Interleaved PFC Converter for Plug-in Hybrid Electric Vehicle Battery Chargers," *IEEE Transactions on Industry Applications*, vol. 47, pp. 1833-1843, 2011. Factoring this component, the efficiency during normal operation over a wide range of coupling conditions can still be around or above 90% from grid to battery 926. This practical result is an important achievement as it shows that recent advances in IPT and device technology have allowed level 2 inductive charging to reach very high efficiencies. Thus, previous assumptions that inductive charging is much less efficient than plug-in systems no longer apply.

Figure 43:
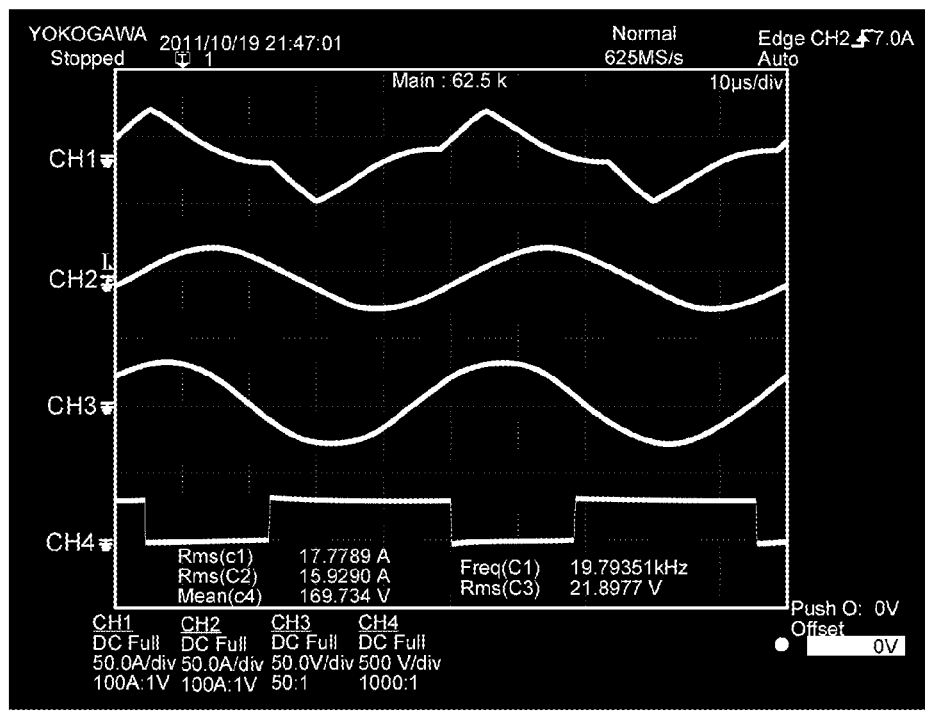
FIG. 43 illustrates waveforms of an exemplary operating IPT system with the following parameters: (a) P=2 kW, (b) P=5 kW @ v=172 mm h=0 mm. Top to bottom trace, $i_b$ (FIG. 11), $i_1$ (FIG. 11), $i_2$ (FIG. 29), and $V_s$ (FIG. 29) (inverse of duty cycle)
Figure 43:
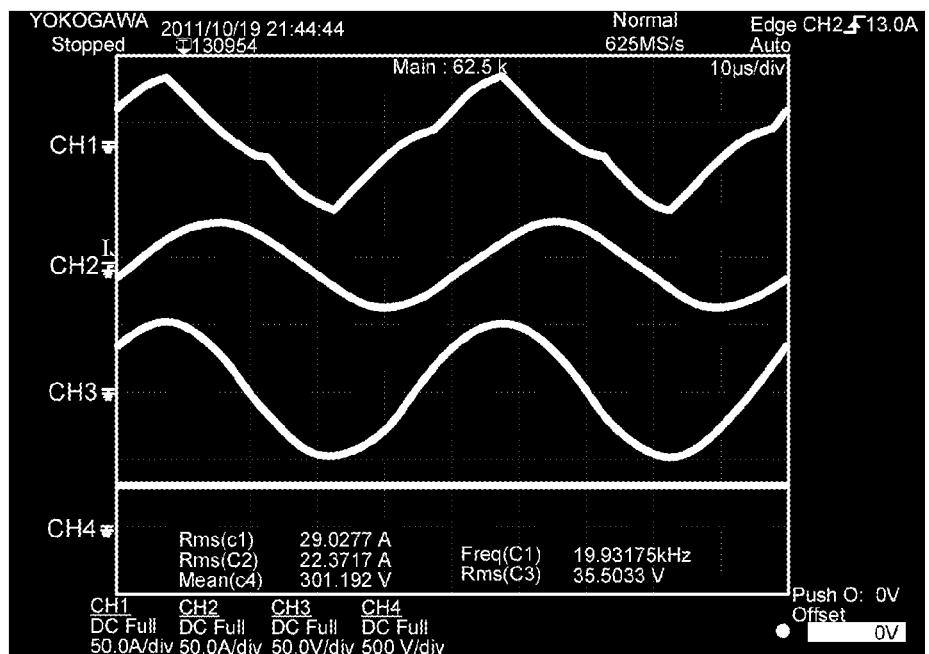
Figure 44:
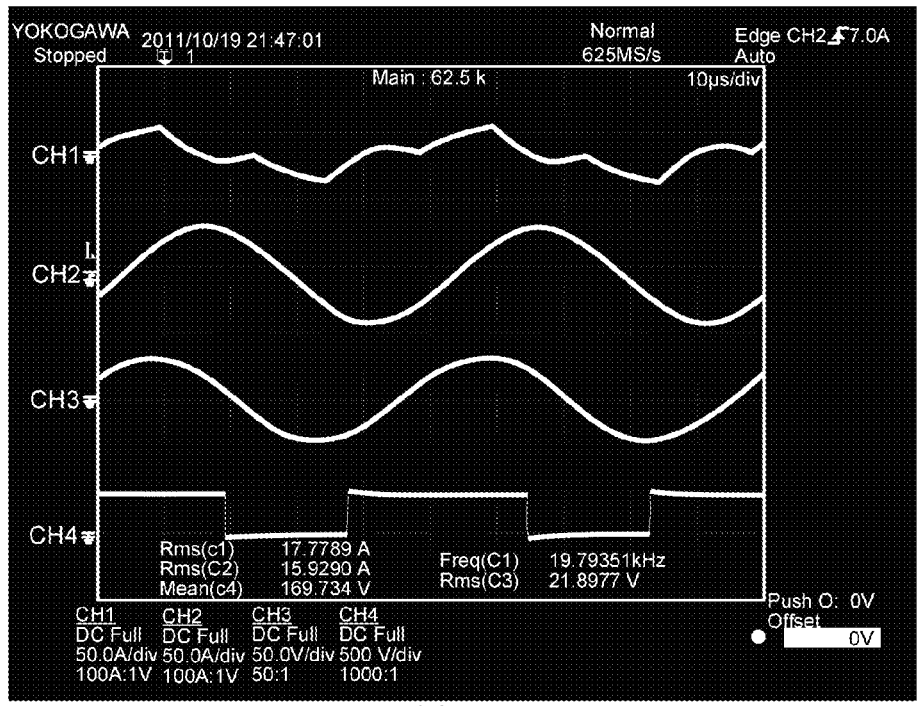
FIG. 44 illustrates waveforms of an exemplary operating IPT system with the following parameters: (a) P=2 kW, (b) P=5 kW @ v=246 mm h=0 mm. Top to bottom trace, $i_b$ (FIG. 11), $i_1$ (FIG. 11), $i_2$ (FIG. 29), and $V_s$ (FIG. 29) (inverse of duty cycle).
Figure 44:
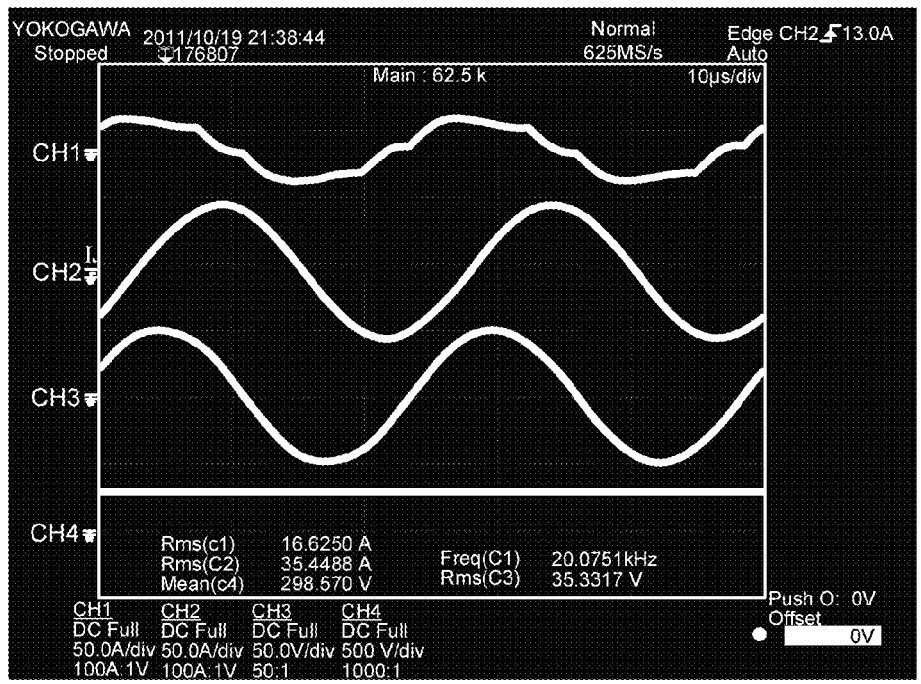

The operating waveforms are shown in FIG. 43 and FIG. 44 for the two coupling conditions of $k=1.14\ k_{min}$ and $k=2\ k_{min}$. At the maximum of 5 kW, the duty cycle is set to zero and the RMS waveforms are much higher than at 2 kW. When $k=1.14\ k_{min}$, the bridge current is much higher than $k=2\ k_{min}$, because a higher current is required to compensate for the low input voltage, which is limited by the low conduction angle of the LCL converter to reduce primary track current shown in (3). Note that for optimal efficiency dual side control, a 2 kW power corresponds to a duty cycle of around 0.4.

XII. Nomenclature

Figure 11:
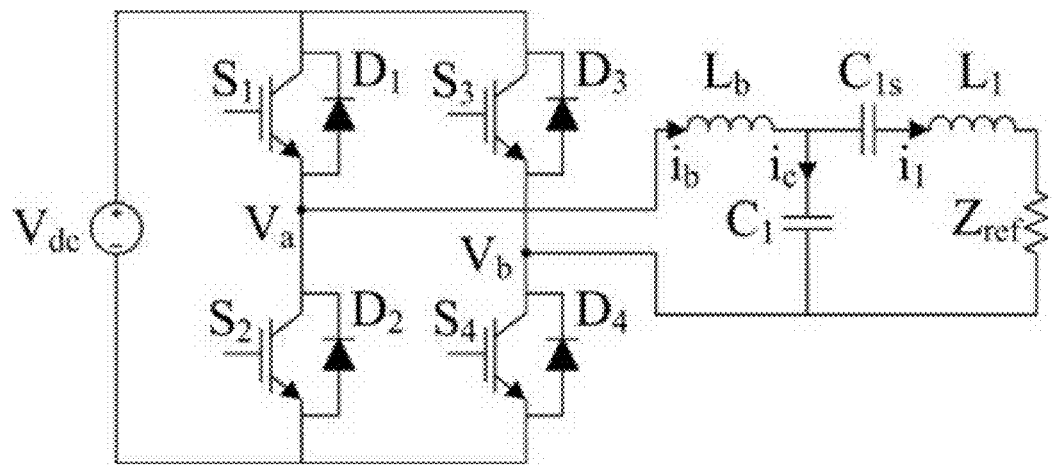
FIG. 11 illustrates an exemplary LCL load resonant converter.

The following is a list of nomenclature included herein:

$V_{dc}$ DC input voltage to the primary LCL load resonant converter
$Q_2$ Total quality factor of the secondary resonant circuit (J. T. Boys et al, "Stability and control of inductively coupled power transfer systems," *IEE Proceedings—Electric Power Applications*, vol. 147, pp. 37-43, 2000.)
$Q_{2v}$ Voltage quality factor of the secondary resonant circuit (N. A. Keeling et al, "A Unity-Power-Factor IPT Pickup for High-Power Applications," *IEEE Transactions on Industrial Electronics*, vol. 57, pp. 744-751, 2010.)
$Q_{2i}$ Current quality factor of the secondary resonant circuit (N. A. Keeling et al, "A Unity-Power-Factor IPT Pickup for High-Power Applications," *IEEE Transactions on Industrial Electronics*, vol. 57, pp. 744-751, 2010.)
$Q_{2vm}$ Maximum voltage quality factor when at minimum coupling and maximum load condition
$Q_1$ Quality factor of primary LCL load resonant converter
$R_{dc}$ DC equivalent resistance of the battery under steady state
$R_{dc\_min}$ Maximum loading condition
k Coupling coefficient
$k_{min}$ Minimum coupling coefficient within operating range
$k_{max}$ Maximum coupling coefficient within operating range
M Mutual inductance between primary and secondary receiver pads 914, 916
$L_1$ Self-inductance of primary receiver pad 914 (FIG. 11)
$L_2$ Self-inductance of secondary receiver pad 914 (FIG. 29)
$C_{2s}$ Series tuning capacitor on the secondary resonant circuit (FIG. 29)
$C_2$ Parallel tuning capacitor on the secondary resonant circuit (FIG. 29)
$C_{1s}$ Series tuning capacitor on the primary LCL load resonant converter (FIG. 11)
$C_1$ Parallel tuning capacitor on the primary LCL load resonant converter (FIG. 11)
$L_{dc}$ DC inductance of secondary decoupling circuit
$L_b$ Bridge inductance of LCL load resonant converter
SU Uncompensated power of a receiver pad (defined as $V_{oc}*I_{sc}$ (G. Elliott et al, "Multiphase Pickups for Large Lateral Tolerance Contactless Power-Transfer Systems," *IEEE Transactions on Industrial Electronics*, vol. 57, pp. 1590-1598, 2010.))
$i_1$ Primary track current (or current flowing through inductor coil) (FIG. 11)
$i_{1\_max}$ Maximum primary track current in LCL load resonant converter (FIG. 11)
$I_{sc}$ Current measured when secondary receiver pad 916 is short circuited
$V_{oc}$ Voltage measured when secondary receiver pad 916 is open circuited
ω Operating frequency of IPT system
$X_1$ Reactance of the LCL load resonant converter (M. Borage et al, "Analysis and design of an LCL-T resonant converter as a constant-current power supply," *IEEE Transactions on Industrial Electronics*, vol. 52, pp. 1547-1554, 2005.)
$X_2$ Reactance of the secondary resonant circuit (parallel equivalent)
σ Conduction angle control variable of the first stage (H. H. Wu et al, "Design of Symmetric Voltage Cancellation Control for LCL converters in Inductive Power Transfer Systems," in *IEEE International Electric Machines & Drives Conference* ("*IEMDC*"), 2011, 2011, pp. 866-871.)
$Z_r$ Reflected impedance on the primary from secondary side
$Z_2$ Equivalent impedance of secondary circuit 918 measured from $V_{oc}$ (C.-S. Wang et al, "Design considerations for a contactless electric vehicle battery charger," *IEEE Transactions on Industrial Electronics*, vol. 52, pp. 1308-1314, October 2005 2005.)
$L_{1eq}$ Equivalent primary receiver pad inductance with series tuning (2)
$L_{2eq}$ Equivalent secondary receiver pad inductance with series tuning (24)
$V_{ab}$ AC output voltage of H-bridge (FIG. 11)
$(V_{ab})_1$ Fundamental component of AC output voltage
$V_{ac2}$ Voltage across secondary parallel resonant capacitor
$\Delta L_1$ Change in primary receiver pad inductance due to height variations
$\Delta L_2$ Change in secondary receiver pad inductance due to height variations
$\Delta C_2$ Equivalent change in secondary tuning capacitance due to variations in $L_2$
$P_{max}$ Maximum transferable power of IPT system
$P_{out}$ Current output power transferred in IPT system
D Control duty cycle of secondary boost converter (secondary decoupling circuit)
$R_{ac}$ Equivalent AC resistance of load from resonant tank (FIG. 25)
$V_{out}$ DC output voltage of secondary decoupling circuit
$I_{out}$ DC output current of secondary decoupling circuit
$R_{L2}$ ESR of secondary receiver pad 916
$R_{Ldc}$ ESR of DC inductor and two times linear on resistance of rectifier bridge
$R_{bd\_on}$ Linear on resistance portion of boost converter diode
$V_{bd\_on}$ Voltage drop portion of boost converter diode
$R_{hs\_on}$ Linear on resistance portion of switching devices of the LCL load resonant converter (in one embodiment IGBT IRG7PH42UPBF)
$V_{hs\_on}$ Voltage drop portion of switching devices of the LCL load resonant converter (in one embodiment IGBT IRG7PH42UPBF)
$V_{rd\_on}$ Voltage drop portion of secondary rectifier circuit diodes
α Normalized detuning capacitance (12)
$\eta_{b2}$ Efficiency of secondary boost converter (secondary decoupling circuit) without voltage drop
$\eta_{c2}$ Efficiency of secondary boost converter (secondary decoupling circuit) with linear resistance loss
$\eta_{r2}$ Efficiency of secondary resonant circuit
$\eta_{r1}$ Efficiency of primary LCL load resonant converter without voltage drop
$\eta_{c1}$ Efficiency of primary LCL load resonant converter without linear resistance loss
η Efficiency of system neglecting switching losses The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a switching module that controls switching for two pairs of switches configured in an H-bridge in a switching power converter, the switching module controlling each of the two pairs of switches closed and opened based on a duty cycle control technique, the switching module closing and opening each switch of the two pairs of switches in a switching sequence, wherein the two pairs of switches connect to a positive terminal and a negative terminal of a direct current ("DC") voltage source, and wherein for a first switching sequence a first switch of a pair of switches of the two pairs of switches has a higher switching power loss than a second switch of the pair of switches;
   a switch rotation module that changes the switching sequence of the two pairs of switches from the first switching sequence to a second switching sequence wherein the second switch of a pair of switches of the two pairs of switches has a higher switching power loss than the first switch of the pair of switches during the second switching sequence; and
   a switch wear module that tracks switching sequences, wherein the switch rotation module changes the switching sequence based on tracking of the switching sequences.

2. The apparatus of claim 1, wherein the switch wear module tracks the switching sequences by tracking an amount of time switching using each switching sequence.

3. The apparatus of claim 1, wherein the switch wear module tracks the switching sequences by tracking a number of switching cycles for each switching sequence.

4. The apparatus of claim 1, wherein the switch rotation module uses tracking of the switching sequences to switch between switching sequences to balance an amount of switching for each switching sequence.

5. The apparatus of claim 1, wherein the switch rotation module changes the switching sequence during a startup condition.

6. The apparatus of claim 5, wherein the switch rotation module changes the switching sequence by changing which pair of switches is first to be switched in the switching sequence.

7. The apparatus of claim 6, wherein the switch rotation module orders switching of the two pairs of switches so that a first pair of switches is first in the first switching sequence and a second pair of switches is first in the second switching sequence.

8. The apparatus of claim 1, wherein the switching power converter is a full-bridge derived topology.

9. The apparatus of claim 1, wherein the topology of the switching power converter is one of a voltage driven H-bridge, and a current driven H-bridge.

10. The apparatus of claim 1, wherein the topology of the switching power converter comprises an LCL converter.

11. The apparatus of claim 1, wherein the duty cycle control technique comprises one or more of symmetric voltage cancellation ("SVC") control, asymmetric voltage cancellation ("AVC") control, fixed conduction angle with variable voltage control, and fixed conduction angle control.

12. The apparatus of claim 1, wherein the switches of the two pairs of switches comprise semiconductor switches.

13. A system comprising:
    a switching power converter;
    a switching module that controls switching for two pairs of switches configured as an H-bridge in the switching power converter, the switching module controlling each of the two pairs of switches closed and opened based on a duty cycle control technique, the switching module closing and opening each switch of the two pairs of switches in a switching sequence, wherein the two pairs of switches connects to a positive terminal and a negative terminal of a direct current ("DC") voltage source, and wherein for a first switching sequence a first switch of a pair of switches of the two pairs of switches has a higher switching power loss than a second switch of the pair of switches; and
    a switch rotation module that changes the switching sequence of the two pairs of switches from the first switching sequence to a second switching sequence wherein the second switch of a pair of switches of the two pairs of switches has a higher switching power loss than the first switch of the pair of switches during the second switching sequence; and
    a switch wear module that tracks switching sequences, wherein the switch rotation module changes the switching sequence based on tracking of the switching sequences.

14. The system of claim 13, wherein the switching power converter comprises an LCL converter in an induction power transfer system.

15. A method comprising:
    controlling switching for two pairs of switches configured in an H-bridge in a switching power converter by controlling each of the two pairs of switches closed and opened based on a duty cycle control technique, each switch of the two pairs of switches closing and opening in a switching sequence, wherein the two pairs of switches connect to a positive terminal and a negative terminal of a direct current ("DC") voltage source, and wherein for a first switching sequence a first switch of a pair of switches has a higher switching power loss than a second switch of the pair of switches;
    changing the switching sequence of the two pairs of switches from the first switching sequence to a second switching sequence wherein the second switch of a pair of switches of the two pairs of switches has a higher switching power loss than the first switch of the pair of switches during the second switching sequence; and
    tracking the switching sequence, wherein changing the switching sequence is based on tracking of the switching sequence.

16. The method of claim 15, wherein tracking the switching sequence comprises one or more of tracking an amount of time switching using each switching sequence and tracking a number of switching cycles for each switching sequence.

17. The method of claim 15, further comprising balancing an amount of switching for each switching sequence based on tracking of the switching sequences.

* * * * *